US008032886B2

(12) United States Patent
Joy et al.

(10) Patent No.: US 8,032,886 B2
(45) Date of Patent: Oct. 4, 2011

(54) TRACKING ASYNCHRONOUS EXECUTION OF PROGRAM USING HIERARCHICAL STRUCTURE OF OBJECTS

(75) Inventors: Joseph M. Joy, Redmond, WA (US); Aditya Dube, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1124 days.

(21) Appl. No.: 11/252,311

(22) Filed: Oct. 17, 2005

(65) Prior Publication Data

US 2006/0059496 A1  Mar. 16, 2006

Related U.S. Application Data

(63) Continuation of application No. 09/718,567, filed on Nov. 22, 2000, now abandoned.

(51) Int. Cl.
*G06F 9/46* (2006.01)
*G06F 9/44* (2006.01)

(52) U.S. Cl. ........................................ 718/102; 717/124

(58) Field of Classification Search .................. 719/316; 717/127, 124, 165, 120; 718/102
See application file for complete search history.

(56) References Cited

U.S. PATENT DOCUMENTS

| | | | |
|---|---|---|---|
| 5,193,186 A * | 3/1993 | Tamaki et al. | 718/106 |
| 5,297,283 A * | 3/1994 | Kelly et al. | 718/104 |
| 5,398,334 A * | 3/1995 | Topka et al. | 1/1 |
| 5,463,389 A | 10/1995 | Klayman | |
| 5,701,487 A * | 12/1997 | Arbouzov | 717/124 |
| 5,970,496 A | 10/1999 | Katzenberger | |
| 5,996,009 A * | 11/1999 | Kitamura et al. | 709/223 |
| 5,999,986 A | 12/1999 | McCauley, III et al. | |
| 6,018,741 A | 1/2000 | Howland et al. | |
| 6,058,416 A | 5/2000 | Mukherjee et al. | |
| 6,119,115 A * | 9/2000 | Barr | 1/1 |
| 6,195,685 B1 | 2/2001 | Mukherjee et al. | |
| 6,366,932 B1 * | 4/2002 | Christenson | 1/1 |
| 6,557,046 B1 | 4/2003 | McCauley, III et al. | |
| 6,560,627 B1 | 5/2003 | McDonald et al. | |
| 6,678,716 B1 | 1/2004 | Pronsati, Jr. et al. | |
| 6,681,263 B1 * | 1/2004 | King | 719/315 |
| 6,883,170 B1 * | 4/2005 | Garcia | 718/1 |
| 2002/0046230 A1 * | 4/2002 | Dieterich et al. | 709/107 |

* cited by examiner

*Primary Examiner* — Meng An
*Assistant Examiner* — Brian Chew

(57) ABSTRACT

The invention builds a structure of software objects that captures the historically contingent development of an asynchronous program. The invention builds software objects that represent the resources and subtasks that make up the asynchronous program. The objects are connected into a hierarchy whose structure explicates interactions among the resources and subtasks. When a fault is detected, the structure tells the debugger everything the program was doing at the time of the fault and lays open the developmental history of the program that led to the fault. The debugger uses this information to trace the detected fault back through code and time to its origin. When a new feature is added, the structure tells maintenance personnel how the new feature affects existing functions. Within the structure, the invention provides mechanisms for handling reference counters and software locks. Groups of resources can be handled together, the structure taking care of coordination.

17 Claims, 12 Drawing Sheets

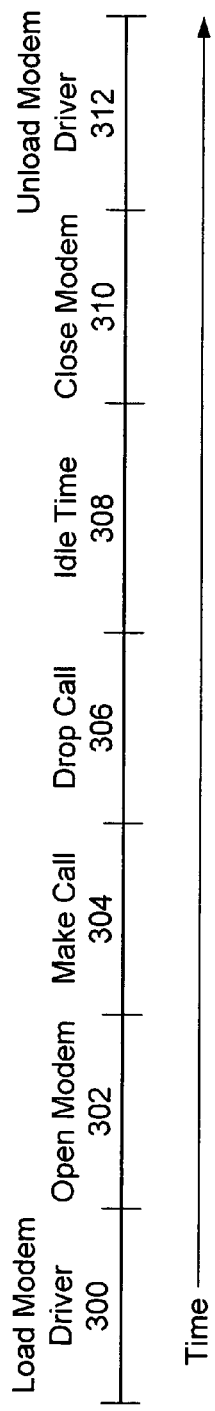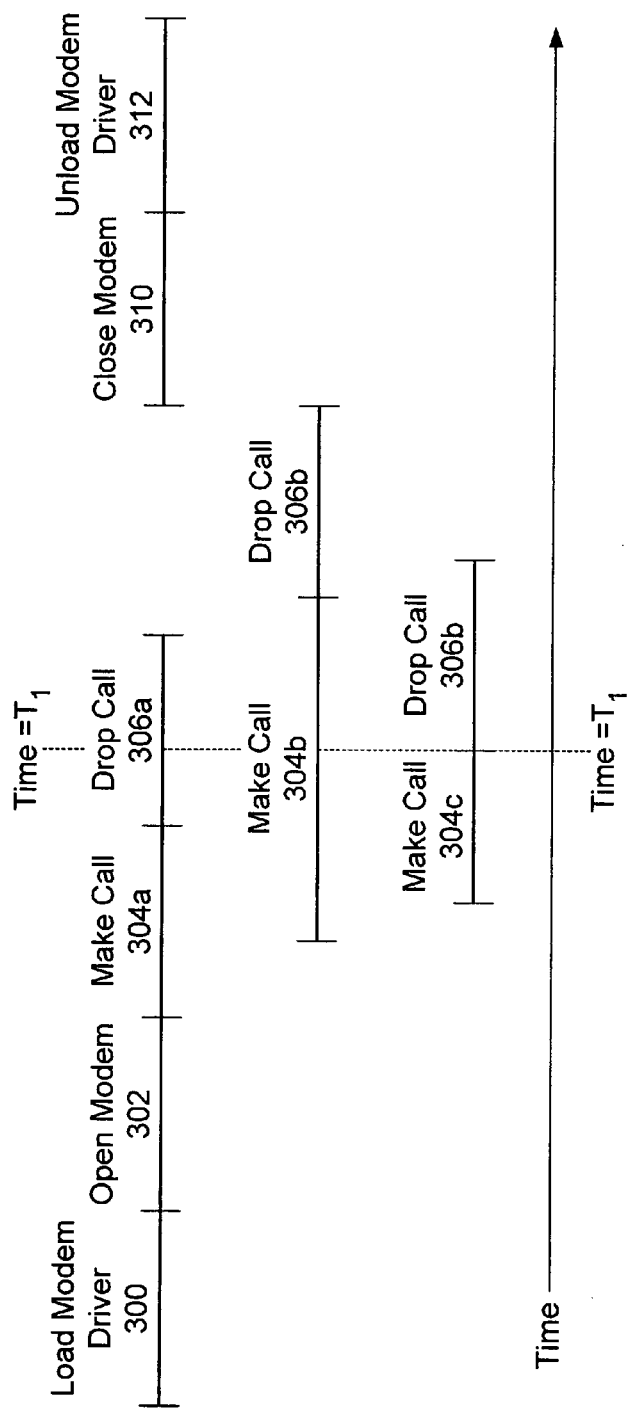

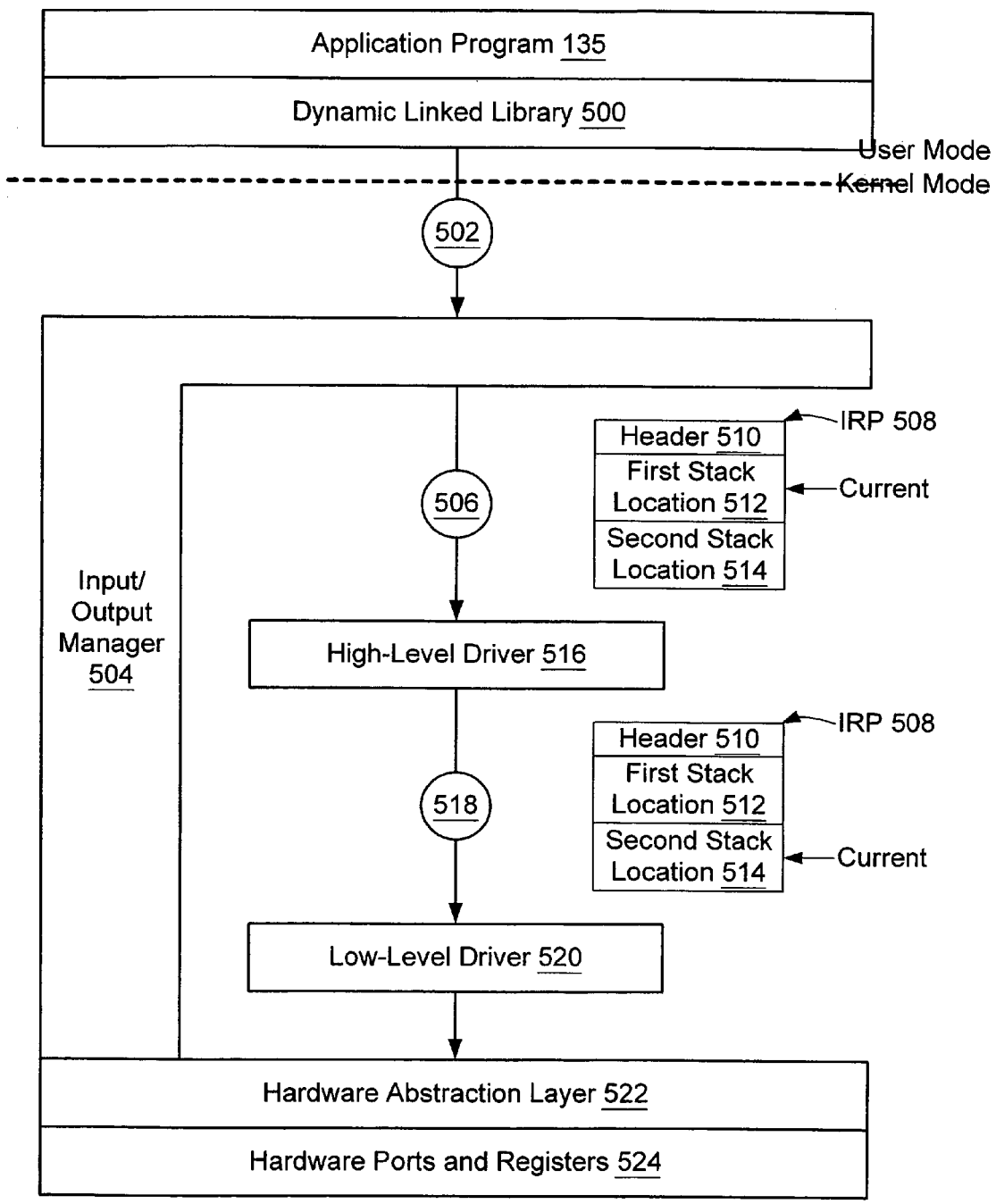

FIG. 6

```
BOOL DoCallSync(UINT ModemNo, TCHAR *tszDialString)
{
        HMODEM          hModem;
        HCALL           hCall;
        STATUS          Status;

LoadDriver();
        Status = OpenModem(ModemNo, NULL, NULL, &hModem);
        if(Status == SUCCESS)
        {
                Status = MakeCall(hModem, tszDialString, NULL, &hCall);
                if(Status == SUCCESS)
                {
                        DropCall(hCall);
                }

CloseModem(hModem);
        }

UnloadDriver();
        return Status == SUCCESS;
}
```

FIG. 10

```
VOID DoCallAsync
(
    UINT                    ModemNo,
    TCHAR                   *tszDialString,
    PFN_COMPLETION_HANDLER  pfnCompletionHandler,
    PVOID                   pvCompletionContext
)
{
    APE_DECLARE_STACK_RECORD(SR, pSR, 0xf7fe39d2)
    PDOCALL_TASK    pTask;

pTask =
        AllocateDoCallTask
        (
            ModemNo, tszDialString, pfnCompletionHandler,
            pvCompletionContext, pSR
        );
    if(pTask == NULL)
    {
        // Failed to allocate task.  Call completion handler.
        pfnCompletionHandler(pvCompletionContext, FALSE);
    }
    else  // Start the task just allocated.  The task does the actual work.
        ApeStartTask(&pTask->TskHdr, 0x5c5d5ba9, pSR);
}
```

FIG. 11

```
VOID DoCallTask
(
    IN      PAPE_TASK               pTask,
    IN      PAPE_STACK_RECORD       pSR
)
{
    ...
    pState = &pDoCallTask->TskHdr.Hdr.UserState;
    switch(*pState)
    {
        case START:
            //Load the modem driver. This is a synchronous call.
            MdmLoadDriver();

// Open the modem. This is an asynchronous call.
            MdmStatus =
                MdmOpenModem
                (
                    pDoCallTask->ModemNo,
                    ModemCompletionHandler, pDoCallTask,
                    &pDoCallTask->hModem
                );
            if(MdmStatus == MDM_STATUS_PENDING)
            {
                // Suspend this task and resume when
                // MdmOpenModem() completes asynchronously.
                *pState = OPENMODEM;
                ApeSuspendTask(pTask, pSR);
                break;
            }
            else // Save the return status here.
                pDoCallTask->AsyncMdmStatus = MdmStatus;

// Fall through on synchronous completion.
        case OPENMODEM:
            ...
    }
}
```

TRACKING ASYNCHRONOUS EXECUTION OF PROGRAM USING HIERARCHICAL STRUCTURE OF OBJECTS

This application is a continuation of prior application Ser. No. 09/718,567, filed Nov. 22, 2000, entitled METHODS AND SYSTEMS FOR STRUCTURING ASYNCHRONOUS PROCESSES, which application is incorporated herein by reference.

TECHNICAL FIELD

The present invention relates generally to computer programming, and, more particularly, to structures and debugging aids for asynchronous processes.

BACKGROUND OF THE INVENTION

Software programs that handle complex tasks often reflect that complexity in their internal structures and in their interactions with other programs and events in their environment. Subtle errors may arise from mismatches between one part of the program and other parts of the same program, or between the program and the other programs in the environment. Mismatches include unexpected events, unplanned for sequences of events, data values outside the range of normalcy, updated behavior of one program not matched by updates in its peers, etc.

Software developers and debuggers try to control program complexity in order to avoid or to fix these subtle errors. Sometimes developers control complexity by developing their programs according to the "synchronous" model of programming. A synchronous program proceeds through the steps of its task in a predictable fashion. The program may consist of a complicated hierarchy of functions with many types of interactions, but at every stage in the program, the developer and the debugger know what has happened already and what will happen next. The program's structure is imposed on it by the developer, and the program does not veer from that structure. Once the structure is understood, the debugger can use it to narrow down the areas in the code where an error may be hidden. The structure also makes the program repeatable. The debugger can run through test scenarios over and over again, each time refining the results produced by the previous run. The debugger quickly focuses on one small part of the program, thus limiting the complexity of debugging. The structure also simplifies the testing of an attempted fix because the structure limits how far effects of the fix can propagate.

Many programs, however, cannot be written according to the synchronous model. Typically, these "asynchronous" programs respond to events beyond their control. Because events may happen at any time and in any order, the program's progression is unpredictable. An asynchronous program builds its structure contingently, that is, the structure at any given time depends upon the history of events that have already occurred. That history can, in turn, alter the program's response to events yet to occur.

Run twice, there is no expectation that the program will run in an identical manner to produce identical results. Debuggers have a much harder time because they cannot rely on a structure pre-imposed by the developer to help them narrow their bug search. Debuggers must instead consider all possible structures that the program may create contingently and must consider the program's reaction to all possible events and to all sequences of events. The debuggers also cannot expect that each test run will be a simple refinement of the previous run.

For all practical purposes, test results may be irreproducible. Even once a fault is found, a change made in an attempt to correct the fault is difficult to test because the effects of the change can propagate throughout the program and beyond into the program's environment. As with fixes, so with new features added to an existing asynchronous program: maintenance personnel adding a new feature find it difficult to verify that the feature works correctly in all situations and that the new feature does not "break" some aspect of existing functionality.

Lacking a predefined structure, asynchronous programs need to use several mechanisms for communication and control among the subtasks that make up the program. A software object contains a reference counter that records how many subtasks need the information in that object. The software object is deleted when, and only when, the reference counter goes to zero. Software locks prevent one subtask from altering a data store while another subtask is processing data in that store. However, there is often no central arbiter of reference counters and software locks. Coding faults can easily lead to miscounting or misapplication of locks, leading to data loss and "deadlock" or "race" conditions in which the asynchronous program stops working effectively while separate subtasks wait for each other to complete or to release data.

Microsoft's "WINDOWS" Development Model takes a first step at capturing the structure of asynchronous processes. Data passing between applications and layered protocol drivers are kept in Input/Output Request Packets (IRPs). The structure of an IRP's header allows each protocol driver in the stack to record information about its processing of the IRP. Thus by examining the IRP's header, a debugger can determine the IRP's history and present state, including which protocol driver is currently processing it. However, this mechanism is limited because the sequence of protocol drivers invoked must be predicted in advance and because the IRP contains no information about the inner workings of each protocol driver.

What is needed is a way to capture the structure of an asynchronous program as it develops from the program's interactions with other programs and with events in its environment.

SUMMARY OF THE INVENTION

The above problems and shortcomings, and others, are addressed by the present invention, which can be understood by referring to the specification, drawings, and claims. The invention builds a structure of software objects that captures the historically contingent development of an asynchronous program. The structure records the program's development but does not impose limits on that development. Specifically, the invention can build software objects that represent the resources and subtasks that make up the asynchronous program. The objects are connected into a hierarchy whose structure explicates the interactions among the resources and subtasks.

Developers using the invention may partition their programs into a hierarchy of small subtasks. The smallness of the subtasks makes debugging and maintaining them easier than debugging and maintaining the larger program. The structure of the hierarchy of subtasks built by the invention provides many of the debugging and maintenance advantages of synchronous programs. When a fault is detected, the structure tells the debugger everything that the program was doing at the time of the fault and lays open the developmental history of the program that led to the fault. The debugger may use this information to trace the detected fault back through code and time to its origin. When a new feature is added, the structure tells maintenance personnel exactly how the new feature affects existing functions.

Within the structure, the invention provides mechanisms for handling reference counters and software locks. When these are implemented with reference to the program structure, the chance of miscounting or misapplication is lessened.

The structure gives the developer the freedom to implement more complicated interactions than would have been feasible earlier. Whole groups of subtasks or software objects can be handled together, the structure taking care of coordination tasks.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4A is a time-flow diagram showing how the synchronous tasks of FIG. 3A interact;

FIG. 4B is a time-flow diagram showing how the asynchronous tasks of FIG. 3B interact;

FIG. 5 is a block diagram showing how an Input/Output Request Packet can capture some of the structure of an asynchronous communications request;

FIG. 6 is a code diagram showing a synchronous program that implements the tasks of FIG. 3A;

FIG. 10 is a code diagram showing an asynchronous program that implements the tasks of FIG. 3B; and FIG. 11 is a code diagram showing a portion of the task handler associated with the asynchronous program shown in FIG. 10.

DETAILED DESCRIPTION OF THE INVENTION

Figure 1:
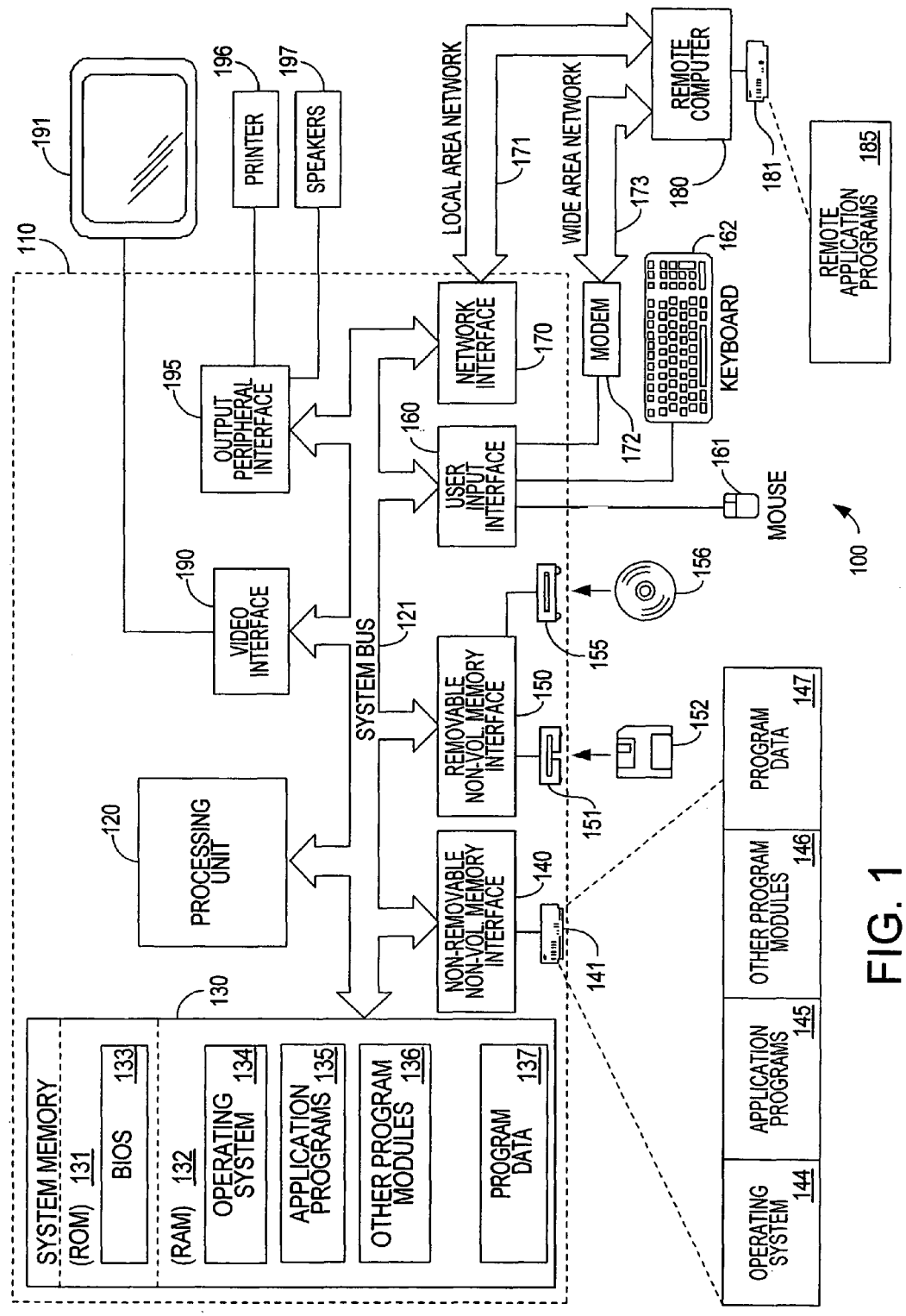
FIG. 1 is a block diagram generally illustrating an exemplary computer system that may support the present invention.

Turning to the drawings, wherein like reference numerals refer to like elements, the invention is illustrated as being implemented in a suitable computing environment. The following description is based on possible embodiments of the invention and should not be taken as limiting the invention in any way. The first section presents an exemplary hardware and operating environment in which the present invention may be practiced. Section II presents synchronous and asynchronous processing and highlights the differences between them. Section III describes how Input/Output Request Packets can be used to capture some of the structure of an asynchronous process. Sections IV through VII describe the Asynchronous Processing Environment (APE), an implementation of the present invention, showing how it captures the structure of an asynchronous process, counts object references, allows a group of objects to be treated as a group, and controls software locks. Debug associations are described in Section VIII. Appendix I contains the complete source code for the asynchronous program highlighted in FIGS. 10 and 11. Appendix II presents internal implementation details of APE.

I. Overview of a General-Purpose Computer

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include volatile/nonvolatile and removable/non-removable media. By way of example, and not limitation, computer-readable media may include computer storage media and communications media. Computer storage media include volatile/nonvolatile and removable/non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to application programs 135 by way of one or more application programming interfaces (APIs) (not shown). Because the operating system 134 incorporates these services, developers of application programs 135 need not redevelop code to use the services. Examples of APIs provided by operating systems such as Microsoft's "WINDOWS" are well-known in the art.

The computer 110 may also include other removable/non-removable, volatile/nonvolatile computer storage media. By way of example only, FIG. 1 illustrates a hard disk drive 141 that reads from and writes to non-removable, nonvolatile magnetic media, a magnetic disk drive 151 that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface such, as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user input interface 160 that is coupled to the system bus, but may be connected by other interface and bus structures, such as a parallel port, game port, or a Universal Serial Bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computer 110, or portions thereof, So may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

II. Synchronous and Asynchronous Processes

Sections IV through VIII describe how the present invention controls the complexity of asynchronous processes. This section introduces synchronous and asynchronous processing and explains the differences between them using an example that reappears in latter sections. The example portrays a system for placing telephone calls. This illustrative system is greatly simplified from actual telephony systems so that the focus of discussion can remain on the underlying processing models.

Figure 2:
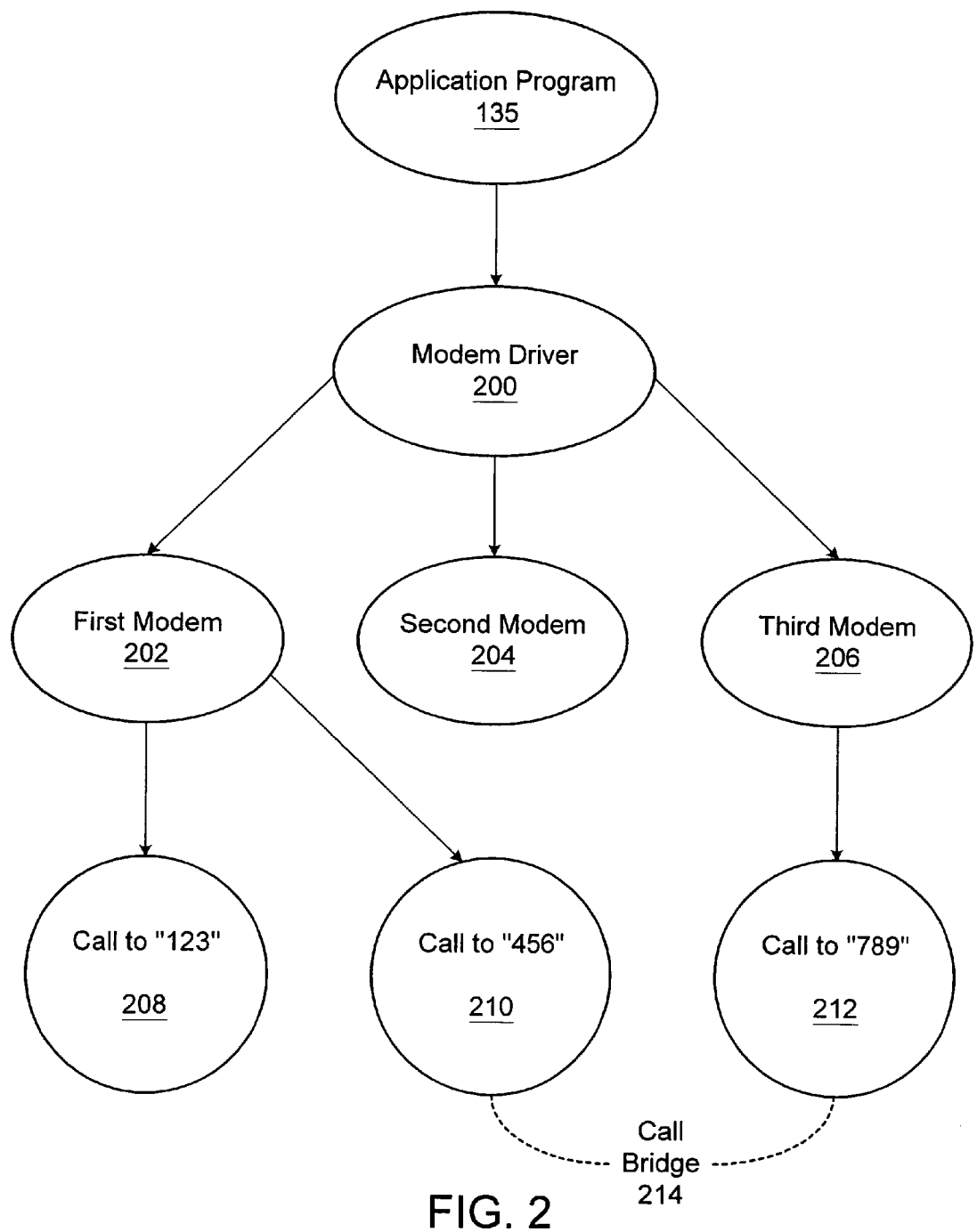
FIG. 2 is a control diagram showing high-level interactions among components of a simple computer telephony system.

FIG. 2 is a control diagram showing high-level interactions among components of a simple computer telephony system. The modem driver 200 provides telephony services to the user application program 135. To do so, the modem driver controls modems 202, 204, and 206. When the user wishes to place a telephone call, the modem driver selects an available modem and instructs the modem to place the call. In the Figure, a first modem 202 is currently supporting two calls 208 and 210. A third modem 206 supports one call 212 while a second modem 204 stands idle. Two of the calls 210 and 212 are bridged together 214.

Figure 3A:
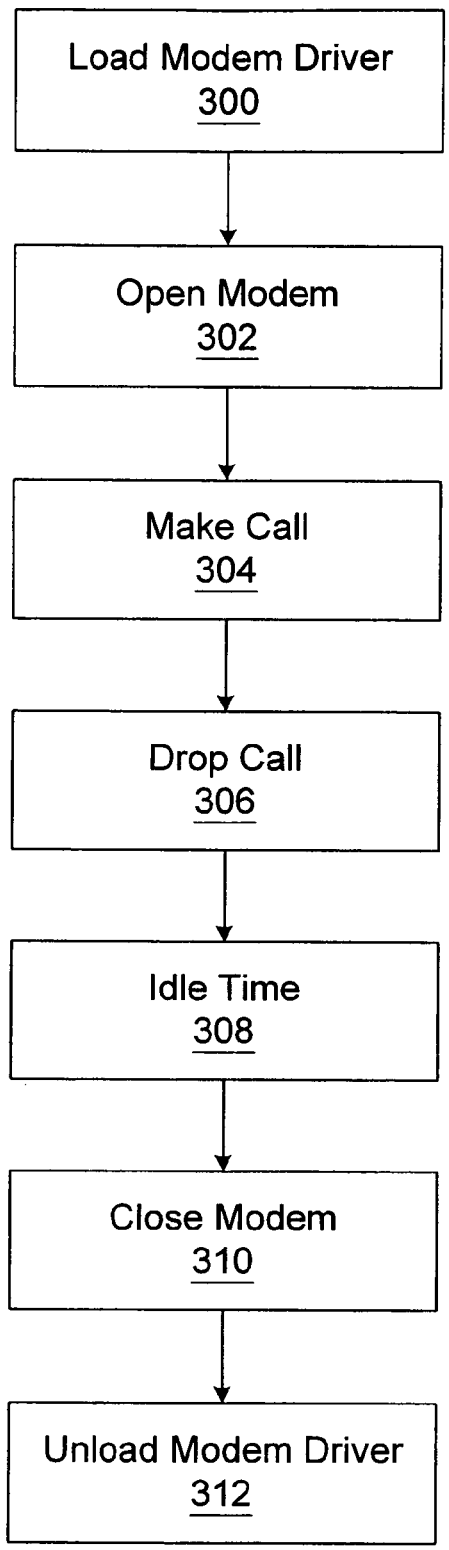
FIG. 3A is a flowchart showing how tasks may be used in a synchronous computing environment to implement the computer telephony system of FIG. 2.

FIG. 3A is a flowchart showing how tasks may be used in a synchronous computing environment to implement the computer telephony system of FIG. 2. Before the application program 135 can use the services of the telephony system, the modem driver 200 is loaded and initialized 300. When the user indicates that he wishes to place a call by removing the telephone handset from its cradle, the modem driver opens an available modem 302 and instructs it to place the call 304. When the user terminates the call by hanging up the handset, the resources associated with the call are released 306. Having completed the call, the system waits for another request 308. Eventually, the modem driver closes the modem 310 and the operating system may unload the modem driver 312.

The important lesson of FIG. 3A is the orderly, linear flow of tasks that characterizes synchronous processing. The telephony system works on one task until that task is completed, then the system takes up another task and works on it until that task is completed, and so on. At no time is the system working on more than one task. This single-mindedness eases debugging and testing as it is always clear exactly what the application is trying to do at any time. However, this same single-mindedness means that it would be very difficult for the synchronous system of FIG. 3A to provide all of the functions illustrated in FIG. 2. The first modem 202 would not be able to support a second call 210 until the first call 208 completed. Similarly, the modem driver 200 could not support two calls at the same time and so could not bridge calls 210 and 212.

Figure 3B:
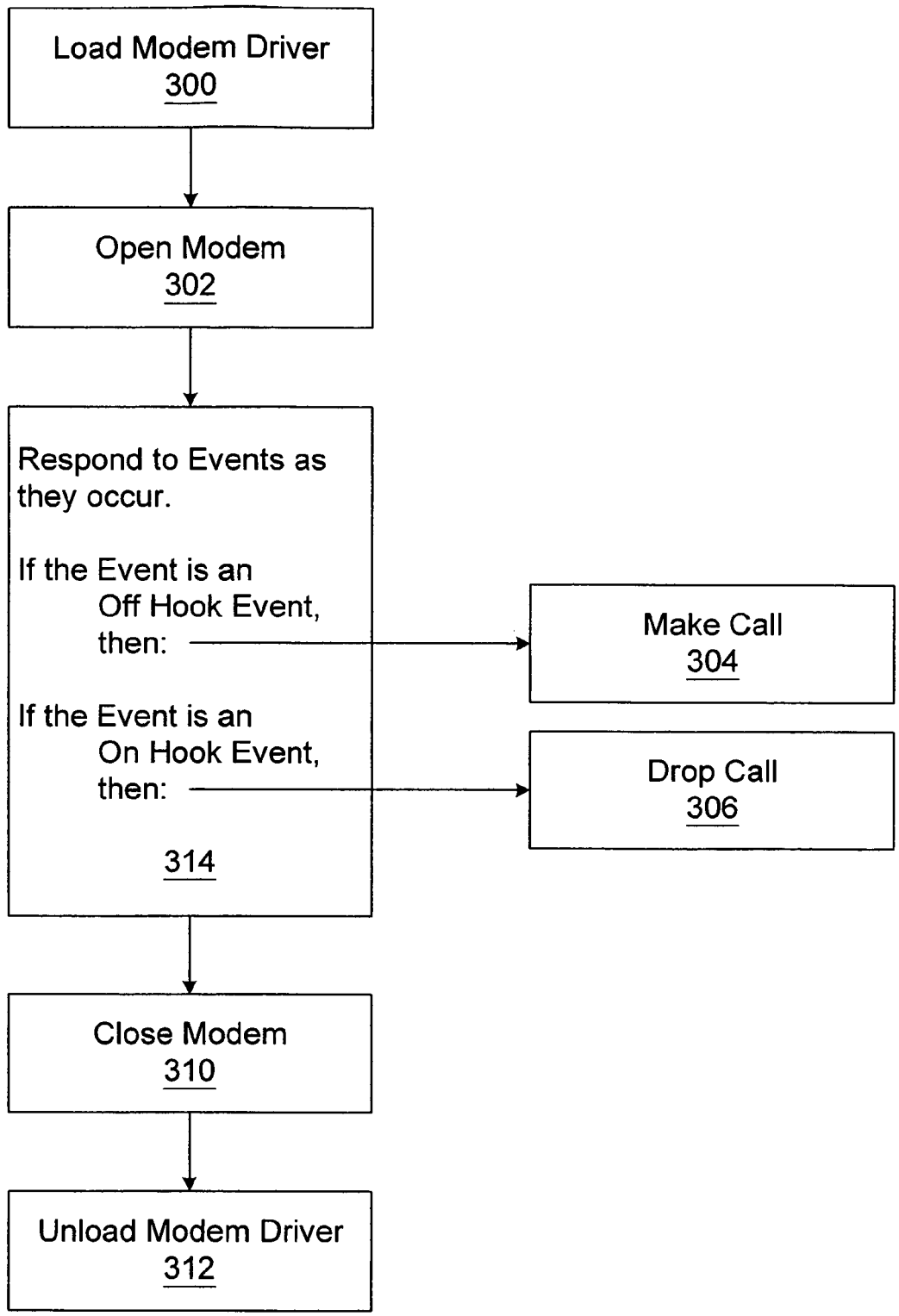
FIG. 3B is a flowchart showing how tasks may be used in an asynchronous computing environment to implement the computer telephony system of FIG. 2.

By way of contrast with FIG. 3A, FIG. 3B is a flowchart showing how tasks may be used in an asynchronous computing environment to implement the computer telephony system of FIG. 2. The asynchronous processing begins and ends in the same manner as does the synchronous process. At the beginning of the process, the modem driver is loaded 300 and an available modem is opened 302. When all work has been completed, the modem is closed 310 and the modem driver unloaded 312. However, the processing between opening and closing the modem differs significantly from the synchronous model of FIG. 3A. The asynchronous model replaces the synchronous model's orderly, linear structure of task 306 following the completion of task 304 with an "event response loop" 314. Just as in the synchronous model, when the user indicates that he wishes to place a call by removing the telephone handset from its cradle, the system places the call 304. When the user hangs up, the system drops the call 306. Unlike in the synchronous model, however, the event response loop allows the asynchronous system to take up another task before the first call completes. When the process to place a call 304 is called in the asynchronous model, it returns control to the event response loop while the call is in progress. Thereafter, the task 304 runs in parallel with the event response loop. This means that the first modem 202 can place one call 208 and still be available to place another call 210 while the first call remains in progress. The modem driver 200 can support multiple in-progress calls and can bridge calls together into a conference call.

FIGS. 4A and 4B clarify the structural distinction between the synchronous and asynchronous models. The Figures map task activity against time. FIG. 4A is a time-flow diagram showing how the synchronous tasks of FIG. 3A interact. As time progresses toward the right side of the Figure, task succeeds task, each subsequent task beginning at the completion of the task before it.

FIG. 4B is a time-flow diagram showing how the asynchronous tasks of FIG. 3B interact. Multiple calls may be in progress simultaneously because a task need not wait to begin until its predecessor task completes. In the Figure, a task 304a represents a first call in progress. Before that call completes, another call 304b begins. By the time $T_1$ marked on the Figure, the first call has completed and its resources are being released 306a, the second call is still in progress 304b, and a third call 304c has completed and the task of releasing its resources is just beginning. In this model, the task that closes down the modem 310 cannot complete until all the calls placed by that modem are complete.

FIGS. 4A and 4B show why the asynchronous processing model is more flexible than the synchronous model. A comparison of these two Figures also shows why applications using the asynchronous model are more expensive to develop, debug, and maintain. At any one point in time in FIG. 4A, only one task is running. In FIG. 4B, many tasks may be running simultaneously. In addition, because the tasks may start and end in response to events outside the telephony system itself, the number and type of tasks running at any one time is not predictable. The asynchronous application builds its task structure contingently, that is, in response to external events and therefore unpredictably. Neither the original programmer nor subsequent debuggers and maintenance personnel can easily tell what is going on in the application at any one time nor how the application's task structure develops in time. The flexibility of the asynchronous model has traditionally been purchased at the cost of an increase in structural complexity and a loss of clarity in how that structure develops.

The foregoing comparison between the synchronous and asynchronous processing models is intentionally stylized to highlight the differences between the two. Realistically, many processes are implemented using a combination of synchronous and asynchronous methods, the asynchronous methods used when the expected payoff of improved performance exceeds the expected increase in development and maintenance costs. Despite the stylization of the comparison, the differences between the models are nonetheless real. Sections IV through VIII describe how the present invention decreases the costs of asynchronous programming while maintaining its benefits.

III. Using IRPs to Capture the Structure of an Asynchronous Communications Request One way to control the complexity of asynchronous processing is to capture the structure of a process as it develops.

Microsoft's "WINDOWS" Development Model takes a first step at capturing that structure by its use of Input/Output Request Packets (IRPs). FIG. 5 is a block diagram showing how an IRP can capture some of the structure of an asynchronous communications request.

When an application program 135 needs to communicate, it relies on services provided by a Dynamic Linked Library (DLL) 500. The application program calls a DLL routine to perform the communications request. In step 502, the DLL routine formats the request and passes it to the Input/Output Manager (IOM) 504.

The IOM 504 coordinates the disparate elements in the hierarchy of drivers shown in FIG. 5. In step 506, the IOM creates an IRP 508 that captures the details of the application program's communications request. The IRP contains stack locations 512 and 514, one for each driver that will use the IRP. For each driver, its stack location contains the information that the driver needs to process the IRP. When the IOM creates the IRP, it populates the first stack location 512 before passing the IRP to the high-level driver 516.

Each driver in the stack processes the IRP 508 to the extent that it is able, populates the IRP stack location for the next driver lower in the stack, and then passes the IRP along to that driver. FIG. 5 shows a high-level driver 516 and a low-level driver 520 but there may be more or fewer drivers involved in servicing a particular communications request.

The Hardware Abstraction Layer 522 provides a bridge between logical communications functions and the implementation details of particular hardware platforms. A communications request is typically completed by hardware 524 effecting changes in the physical world.

The IRP captures in broad outline the structure of the processes that have affected it. The IRP's header 510 allows each driver in the stack to record information about its processing of the IRP. Testing and debugging personnel can examine the IRP's header and determine the IRP's history and present state, including which protocol driver is currently processing it.

While useful in its particular application, the IRP does not provide a mechanism for capturing and controlling the structure of an arbitrary asynchronous process. Its use is restricted to "WINDOWS" kernel mode drivers. Also, the sequence of protocol drivers invoked must be known in advance. Finally, the IRP contains no information about the inner workings of each protocol driver.

IV. APE: Capturing the Structure of an Asynchronous Process

The present invention provides tools for capturing and manipulating the structure of an asynchronous process as it develops. Sections IV through VIII describe particular implementations of the invention and should not be taken as limiting the invention in any way. For the sake of this discussion, aspects of the present invention are loosely collected under the term APE: Asynchronous Processing Environment.

According to one aspect of the present invention, the structure of an asynchronous process is automatically captured as it develops. A complex asynchronous process may be broken down into a hierarchy of simpler tasks. The state of the asynchronous process at a given time is characterized by a hierarchical structure of software objects, where each object represents one task in the process. The captured structure can be used by developers to ensure that their code does what they want it to and by testing personnel to elucidate what the code is doing in actuality.

DoCallSync( )
One implementation of APE is illustrated by means of the same telephone support system example used in Section II. The invention is in no way restricted to telephony applications but may be used with any asynchronous process (or asynchronous portion of a larger process). FIG. 6 is a code diagram showing a synchronous program that implements the tasks of FIG. 3A. Following an explanation of some of the details of APE, FIG. 10 contrasts FIG. 6 with an APE implementation of the asynchronous tasks of FIG. 3B. A step-by-step description of the process DoCallSync( ) of FIG. 6 follows.

LoadDriver( )
The modem driver is initialized.

OpenModem( )
A modem is initialized before being used to place a call.
Arguments:
ModemNo
A number that identifies which modem to open.
CompletionHandler
A function called to complete the work of an asynchronous function. Completion handlers allow the original function (here, OpenModem( )) to return control to its parent process before its work is complete. The actual work is performed in the completion handler, possibly after the original function has returned. Because DoCallSync( ) illustrates synchronous processing, this argument is not used in this example.
pvClientContext
An opaque context passed back to the user in the completion handler. This argument is not used in this example.
phModem
A handle to the opened modem.
Return Values:
SUCCESS if the function succeeds synchronously.
FAILURE if the function fails synchronously.
PENDING if the function will complete asynchronously. The completion handler will be called to perform the actual work. This result cannot occur in the synchronous processing of DoCallSync( ).

MakeCall( )
A call is placed on the previously opened modem.
Arguments:
hModem
The handle to the open modem, returned by OpenModem( ).
tszDialString
The destination to call.
pvClientContext
Unused in this example.
phCall
A handle to the call in progress.

DropCall( )
The open call is dropped.
Arguments:
hCall
The handle to the call in progress, returned by MakeCall( ).

CloseModem( )
The previously opened modem is closed. This function may only be called when there are no open calls on this modem.
Arguments:
hModem
The handle to the open modem, returned by OpenModem( ).

UnloadDriver( )
    Unload the modem driver. This function may only be called when there are no open modems.

The example of FIG. 6 is limited by its adherence to the synchronous processing model. From Section II, some of those limitations are: a modem cannot support a second call until the first call completes, and the modem driver cannot support two calls at the same time and so cannot bridge calls.

FIG. 10 shows how APE can be used in an asynchronous processing model to remove the limitations of FIG. 6's synchronous model. Before getting to that Figure, however, some details of this APE implementation are explained. Those details are APE Objects, APE Tasks, APE Stack Records, and APE Location Identifiers.

APE Objects

APE objects are user-defined data structures. Typically, these structures correspond to "control blocks" and keep the state of user-specific resources for as long as those resources exist in an asynchronous processing system. For example, an APE object can be defined to correspond to each entity in FIG. 2: for the modem driver 200, for each modem 202 through 206, for each call 208 through 212, and for the call bridge 214. Each APE user may define the meaning of his own APE objects. A socket application may keep the state of each open TCP/IP connection in a separate APE object. A protocol driver may define an APE object for every network adapter to which it is bound, an APE object for each client, and an APE object for each binding from a specific client to a specific network adapter.

APE objects share a common header of type APE_OBJECT. The header includes an object reference counter, a pointer to the object's parent object, and a pointer to a deletion function. The header may be followed by user-specific data, as in this example of an APE object for a telephone call:

```
typedef struct
{
    APE_OBJECT  Header;          // Header used in all APE objects.
    HCALL       hCall;           // Handle to the call when it is in
                                 progress.
    TCHAR       *tszDialString;  // Identifies the called party.
} CALL;
```

APE uses the fields in the header to manage the life of APE objects. It attempts to minimize the need for the user to explicitly count object references, make it difficult for the user to introduce reference counting errors, and make it easier to track down reference counting errors when they occur. In order to minimize explicit object reference counting, APE requires that users organize their APE objects in the form of a hierarchical tree structure. The header's parent object pointer is set when the APE object is initialized, so the user need not explicitly reference the parent when creating children (or de-reference the parent when children are deleted).

Figure 7:
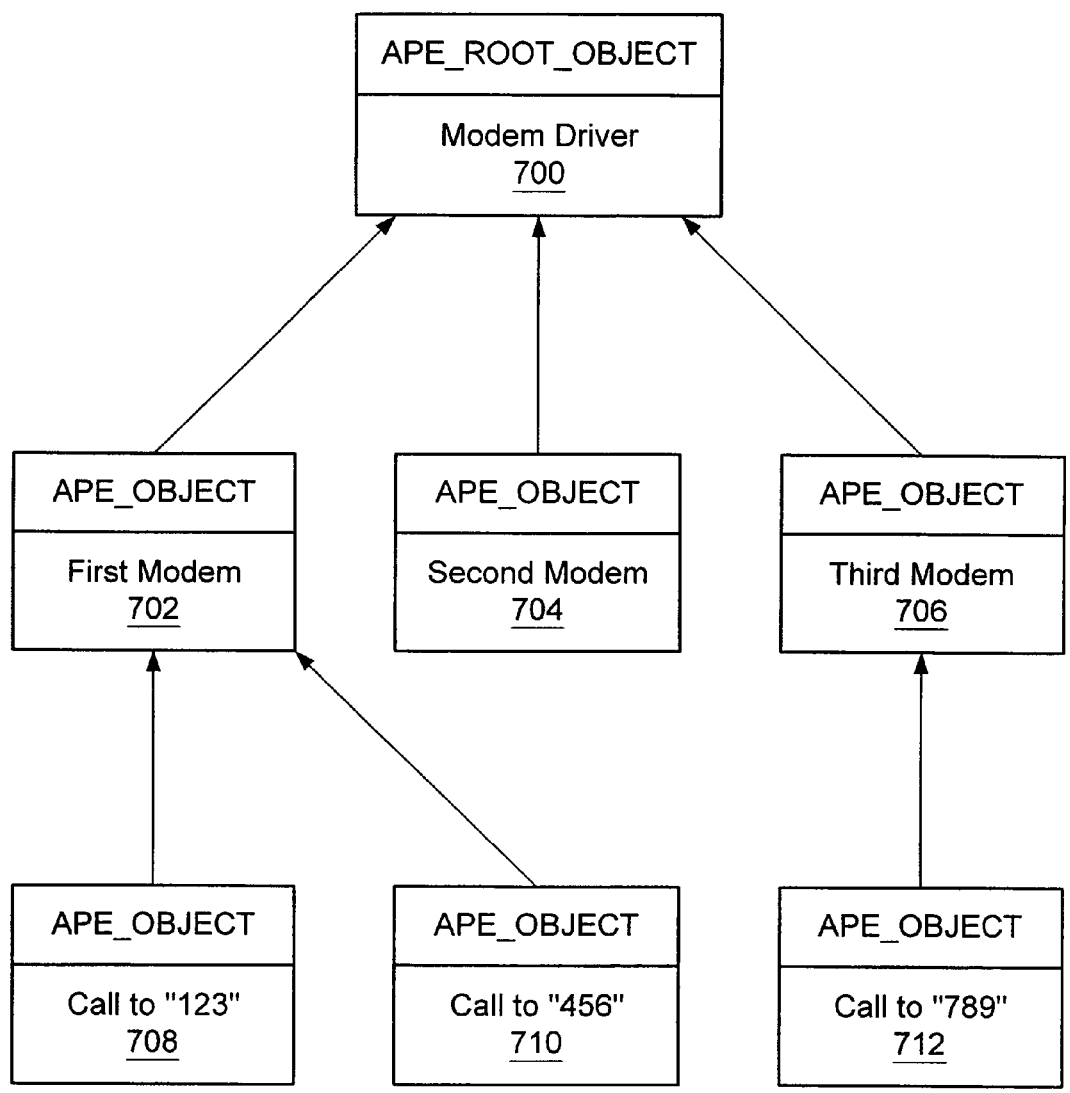
FIG. 7 is a data structure diagram showing one possible tree of Asynchronous Processing Environment (APE) objects that correspond to the components of the computer telephony system of FIG. 2.

Each user decides how to organize his APE object tree. The organization may follow a natural hierarchy among control blocks. For example, an organization emerges for APE objects that correspond to the components of FIG. 2: the modem driver object is at the root of the tree, and it has modem objects as its children. Call objects are the children of their corresponding modem objects. FIG. 7 is a data structure diagram showing one possible tree of APE objects (700, 702, 704, 706, 708, 710 and 712) that correspond to the components of the computer telephony system of FIG. 2. (APE_ROOT_OBJECT 700 is an extension of APE_OBJECT and is described below.) In other cases, there may be no natural hierarchy for the user's objects. The user must nevertheless pick a hierarchy even if the user can do no better than creating a single global root object and initializing all other APE objects as children of the root object.

For performance reasons, APE need not provide a pointer from a parent object to its children. (This is why the arrows in FIG. 7 point toward the parents.) Pointers to children may be provided as an option for diagnostic purposes.

An APE object is typically (exceptions are described below) initialized by calling ApeInitializeObject( ), which has the following prototype:

```
VOID ApeInitializeObject
(
    OUT  PAPE_OBJECT        pObject,
    IN   PAPE_OBJECT        pParentObject,
    IN   PAPE_STATIC_INFO   pStaticInfo,
    IN   PAPE_STACK_RECORD  pSR
);
```

The first argument points to user-supplied uninitialized memory for the APE_OBJECT structure. The second argument points to the parent of the object being initialized. (The root object in the object tree has no parent and is initialized using a different function described below.) The third argument points to a structure containing information common to all instances of this type of object. This information does not change during the lifetime of the object. The fourth argument points to the current APE "stack record" (described below).

One of the primary purposes of the APE object tree is to control how long objects live: an object is not deleted as long as it has children. The object reference counter in the header is set to one on return from ApeInitializeObject( ). APE increments the object reference counter each time a child is added to this object in the object tree, and is decremented each time a child is deleted. When the counter reaches zero, APE calls a user-supplied delete function included in APE_STATIC_INFO to delete the object.

APE provides other mechanisms to increment and decrement the object reference counter. For example, the function ApeCrossReferenceObjects( ) increments the object reference counters of two objects at the same time, logically "cross referencing" the objects. The inverse of this function is ApeDeCrossReferenceObjects( ), which de-references both objects by decrementing their object reference counters. A debugging version of ApeCrossReferenceObjects( ), called ApeCrossReferenceObjectsDebug( ), takes additional parameters that enable APE to verify that neither object was deleted until after the cross reference was removed by calling ApeDeCrossReferenceObjectsDebug( ). This helps catch cases of dangling references among objects.

Root objects are APE objects that have no parent. Typically each module that uses APE initializes a single root object, but this need not always be the case. For example, a kernel mode protocol driver might initialize one root object for each bound network adapter card.

As its header, a root object uses the structure APE_ROOT_OBJECT, an extension of APE_OBJECT. A root object includes the following, used by all objects in the APE object tree under the root object:

Locks for serializing access to APE-private data (discussed below in Section VII);
Handlers for allocating diagnostic-related structures, such as debug associations (discussed below in Section VIII);
An assertion failure handler, which is a user-supplied function that APE calls when it detects a fatal error; and A data structure for maintaining a diagnostic log.

A root object is initialized using the function ApeInitializeRootObject( ), which has the following prototype:

```
VOID ApeInitializeRootObject
(
    OUT   PAPE_ROOT_OBJECT      pRootObject,
    IN    PAPE_STATIC_INFO      pStaticInfo,
    IN    PAPE_DEBUG_ROOT_INFO  pDebugRootInfo,
    IN    PAPE_STACK_RECORD     pSR
);
```

The caller passes in an uninitialized pRootObject. Structures pStaticInfo and pDebugRootInfo contain information that remains unchanged throughout the life of the root object. The last argument points to an APE stack record. Stack records are explained below.

A root object is de-initialized after all of the children of the root have been deleted. The function ApeDeinitializeRootObject( ) specifies a completion handler that APE calls when the root object's object reference counter goes to zero.

APE Tasks

In a single-threaded, synchronous environment, program complexity is tamed by organizing the program into a hierarchy of functions. Each function concerns itself with a small logical piece of the big picture. While working on this piece, partial results are maintained in local variables, hidden from the rest of the program. Utility functions that solve a particular kind of subproblem may be called from several places.

Unfortunately, this technique is not easily used in an asynchronous environment. The stack needs to unwind after every operation that completes asynchronously, so context must be preserving in data structures that persist until the operation completes. When the operation completes, the context needs to be retrieved from these data structures and processing resumed. Thus, even if there is a logical way to split a complex operation into a hierarchy of subtasks, those tasks cannot simply be mapped into a corresponding function hierarchy.

APE provides task objects to represent asynchronous operations within a program. Tasks are analogous to functions in a single-threaded, synchronous programming environment. They are designed with the following goals in mind:

Allow a complex, asynchronous operation to be implemented as a hierarchical set of simpler operations;

Provide common code and a programming model for delaying an operation until another operation completes, and for keeping objects alive as long as an operation involving them is in progress;

Allow a transient state associated with an operation to be stored in the task object associated with the operation; and Provide debugging support for listing outstanding tasks associated with a particular object, for maintaining a task-specific debugging log, for listing events that have happened in the context of the particular task, for listing tasks that are waiting for a particular task to complete, and for identifying the tasks, objects, or groups on which the current task is waiting, if any. (Groups are discussed in Section VI).

APE tasks are APE objects and are therefore part of the APE object tree. Each task keeps track of a pending user-defined asynchronous operation. Tasks are transient in nature, living only as long as the asynchronous operations they represent are active. Tasks have extended APE_OBJECT headers, of type APE_TASK. The APE_TASK structure keeps the state associated with the asynchronous operation.

Figure 8:
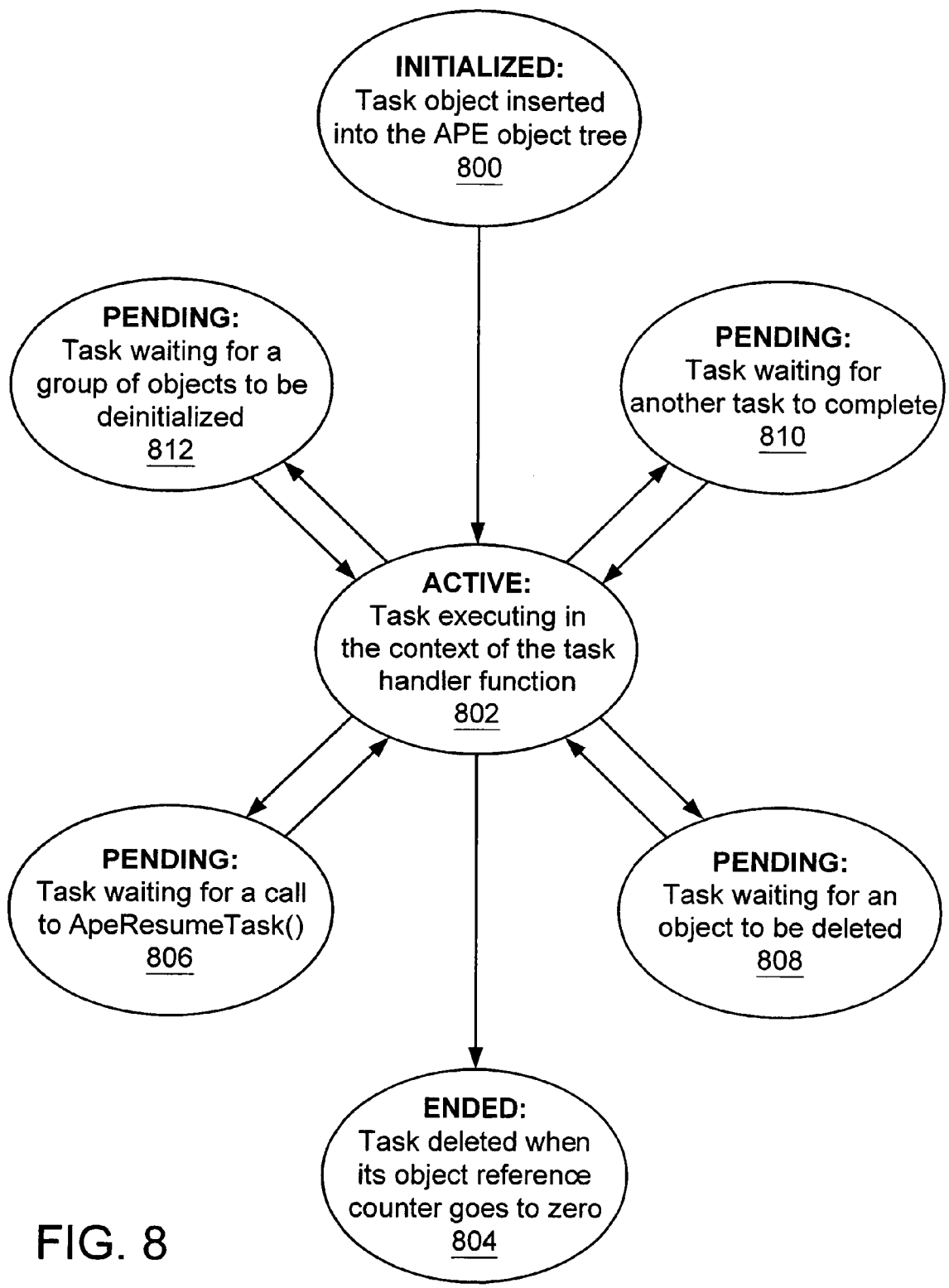
FIG. 8 is a state diagram illustrating the lifetime of an APE task object.

FIG. 8 is a state diagram illustrating the lifetime of an APE task object. Tasks begin their life when ApeInitializeTask( ) is called.

```
VOID ApeInitializeTask
(
    OUT   PAPE_TASK             pTask,
    IN    PAPE_OBJECT           pParentObject,
    IN    APE_PFN_TASK_HANDLER  pfnHandler,
    IN    PAPE_STATIC_INFO      pStaticInfo,
    IN    UINT                  Flags,
    IN    PAPE_STACK RECORD     pSR
);
```

The first argument is a pointer to an uninitialized APE_TASK structure. The second argument, pParentObject, points to the intended parent of this task object. The third argument is a user-supplied task handler function. The task handler function is responsible for actually carrying out the asynchronous operations associated with the task. ApeInitializeTask( ) initializes the supplied APE_TASK structure and inserts the task into the APE object tree as a child of the specified parent (800).

The task starts executing when the user calls ApeStartTask( ). ApeStartTask( ) calls the user-supplied task handler (call it TaskHandler( )). The task is now in the ACTIVE state 802. At this point, the call stack is as follows:

```
ApeStartTask( )
    TaskHandler( )
```

The task handler executes user-defined functionality and then returns. ApeStartTask( ) considers the task complete (the ENDED state 804) when the task handler returns unless the task handler has called one of the following functions before returning: ApeSuspendTask( ), ApePendTaskOnOtherTask( ), ApePendTaskOnObjectDeletion( ), or ApeDeinitializeGroup( ). The task handler calls one of these functions if it needs to defer further processing until some later time or in a different context. For example, if TaskHandler( ) needs to call the function MakeCall( ), it first calls ApeSuspendTask( ). The call stack becomes:

```
ApeStartTask( )
    TaskHandler( )
        ApeSuspendTask( )
```

ApeSuspendTask( ) sets the task state to PENDING 806 before returning. TaskHandler( ) then calls MakeCall( ). The call stack becomes:

```
ApeStartTask( )
    TaskHandler( )
        MakeCall( )
TaskHandler( ) then returns.
```

The suspended task resumes in a different context. The context depends upon which APE function was used to suspend the task. For ApeSuspendTask( ), the task resumes when the user explicitly calls ApeResumeTask( ). This may be in the context of the completion handler of an asynchronous function. For ApePendTaskOnOtherTask( ), the task resumes when the specified other task completes. If the task was suspended by calling ApePendTaskOnObjectDeletion( ), the task resumes when the specified object is deleted. Finally, for ApeDeinitializeGroup( ) the task resumes when a group of objects has been emptied out and de-initialized. (Groups are discussed in Section VI.)

APE resumes a task simply by setting the task's state to ACTIVE and then calling the task's user-supplied task handler. Continuing with the example above, TaskHandler( ) returns after calling ApeSuspendTask( ) and MakeCall( ), leaving the task in the PENDING state 806. When Make Call( ) completes, the modem driver calls the user-defined completion handler for this operation (call it Make-CallCompletionHandler( )). MakeCallCompletionHandler( ) then calls ApeResumeTask( ) to resume the previously suspended task. ApeResumeTask( ) calls TaskHandler( ). The call stack is as follows:

```
MakeCallCompletionHandler( )
    ApeResumeTask( )
        TaskHandler( )
```

TaskHandler( ) is ACTIVE once again, having completed the asynchronous operation of making a modem call. TaskHandler( ) may continue its user-defined processing which may include calling another asynchronous operation. Assume that TaskHandler( ) needs to defer further processing until a particular APE object is deleted. To do this, TaskHandler( ) simply calls ApePendTaskOnObjectDeletion( ) before returning. The call stack, before returning from ApePendTaskOnObjectDeletion( ), is:

```
MakeCallCompletionHandler( )
    ApeResumeTask( )
        TaskHandler( )
            ApePendTaskOnObjectDeletion( )
```

ApePendTaskOnObjectDeletion( ) sets the task state to PENDING 808 before returning and the stack unwinds back into the function within the modem driver that initiated the callback. When the specified APE object is deleted, APE resumes the task by calling TaskHandler( ). The task returns to the ACTIVE state 802.

The task enters the ENDED state 804 when its task handler returns without calling one of the above pending functions. Once a task T reaches the ENDED state, APE resumes any tasks pending on T. These tasks specified T as the "other task" in calls to ApePendTaskOnOtherTask( ). APE deletes the task when it reaches the ENDED state and when there are no longer any references to it. When APE deletes a task, its task object is removed from the APE object tree.

In sum, tasks live as long as they are either executing in the context of their task handler (ACTIVE state 802) or are pending on some asynchronous event (one of the PENDING states 806 through 812). A task can switch back and forth between ACTIVE and PENDING until its task handler finally returns with the task still in the ACTIVE state (that is, without first calling one of the APE functions that switch it to a PENDING state). When this happens, APE puts the task in the ENDED state. A task in the ENDED state is deleted by APE when there are no references to it.

A task may also pend on another task. The former task is resumed when the latter task completes. This facility may be used to structure a complex, asynchronous program into a hierarchy of simpler, asynchronous operations, each represented by a task. Assume a program needs to perform the following two complex modem operations: make two modem calls and bridge them together, and close down all active bridged calls. The program may be implemented as two high-level tasks which correspond to the complex modem operations. The high-level tasks use the services of four low-level, asynchronous modem tasks: ModemMakeCall( ), ModemDropCall( ), ModemBridgeCall( ), and ModemUnbridgeCall( ).

This is a hypothetical dump of the list of outstanding tasks while some of the operations are active:

| Task 0 | UnbridgeCall( ) pending on ModemUnbridgeCall( ) |
| Task 1 | BridgeTwoCalls( ) pending on Task 4 |
| Task 2 | CloseAllBridgedCalls( ) pending on Task 0 |
| Task 4 | MakeCall( ) pending on ModemMakeCall("123") |

Reordering this list and adding indentations yields:

| Task 1 | BridgeTwoCalls( ) pending on Task 4 |
| Task 4 | MakeCall( ) pending on ModemMakeCall("123") |
| Task 2 | CloseAllBridgedCalls( ) pending on Task 0 |
| Task 0 | UnbridgeCall( ) pending on ModemUnbridgeCall( ) |

Figure 9:
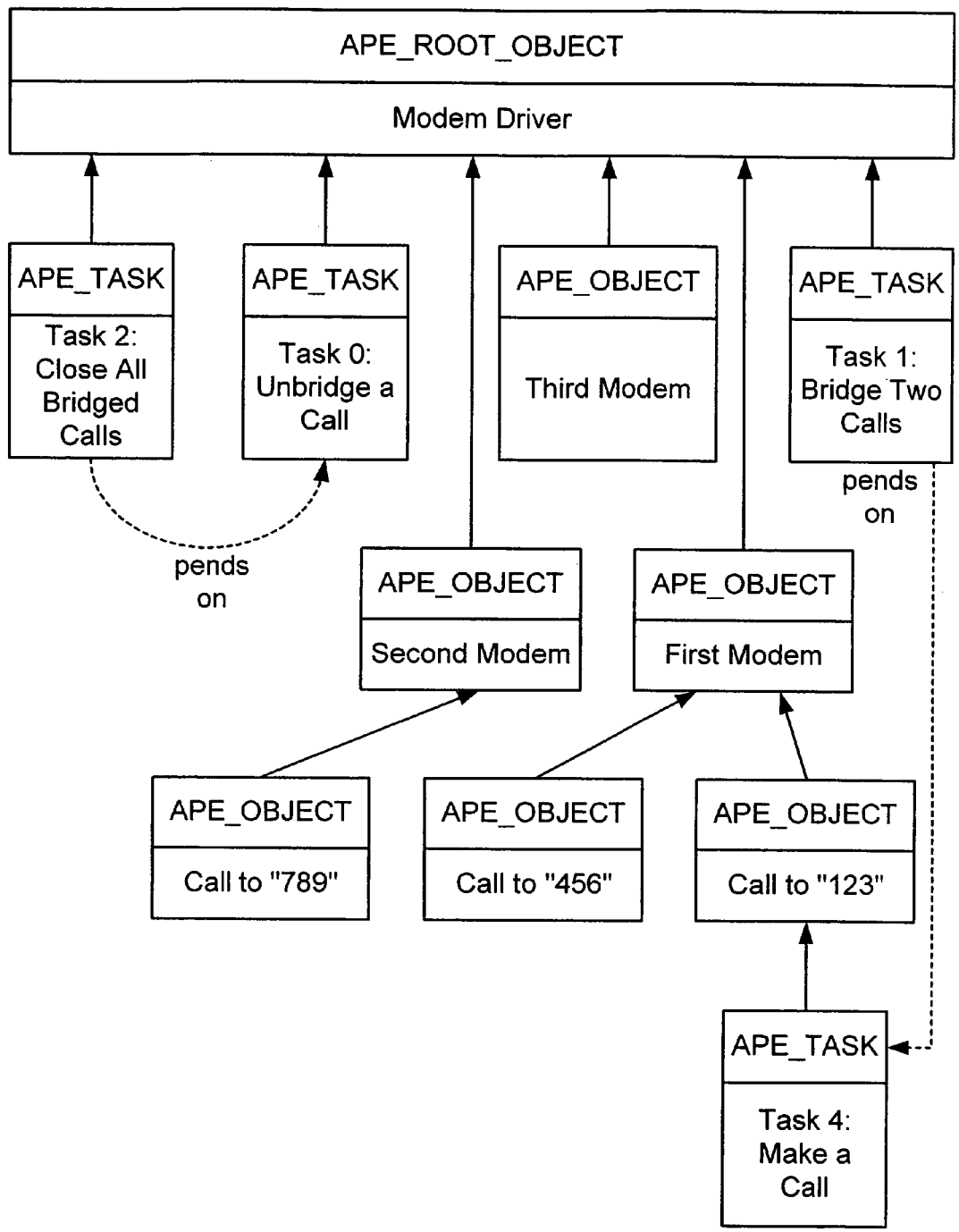
FIG. 9 is a data structure diagram giving an example of an APE object tree when tasks are pending on other tasks.

This is a concise representation of the state of the program. FIG. 9 is a data structure diagram showing the state of the APE object tree. Task 0 (UnbridgeCall( )) has pointers to two calls that need to be unbridged, but, to reduce clutter, these pointers are not shown in the Figure.

APE Stack Records and Location Identifiers

A call tree of a function F within a module M is the execution trace when executing F and any other functions within M that are called in the context of F. APE uses a structure, the stack record, to store information that is relevant only to a particular call tree. A stack record lives only as long as the call tree rooted on the function that created the stack record. APE uses the stack record for the following purposes:

Verifying that all temporary references to objects (discussed in Section V) are released when exiting the call tree;

Verifying that a particular lock (discussed in Section VII) is locked in the context of the current call tree;

Verifying that all locks acquired in the context of the current call tree are released when the call tree is unwound;

Verifying that locks are acquired in a consistent order; and

Verifying that calls to suspend a task are called in the context of the task's call handler.

The following macro declares and initializes a stack record:

```
#define APE_DECLARE_STACK_RECORD(_SR, _pSR, _LocID)     \
    APE_STACK_RECORD            _SR;                    \
    PAPE_STACK_RECORD           _pSR =                  \
    ((_SR.LocID = _LocID), (_SR.u = 0), &_SR);
```

Thus the invocation

APE_DECLARE_STACK_RECORD(SR, pSR, 0x09890009) is equivalent to the following code:

```
APE_STACK_RECORD          SR;
PAPE_STACK_RECORD         pSR = &SR;
SR.LocID = 0x09890009;
SR.u = 0;
```

The peculiar expression in last line of the macro enables the macro to be interspersed with other declarations in C code.

LocID is a location identifier, an integer constant that uniquely identifies a particular location in the source code. LocIDs may be randomly generated constants and are used purely for diagnostic purposes. Several APE functions take a LocID as one of their arguments to identify the location in the user's source code where the APE function is called.

A stack record may be initialized on the stack of functions called from outside the module: exported functions, completion handlers, etc. Once initialized, a pointer to the stack record may be passed as an argument to subfunctions. Many APE functions take a pointer to the current stack record as their last argument. The following code sample declares a stack record and passes a pointer to it in a call to ApeStartTask( ). LocID 0x0989009 marks the location where the stack record is declared, and LocID 0x25f83439 marks the location where ApeStartTask( ) is called.

```
VOID Whatever( )
{
    APE_DECLARE_STACK_RECORD(SR, pSR, 0x0989009)
    ApeStartTask(pTask, 0x25f83439, pSR);
}
```

DoCallAsync( )

To understand the above features of APE, turn to FIG. 10 which is a code diagram showing DoCallAsync( ), a function that implements the asynchronous tasks of FIG. 3B. This function is an asynchronous version of the synchronous DoCallSync( ) (discussed above and shown in FIG. 6). DoCallAsync( ) has the same requirements as DoCallSync( ): initialize the modem driver, open a modem, make a call, drop the call, close the modem, and de-initialize the modem driver. However, DoCallAsync( ) must deal with the fact that some of the modem control functions return asynchronously.

FIG. 10 is deceptively simple because in it DoCallAsync( ) simply calls AllocateDoCallTask( ) to create an APE_TASK object and then calls ApeStartTask( ) to execute the object's task handler. The actual work of DoCallAsync( ) occurs in that task handler which is not shown in FIG. 10.

FIG. 11, however, is a code diagram showing a portion DoCallTask( ), the task handler invoked by DoCallAsync( ). (The full version of this task handler may be found in Appendix I.) The task handler begins by initializing the *pState variable to START. (This initialization is not shown in FIG. 11.) Upon entering the switch( ), this value of *pState leads the task handler to perform the code under "case START." First, MdmLoadDriver( ) is called. As this function returns synchronously, processing continues on its completion with a call MdmOpenModem( ). Unlike MdmLoadDriver( ), MdmOpenModem( ) may return asynchronously. If it does, it first returns the status MDM_STATUS_PENDING to indicate that it has not yet completed its processing. In that case, DoCallTask( ) does two things. First, it sets the *pState variable to the value OPENMODEM. Then it suspends itself by calling ApeSuspendTask( ). The task handler remains suspended until MdmOpenModem( ) completes asynchronously.

When MdmOpenModem( ) completes asynchronously, the task handler DoCallTask( ) is called once more. Because the *pState variable was set to the value OPENMODEM, processing continues at "case OPENMODEM." In this manner, the task handler proceeds in an orderly fashion, performing all of the functionality required of DoCallAsync( ), even though many of the operations may complete asynchronously.

There are, at least, three important points to note. First, an asynchronous task handler cannot complete its processing by means of an orderly march through its code. When a suspended task handler resumes, processing does not begin at the point where the task handler suspended itself. Rather, processing starts again at the start of the task handler. Because of this, DoCallTask( ) uses a state variable to keep track of how far it has gone and uses the value of that state variable to switch to the next appropriate code segment. Second, just because a process may complete asynchronously, does not mean that it will. MdmOpenModem( ) may complete synchronously, in which case it returns a status other than MDM_STATUS_PENDING. Processing continues at "case OPENMODEM" without the task handler suspending itself and resuming. Third, a task handler does not need to block itself until the asynchronous function completes. Instead, it returns to its caller, and the current thread can continue to do other work while the asynchronous function does its work.

This discussion of DoCallAsync( ) presents some of the more salient points of implementing an asynchronous process using APE. For a full disclosure of all the intricacies involved, see Appendix I which provides the complete source code of an implementation of DoCallAsync( ).

V. APE: Counting Object References

As discussed in Section IV above, APE uses reference counters to determine when to delete an object. When an object is initialized, it is added to an APE object tree below its parent object, and the parent's reference counter is incremented. An APE object is considered alive as long as its reference counter is above zero. The implicit reference added to a parent when an object is initialized, and removed when the object is deleted, makes sure that an object's parent is alive for at least as long as the object.

APE classifies object references into three kinds and treats each kind differently.

Temporary references are made simply to ensure that the APE object does not go away during the life of a particular call tree. The object may be referenced and de-referenced in the same function, or de-referencing may happen later in the call tree. All temporary references made in a particular call tree must be de-referenced before the call tree exits. The macro APE_NO_TMPREFS( ) returns TRUE if there are no outstanding temporary references in the current call tree and FALSE otherwise. This macro takes as its single argument a pointer to the current stack record.

Cross references "link" two objects together to make sure that neither object is deleted before the other. Cross references can persist for as long as both objects are alive. Cross references are described in Section IV above.

External references are made to keep an object alive as long as there is a reference to it from a non-object (maybe an entity outside the module). An external reference persists for as long as the external entity has a reference to the object.

To clarify the use of temporary references, consider the example of GetBridgedCall( ) and ProcessBridgedCall( ). A few preliminary definitions are in order. ApeTmpReference Object( ) adds a temporary reference to an APE object while ApeTmpDereferenceObject( ) removes a temporary reference. The MODEM object keeps track of the state of a modem.

```
typedef struct
{
    ...
    CALL        *pCalls;    // Points to the control blocks for calls
} MODEM;
```

The CALL object keeps track of the state of a particular call.

```
typedef struct _CALL
{
    ...
    struct _CALL  *pNext;         // Points to the next active call, if
                                  any
    CALL          *pBridgedCall;  // Points to the call bridged to, if
                                  any
} CALL;
```

CALL includes a pointer to the call to which it is bridged, if there is one, and NULL otherwise. MODEM objects are parents of CALL objects, as illustrated in FIGS. 7 and 9. LockModem( ) and UnlockModem( ) are primitives that may be used to serialize access to both MODEM and CALL objects in a multi-threaded environment.

GetBridgedCall( ) returns a pointer to the bridged call associated with a given modem, if there is one. This function adds a temporary reference to the returned call to make sure that some other thread does not delete the call object in the mean time.

```
CALL *GetBridgedCall(MODEM *pModem, PAPE_STACK_RECORD
pSR)
{
    CALL pBridgedCall = NULL;
    LockModem(pModem);
    if(pModem->pCalls != NULL)
    {
        pBridgedCall = pModem->pCalls->pBridgedCall;
        if(pBridgedCall != NULL)
        {
            // Add a temporary reference to pBridgeCall. Caller is
            // responsible for removing this reference.
            ApeTmpReferenceObject(&pBridgedCall->Hdr, pSR);
        }
    }
    UnlockModem(pModem);
    return pBridgedCall;
}
```

ProcessBridgedCall( ) calls GetBridgedCall( ) and then processes the returned bridged call. Just before it returns, ProcessBridgedCall( ) verifies that there are no outstanding temporary reference in the current call tree.

```
VOID ProcessBridgedCall(MODEM *pModem)
{
    APE_DECLARE_STACK_RECORD(SR, pSR, 0x1000bbab)
    CALL pBridgedCall;
```

```
    pBridgedCall = GetBridgedCall(pModem, pSR);
    if(pBridgedCall != NULL)
    {
        // Do some processing
        ...
        // Done with pBridgeCall. Remove the temporary reference
        // added by GetBridgedCall( ).
        ApeTmpDereferenceObject(&pBridgedCall->Hdr, pSR);
    }
    // Make sure there are no outstanding temporary references in this call
    tree.
    ASSERT(APE_NO_TMPREFS(pSR));
    return;
}
```

External references are used to ensure that an APE object lives at least as long as some entity outside the module has a reference to it. In a manner analogous to the ApeCrossReferenceObjectsDebug( ) function described in Section IV, there is a debugging version of the function that adds external references to objects. The debugging version helps catch cases of dangling external references.

```
VOID ApeExternallyReferenceObjectDebug
(
    IN    PAPE_OBJECT    pObj,
    IN    UINT_PTR       ExternalEntity,
    IN    ULONG          LocID,
    IN    ULONG          AssocID
);
```

APE keeps track of the triple (pObj, ExternalEntity, AssocID) and will assert if pObj is deleted without first removing this triple. The triple is removed by calling the debugging version of ApeExternallyDereferenceObject( ).

VI. APE: Grouping Objects

Programs often need to maintain a collection of objects and work with the collection as a whole. For example, a program that manages modems and calls may maintain a collection of modem control blocks and, for each modem, a collection of call control blocks representing calls active on that modem. The program may, perform operations on the collection as a whole or on the members of the collection individually. For example, the program may enumerate the calls active on a modem or may suspend closing a modem until all calls active on the modem have been deleted. During these operations, care must be taken for the management of object reference counters because objects may be created or deleted (or otherwise modified) in the middle of the program's processing of the collection.

To illustrate the problems that arise when trying to uniformly process all members of a collection, consider trying to run a function Foo( ) against all calls currently active on a modem. The following code segments use the MODEM and CALL objects defined in Section V above. MODEM maintains a singly linked list of pointers to the calls active on the modem, that is, each active call object points to the next active call object.

```
    CALL *pCall;
    LockModem(pModem);
    pCall = pModem->pCalls;
```

-continued

```
    while(pCall != NULL)
    {
        Foo(pCall);
        pCall = pCall->pNext;
    }
    UnlockModem(pModem);
```

This code works as desired but now assume that for some reason Foo( ) must be called with the modem unlocked. The following code segment attempts this.

```
    CALL *pCall;
    LockModem(pModem);
    pCall = pModem->pCalls;
    while(pCall != NULL)
    {
        UnlockModem(pModem);
        Foo(pCall);
        LockModem(pModem);
        pCall = pCall->pNext;
    }
    UnlockModem(pModem);
```

This code is flawed because pCall is not referenced once the modem is unlocked and so could be deleted by another thread during the processing of Foo( ). The following code segment attempts a fix using the temporary object references discussed in Section V above, but it is also flawed, albeit in a subtler way.

```
    CALL *pCall;
    LockModem(pModem);
    pCall = pModem->pCalls;
    while(pCall != NULL)
    {
        CALL      *pTmp;
        ApeTmpReferenceObject(&pCall->Hdr, pSR);
        UnlockModem(pModem);
        Foo(pCall);
        LockModem(pModem);
        pTmp = pCall;
        pCall = pCall->pNext;
        ApeTmpDereferenceObject(&pTmp->Hdr, pSR);
    }
    UnlockModem(pModem);
```

The flaw is that the code assumes that pCall→pNext continues to point to the next object in the modem's list of active call objects. In fact, pCall→pNext is invalid if another thread removes the call from the list while the modem is unlocked (that is, during Foo( ) processing). This causes the while loop to exit prematurely. There is no easy fix for this problem.

There are other problems with managing collections of objects in a multi-threaded environment. The semantics of the collection may be undesirable or unclear. For example, a thread may look up an object and assume that it is still in a collection while another thread removes it from the collection. It may be tricky to de-initialize a collection because this may involve waiting for the collection to be empty and for there to be no ongoing attempts to iterate over the objects in the collection.

APE provides groups to address the issues of maintaining collections and objects in collections. APE groups provide the following functionality:

Enumerating and sequentially processing all objects in a group (with APE managing the reference counting);

Iterating over all objects in a group (a variation of enumerating);

Looking up objects in a group based on key values;

Dynamically enabling and disabling object enumeration and look up;

Asynchronously de-initializing a group: the group is de-initialized when it becomes empty and when there are no ongoing enumerations or iterations on the group, the user is notified when the de-initialization is complete; and Allowing the user to provide algorithms for organizing the objects, for looking them up, and for enumerating them (such as linked lists, hash tables, binary search trees, etc.).

APE provides two types of groups: primary and secondary. They use the same structure and share much of their functionality. They differ in the relationship between an object's existence and its membership in the group. Primary groups contain objects whose existence is tied to the group. An object is initialized at the same time that it is inserted into a primary group, and the object is only removed from the group when it is deleted. An object can be a member of only one primary group. Secondary groups contain objects whose existence is not tied to the group (except for the fact that an object must be alive when it is in a group). The user explicitly inserts an object into and removes an object from a secondary group. An object can be a member of more than one secondary group.

Primary and secondary groups are initialized by ApeInitializeGroup( ).

```
VOID ApeInitializeGroup
(
    IN      PAPE_OBJECT              pOwningObject,
    IN      UINT                     Flags,
    IN      PAPE_COLLECTION_INFO     pCollectionInfo,
    IN      PAPE_GROUP_OBJECT_INFO   pObjectInfo,
    OUT     PAPE_GROUP               pGroup,
    IN      const char*              szDescription,
    IN      PAPE_STACK_RECORD        pSR
);
```

The function takes a pointer to an uninitialized APE_GROUP structure, pGroup, and initializes it using the remaining parameters. The Flags parameter is set to APE_FLG_GROUP_PRIMARY to initialize a primary group or zero to initialize a secondary group. The third argument, pCollectionInfo, points to a set of functions that implement algorithms for object look up and enumeration. The fourth argument, pObjectInfo, contains information specific to the class of objects in the group including functions to interpret keys that index objects in the group. ApeDeinitializeGroup( ) asynchronously de-initializes a group. The group is de-initialized when it becomes empty and when there are no ongoing enumerations or iterations on the group.

APE provides management functions that are applicable to all types of groups. ApeLookUpObjectInGroup( ) returns an object that matches a specified key. ApeEnumerateObjectsInGroup( ) calls the user-provided enumeration function for each object in the group, adding a temporary reference to the object before calling the enumeration function with that object and de-referencing the object after the enumeration function returns. When performing an iteration, ApeGetNextObjectInGroup( ) uses a structure of type APE_GROUP_ITERATOR initialized by ApeInitializeGroupIterator( ).

```
APE_OS_STATUS ApeGetNextObjectInGroup
(
    IN      PAPE_GROUP_ITERATOR   pIterator,
    OUT     PAPE_OBJECT           *ppNextObject,
    IN      PAPE_STACK_RECORD     pSR
);
```

This function returns the next object in the iteration in *ppNextObject after first adding a temporary reference to the object. The caller is responsible for removing this reference. Enumeration and iteration operations share these properties: every object originally in the group and remaining on completion is visited during the operation; every object is visited at most once unless the object was deleted and re-added to the group during the operation; and objects deleted or added during the operation may or may not be visited. Finally, ApeEnableGroupFunctions( ) enables specific functionality (look up, creation, enumeration) in the group. ApeDisableGroupFunctions( ) disables specific functionality and is often called before calling ApeDeinitializeGroup( ).

Each object in a group may be given a key. The key is opaque to APE and can be of arbitrary size and structure. APE manipulates keys using two user-supplied functions specified in the APE_GROUP_OBJECT_INFO structure associated with the group. The first function generates a UINT-sized hash of the key to speed look up. The second function compares two keys to detect an exact key match.

The function ApeCreateObjectInGroup( ) is specific to primary groups and creates an object in a primary group.

```
APE_OS_STATUS ApeCreateObjectInGroup
(
    IN      PAPE_GROUP            pGroup,
    IN      ULONG                 Flags,
    IN      PVOID                 pvKey,
    IN      PVOID                 pvCreateParams,
    OUT     PAPE_OBJECT           *ppObject,
    OUT     INT                   *pfCreated,
    IN      PAPE_STACK_RECORD     pSR
);
```

The caller supplies a key and a pointer to opaque data (pvCreateParams). APE creates an object with this key in the group. APE creates the object by calling the object's creation function found in the APE_GROUP_OBJECT_INFO structure associated with the group. ApeCreateObjectInGroup( ) adds a temporary reference to the returned object. The caller is responsible for removing this temporary reference. The object remains in the primary group until the user calls ApeDeleteGroupObjectWhenUnreferenced( ) after which the object is deleted when there are no longer any references to it.

ApeAddObjectToGroup( ) adds an object to a secondary group and adds an external reference (see Section V above) to the object. ApeRemoveObjectFromGroup( ) deletes the object from the group and removes the external reference.

VII. APE: Lock Tracking

"Locking" data (which data may include executable code) refers to serializing access to those data. In many processing systems, it is difficult to verify that locks are acquired in the correct order and are released in the correct places. If multiple objects need to be locked together, deadlock may be avoided only by locking the objects in a specific order. However, the rules of locking order are often unenforceable and are merely implied by standards of coding conduct, such as suggesting that objects be locked in an order based on the types of the objects. Typical code may look like this:

```
A *pA;
B *pB;
...
// WARNING: Must secure A's lock before B's.
unlock(pB);
lock(pA);
lock(pB);
```

The WARNING comment is the only watchman over the rules of lock ordering. Errors based on violations of locking rules, such as deadlocks or modification to unlocked objects, lead to tedious debugging. Without programmatic enforcement of the rules, the debugging process typically relies on source code examination, often across multiple functions.

APE lock tracking consists of a set of structures and functions to control locks and to make it easier to isolate locking-related errors. APE provides the following functionality for tracking locks:

Verifying that all locks acquired on a particular call tree are released before the call tree exits;

Determining if a particular lock is held in the context of the current call tree;

Verifying that there are no locks held in the context of the current call tree, a common assertion to make when calling outside the current module;

Verifying that objects are locked and released in order, APE causing an assertion failure if a lock is acquired outside the order specified by the client;

Identifying the call tree that has acquired a particular lock;

Identifying the location in the source code where a lock was acquired;

Supporting arbitrary operating system-provided locks; and

Allowing the user to directly call the operating system-provided locking primitives to minimize overhead.

For purposes of illustrating the use of APE lock tracking, define a LOCK object as a "trackable" version of a critical section.

```
typedef struct
{
    CRITICAL_SECTION    Crit;
    APE_LOCK_STATE      ApeState;
} LOCK;
```

To initiate APE lock tracking, the user associates an APE_LOCK_STATE structure with each tracked lock. APE uses this structure in conjunction with the stack record to track lock usage. ApeInitializeLockState( ) initializes the structure.

```
VOID ApeInitializeLockState
(
    IN      PAPE_LOCK_STATE       pLockInfo,
    IN      UINT                  Level
);
```

The first parameter points to an uninitialized APE_LOCK_STATE structure. The second parameter is a user-defined level associated with this lock. APE requires that locks be acquired in order of increasing level. This code segment initializes a LOCK object:

```
InitializeCriticalSection(&pLock->Crit);
ApeInitializeLockState(&pLock->ApeState);
```

ApeDeinitializeLockState( ) should be called to de-initialize an APE_LOCK_STATE structure after the last use of the lock. This code segment de-initializes the Lock object:

```
ApeDeinitializeLockState(&pLock->ApeState);
DeleteCriticalSection(&pLock->Crit);
```

The user calls ApeTrackAcquireLock( ) just before acquiring a lock and calls ApeTrackReleaseLock( ) just before releasing the lock. ApeTrackAcquireLock( ) calls the user-specified assertion failure handler associated with the stack record if the lock has already been acquired by some other call tree (typically on a different thread). If the stack record has lock tracking enabled, then the assertion failure handler is called if the lock's level is less than the level of a lock previously acquired in this call tree or if the lock's level equals that of a lock previously acquired in this call tree and the numerical value of the pointer to the lock is less than or equal to that of a previously acquired lock with the same level.

The following code segment acquires and releases a LOCK object, calling operating system locking primitives as well as the APE lock tracking functions.

```
ApeTrackAcquireLock(&pLock->ApeState, pSR);
EnterCriticalSection(&pLock->Crit);
...
ApeTrackReleaseLock(&pLock->ApeState, pSR);
ReleaseCriticalSection(&pLock->Crit);
```

APE supports operating system-specific locks. For example, it supports Microsoft's "WINDOWS" Driver Model spin locks and Critical Sections. The APE_OS_LOCK structure is equivalent to KSPIN_LOCK when in kernel mode and to CRITICAL_SECTION when in user mode. When in kernel mode, APE saves the current IRQL in the stack record, obviating the need for the user to save and restore the previous IRQL when acquiring and releasing locks.

VIII. APE: Debug Associations

One or more resources may be associated with an object during the lifetime of the object. Generally, a resource is anything that needs to be explicitly released when it is no longer needed by the object. Examples include sections of memory, handles to system-supplied objects, and application-defined objects. Failure to release a resource is a common programming error, with memory leaks a well-known result. APE supports resource tracking and allows the assertion that all associated resources are released before an object is deleted. Specifically, APE supports resource tracking by providing the following functionality:

Enabling tracking of arbitrary resources associated with an object, at object-level granularity;

Enabling assertions to be made regarding the sequence of state transitions through which an object goes;

Allowing the assertion that exactly one instance of a particular type of resource be associated with an object; and When debugging, allowing the current set of resources associated with a particular object to be viewed.

APE uses debug associations to track resources. A debug association is a tuple of form (AssociationID, Entity) associated with an object, where AssociationID is a user-supplied label for the debug association, and Entity is an optional integer or pointer representing an instance of the debug association. To track the association of resource R of type T to an object, APE attaches the debug association (T, R) to the object.

Debug associations may be used for purposes other than tracking resources. APE, for example, uses a debug association to verify that a cross reference must be removed before either cross-referenced object can be deleted. Also, if an object should not be deleted until event E2 occurs once event E1 has occurred, APE adds the debug association "waiting for event E2" to the object when event E1 occurs. This debug association is cleared away when event E2 occurs.

ApeDebugAddAssociation( ) adds a debug association to an APE object.

```
VOID ApeDebugAddAssociation
(
    IN    PAPE_OBJECT    pObject,
    IN    ULONG          LocID,
    IN    ULONG          AssociationID,
    IN    ULONG_PTR      Entity,
    IN    ULONG          Flags
);
```

The function adds the association (AssociationID, Entity) to object pObject. Flags determines whether the association is single-instance. Only one instance of a single-instance association with a specific value for AssociationID is allowed per object.

CONCLUSION

In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

APPENDIX I

Complete Source Code for DoCallAsync( ), the Asynchronous Programming Example of FIGS. 10 and 11.

```
#include           "common.h"
#define PROGRAM    "APEmodem"
typedef VOID (*PFN_COMPLETION_HANDLER)
```

APPENDIX I-continued

Complete Source Code for DoCallAsync( ), the Asynchronous Programming Example of FIGS. 10 and 11.

```
(
  PVOID    pvCompletionContext,
  BOOL     fSuccessful
);
VOID DoCallAsync
(
  UINT                      ModemNo,
  TCHAR                     *tszDialString,
  PFN_COMPLETION_HANDLER    pfnCompletionHandler,
  PVOID                     pvCompletionContext
);
VOID ModemCompletionHandler
(
  IN  PVOID          pvClientContext,
  IN  MDM_STATUS     Status
);
VOID Initialize(VOID);
VOID Deinitialize(VOID);
VOID CompletionHandler
(
  PVOID    pvCompletionContext,
  BOOL     fSuccessful
)
{
  printf("CompletionHandler: Context = \"%s\"; Result = %d\n",
      (char *)pvCompletionContext, fSuccessful);
}
VOID_cdecl main
(
  INT     argc,
  CHAR    *argv[ ]
)
{
  Initialize( );
  DoCallAsync(1, "123", CompletionHandler, "Completion context");
  Deinitialize( );
  printf("DoCallAsync( )\n");
}
/*
 * DOCALL_TASK is an extension to APE_TASK. In addition to an APE_TASK
 * structure, it has fields to store the input parameters to DoCallAsync( ), as well as
 * additional local data, such as handles to modems and calls.
 */
typedef struct
{
  APE_TASK                  TskHdr;
  #define MAX_DIALSTRING_SIZE    128
  TCHAR                     tszDialString[MAX_DIALSTRING_SIZE];
  UINT                      ModemNo;
  HMODEM                    hModem;
  HCALL                     hCall;
  MDM_STATUS                AsyncMdmStatus;
  PFN_COMPLETION_HANDLER    pfnCompletionHandler;
  PVOID                     pvCompletionContext;
} DOCALL_TASK, *PDOCALL_TASK;
PDOCALL_TASK AllocateDoCallTask
(
  UINT                      ModemNo,
  TCHAR                     *tszDialString,
  PFN_COMPLETION_HANDLER    pfnCompletionHandler,
  PVOID                     pvCompletionContext,
  PAPE_STACK_RECORD         pSR
);
VOID DoCallTask
(
  IN  PAPE_TASK            pTask,
  IN  PAPE_STACK_RECORD    pSR
);
// RootStaticInfo, RootDebugFunctions, and Root are global variables.
APE_STATIC_OBJECT_INFO RootStaticInfo =
{
  "Root",   // User-defined description of this object (for diagnosis only)
  'RyM',    // User-defined signature of the root object (for diagnosis only)
            // The remaining fields are all zero.
};
APE_STATIC_OBJECT_INFO TaskStaticInfo =
{
```

APPENDIX I-continued

Complete Source Code for DoCallAsync( ), the Asynchronous Programming Example of FIGS. 10 and 11.

```
    "Task",          // User-defined description of this object (for diagnosis only)
    'TyM',           // User-defined signature of the root object (for diagnosis only)
                     // The remaining fields are all zero.
    0,               // Flags (unused)
    NULL,            // pfnCreate
    DeleteHeapObject // pfnDelete.
};
// The following is a set of user-supplied diagnostic-related functions.
APE_DEBUG_ROOT_INFO RootDebugFunctions =
{
    AllocateAssociation, DeallocateAssociation, AllocateDebugObjectInfo,
    DeallocateDebugObjectInfo, AllocateLogEntry, DeallocateLogEntry, AssertHandler
};
APE_ROOT_OBJECT Root;
VOID Initialize(VOID)
{
    APE_DECLARE_STACK_RECORD(SR, pSR, 0x3f428316)
    ApeInitializeRootObject(&Root, &RootStaticInfo, &RootDebugFunctions, pSR);
}
VOID Deinitialize(VOID){ }
VOID DoCallAsync
(
    UINT                    ModemNo,
    TCHAR                   *tszDialString,
    PFN_COMPLETION_HANDLER  pfnCompletionHandler,
    PVOID                   pvCompletionContext
)
/*
 * This has the same functionality as DoCallSync( ), except that that it can deal with the
 * modem functions returning asynchronously. pfnCompletionHandler( ) is called when
 * the operations are complete.
 */
{
    APE_DECLARE_STACK_RECORD(SR, pSR, 0xf7fe39d2)
    PDOCALL_TASK    pTask;
    pTask = AllocateDoCallTask(ModemNo, tszDialString, pfnCompletionHandler,
        pvCompletionContext, pSR);
    if(pTask == NULL)
    {
        // Failed to allocate task. Call the completion handler immediately.
        pfnCompletionHandler(pvCompletionContext, FALSE);
    }
    else
    {
        // Start the task just allocated. The task does the actual work.
        ApeStartTask(&pTask->TskHdr, 0x5c5d5ba9, pSR);
    }
}
PDOCALL_TASK AllocateDoCallTask
(
    UINT                    ModemNo,
    TCHAR                   *tszDialString,
    PFN_COMPLETION_HANDLER  pfnCompletionHandler,
    PVOID                   pvCompletionContext,
    PAPE_STACK_RECORD       pSR
)
{
    PDOCALL_TASK    pDoCallTask;
    pDoCallTask = (PDOCALL_TASK)LocalAlloc(LPTR, sizeof(DOCALL_TASK));
    if(pDoCallTask != NULL)
    {
        // *pDoCallTask is zeroed out at this point.
        ApeInitializeTask
        (
            &pDoCallTask->TskHdr,    // Task to initialize
            &Root.Hdr,               // Parent object
            DoCallTask,              // Task handler
            &TaskStaticInfo,         // Static information about tasks
            0,                       // Flags (unused)
            pSR                      // The stack record
        );
        // Set up the parameters for the task.
        lstrcpy(pDoCallTask->tszDialString, tszDialString);
        pDoCallTask->ModemNo = ModemNo;
        pDoCallTask->pfnCompletionHandler = pfnCompletionHandler;
        pDoCallTask->pfnCompletionHandler;
        pDoCallTask->pvCompletionContext = pvCompletionContext;
```

APPENDIX I-continued

Complete Source Code for DoCallAsync( ), the Asynchronous Programming Example of FIGS. 10 and 11.

```
    }
    return pDoCallTask;
}
VOID DoCallTask
(
    IN    PAPE_TASK            pTask,
    IN    PAPE_STACK_RECORD    pSR
)
/*
 * This is the task handler for tasks of type DOCALL_TASK. It function implements the
 * logic of DoCallSync( ) but handles asynchronous completion of the modem functions.
 */
{
    PDOCALL_TASK    pDoCallTask;
    ULONG           *pState;
    MDM_STATUS      MdmStatus;
    // The following values track the state of this task. The state is maintained in
    // &pDoCallTask->TskHdr.Hdr.UserState.
    enum
    {
        START = 0,      // Must be zero, because *pState is initialized to zero.
        OPENMODEM,      // MdmOpenModem( ) is pending.
        MAKECALL,       // MdmMakeCall( ) is pending.
        DROPCALL,       // MdmDropCall( ) is pending.
        CLOSEMODEM      // MdmCloseModem( ) is pending.
    };
    pDoCallTask = (PDOCALL_TASK)pTask;
    pState = &pDoCallTask->TskHdr.Hdr.UserState;
    switch(*pState)
    {
    case START:
        // Load the modem driver. This is a synchronous call.
        MdmLoadDriver( );
        // Open the modem. On completion, pDoCallTask->hModem contains the
        // handle to the open modem.
        MdmStatus = MdmOpenModem(pDoCallTask->ModemNo,
            ModemCompletionHandler, pDoCallTask, &pDoCallTask->hModem);
        if(MdmStatus == MDM_STATUS_PENDING)
        {
            // Suspend this task and resume when MdmOpenModem( ) completes
            // asynchronously. Also, set our internal state to OPENMODEM,
            // indicating that MdmOpenModem( ) is pending.
            *pState = OPENMODEM;
            ApeSuspendTask(pTask, pSR);
            break;
        }
        else
        {
            // Save the return status here.
            pDoCallTask->AsyncMdmStatus = MdmStatus;
        }
        // Fall through on synchronous completion.
    case OPENMODEM:
        // Get the status of the completed MdmOpenModem( ) call.
        MdmStatus = pDoCallTask->AsyncMdmStatus;
        if(MdmStatus == MDM_STATUS_SUCCESS)
        {
            // Make the call.
            MdmStatus = MdmMakeCall(pDoCallTask->hModem,
                pDoCallTask->tszDialString, pDoCallTask, &pDoCallTask->hCall);
            if(MdmStatus == MDM_STATUS_PENDING)
            {
                // Suspend this task and resume when MdmMakeCall( ) completes
                // asynchronously. Also, set the internal state to MAKECALL,
                // indicating that MdmMakeCall( ) is pending.
                *pState = MAKECALL;
                ApeSuspendTask(pTask, pSR);
                break;
            }
            else
            {
                // Save the return status here.
                pDoCallTask->AsyncMdmStatus = MdmStatus;
            }
        }
        else
        {
```

APPENDIX I-continued

Complete Source Code for DoCallAsync( ), the Asynchronous Programming Example of FIGS. 10 and 11.

```
            // MdmOpenModem( ) returned failure, either synchronously or
            // asynchronously Jump to the UnloadDriver( ) code.
            goto unload_driver;
        }
        // Fall through on synchronous completion.
    case MAKECALL:
        // Get the status of the completed MdmMakeCall( ).
        MdmStatus = pDoCallTask->AsyncMdmStatus;
        if(MdmStatus == MDM_STATUS_SUCCESS)
        {
            // The make call completed successfully. Now drop the call.
            MdmStatus = MdmDropCall(pDoCallTask->hCall);
            if(MdmStatus = MDM_STATUS_PENDING)
            {
                // Suspend this task and resume when MdmDropCall( ) completes
                // asynchronously. Also, set the internal state to DROPCALL,
                // indicating that MdmDropCall( ) is pending.
                *pState = DROPCALL;
                ApeSuspendTask(pTask, pSR);
                break;
            }
            else
            {
                // Save the return status here.
                pDoCallTask->AsyncMdmStatus = MdmStatus;
            }
        }
        else
        {
            // MdmMakeCall( ) returned failure, either synchronously or
            // asynchronously. Jump to the CloseModem( ) code.
            goto close_modem;
        }
        // Fall through on synchronous completion.
    case DROPCALL:
        // MdmDropCall( ) has completed. Ignore the final status of MdmDropCall( )
        // and go on to close the modem.
    close_modem:
        // Close the modem.
        MdmStatus = MdmCloseModem(pDoCallTask->hModem);
        if(MdmStatus == MDM_STATUS_PENDING)
        {
            // Suspend this task and resume when MdmCloseModem( ) completes
            // asynchronously. Also, set the internal state to CLOSEMODEM,
            // indicating that MdmCloseModem( ) is pending.
            *pState = CLOSEMODEM;
            ApeSuspendTask(pTask, pSR);
            break;
        }
        else
        {
            // Save the return status here.
            pDoCallTask->AsyncMdmStatus = MdmStatus;
        }
        // Fall through on synchronous completion.
    case CLOSEMODEM:
        // MdmCloseModem( ) has completed. Ignore the final status of
        // MdmCloseModem( ) and go on to unload the modem driver.
    unload_driver:
        // Unload the driver. This completes synchronously.
        MdmUnloadDriver( );
    default:
        ASSERT(FALSE); // We never get here.
    }
}
VOID ModemCompletionHandler
(
    IN PVOID        pvClientContext,
    IN MDM_STATUS   Status
)
/*
* This is the completion handler for asynchronous completion of some modem
* functions. This function is specified in the call to MdmOpenModem( ).
* pvClientContext is expected to be a pointer to an instance of DOCALL_TASK.
*/
{
    APE_DECLARE_STACK_RECORD(SR, pSR, 0x8bcdc63f)
```

APPENDIX I-continued

Complete Source Code for DoCallAsync( ), the Asynchronous Programming Example of FIGS. 10 and 11.

```
    PDOCALL_TASK      pDoCallTask;
    // pvClientContext actually points to an instance of DOCALL_TASK (see the call to
    // MdmOpenModem( ) from DoCallTask).
    pDoCallTask = (PDOCALL_TASK)pvClientContext;
    // Save the completion status in pDoCallTask and then resume the task, which is
    // expected to be in the suspended state.
    pDoCallTask->AsyncMdmStatus = Status;
    ApeResumeTask(&pDoCallTask->TskHdr, pSR);
}
```

APPENDIX II

APE Internal Implementation Details

Section I: Structures

1 APE_COLLECTION INFO

Provides the information needed to manage objects in a group.

```
typedef struct
{
    APE_PFN_INITIALIZE_COLLECTION            pfnInitialize;
    APE_PFN_DEINITIALIZE_COLLECTION          pfnDeinitialize;
    APE_PFN_CREATE_IN_COLLECTION             pfnCreate;
    APE_PFN_LOOKUP_IN_COLLECTION             pfnLookup;
    APE_PFN_DELETE_IN_COLLECTION             pfnDelete;
    APE_PFN_INITIALIZE_COLLECTION_ITERATOR   pfnInitializeIterator;
    APE_PFN_GET_NEXT_IN_COLLECTION           pfnGetNextObject;
    APE_PFN_ENUMERATE_COLLECTION             pfnEnumerate;
    UINT                                     LinkhSize;
} APE_COLLECTION_INFO;
```

Members
    pfnInitialize
        Function to initialize a collection of objects in a group.
    pfnDeinitialize
        Function to de-initialize a collection.
    pfnCreate
        Function to insert an object into a collection.
    pfaLookup
        Function to look up an object in a collection.
    pfnDelete
        Function to remove an object from a collection.
    pfnInitializeIterator
        Function to initialize an iterator. An iterator is used to iterate over objects in a collection.
    pfnGetNextObject
        Get the next object in an iteration.
    pfnEnumerate
        Call a user-supplied function for each object in a collection.
    LinkSize
        Space (in bytes) in each object used to maintain a collection.
Comments
    The user fills out APE_COLLECTION_INFO and passes it in the call to ApeInitializeGroup( ). APE uses the functions in this structure to organize the objects in a group.

2 APE_DEBUG_ASSOCIATION

Maintains an instance of a debug association.

```
typedef struct_APE_DEBUG_ASSOCIATION
{
    UINT_PTR    Space[8];
} APE_DEBUG_ASSOCIATION;
```

Members
    All fields are private to APE.
Comments
    This keeps track of a single debug association. APE calls the user-supplied debug APE_PFN_DEBUG_ALLOCATE_ASSOCIATION( ) function, specified when initializing a root object, to allocate this structure. Debug associations are added by ApeDebugAddAssociation( ) and removed by ApeDebugDeleteAssociation( ).
Implementation Notes
    APE uses this structure to store debug associations in a hash table associated with the object. The hash table is stored in an APE_DEBUG_OBJECT_INFO structure in the Associations private field of that structure.
    The information stored within the Space field includes the LocID, AssociationID, Entity and Flags passed in the call to ApeDebugAddAssociation( ), and hash-specific information, including a back pointer to the hash table, as well as links to adjacent associations in the hash table bucket.
    APE causes an assertion failure (by calling the root object's assertion failure handler) if an attempt is made to deallocate an object when it still has debug associations in its hash table.
    APE includes debug extension functions for the developer to display outstanding associations associated with an object.

3 APE_DEBUG_OBJECT_INFO

Contains diagnostic-related information about a single APE object.

```
typedef struct
{
    APE_OBJECT   *pOwningObject;
    UINT         Flags;
    struct
    {
        UINT_PTR  Space[8];
    } Associations;
    LIST_ENTRY   listObjectLog;
    UINT         NumObjectLogEntries;
} APE_DEBUG_OBJECT_INFO;
```

Members
    pOwningObject
        Points to the object associated with this structure.
    The remaining fields are private to APE.

Comments
    Each APE object instantiated with diagnostics enabled contains a pointer to an APE_DEBUG_OBJECT_INFO structure. APE allocates and deletes this structure by calling user-supplied functions. These functions are specified as part of the APE_DEBUG_ROOT_INFO when initializing a root object. This is an opaque structure used by APE to maintain debug associations and object-specific logging data. It is important to note that since the user controls allocation and deallocation of this structure, the user can add user-specific data to the end of this structure.

Implementation Notes
    The Associations private field contains a hash table of associations. See APE_DEBUG_ASSOCIATION implementation notes for more details.
    The listObjectLog and NumObjectLogEntries maintain a per-object debug log.

4 APE_DEBUG_ROOT_INFO

Contains diagnostic-related information about a root object. This structure is one of the arguments to ApeInitializeRootObject( ).

```
typedef struct
{
    APE_PFN_DEBUG_ASSERTFAIL                pfnAssertFailHandler;
    APE_PFN_DEBUG_ALLOCATE_ASSOCIATION      pfnAllocateAssociation;
    APE_PFN_DEBUG_DEALLOCATE_ASSOCIATION
                                            pfnDeallocateAssociation;
    APE_PFN_DEBUG_ALLOCATE_OBJECT_INFO      pfnAllocateDebugObjectInfo;
    APE_PFN_DEBUG_DEALLOCATE_OBJECT_INFO
                                            pfnDeallocateDebugObjectInfo;
    APE_PFN_DEBUG_ALLOCATE_LOG_ENTRY        pfnAllocateLogEntry;
    APE_PFN_DEBUG_DEALLOCATE_LOG_ENTRY      pfnDeallocateLogEntry;
    UINT                                    NumAssocIDs;
    char                                    **pszAssocIDDescriptions;
} APE_DEBUG_ROOT_INFO;
```

Members
    pfnAssertFailHandler
        APE calls this handler if it detects a fatal error.
    pfnAllocateAssociation
        Function to allocate an instance of APE_DEBUG_ASSOCIATION.
    pfnDeallocateAssociation
        Function to delete an instance of APE_DEBUG_OBJECT_INFO.
    pfnAllocateDebugObjectInfo
        Function to allocate an instance of APE_DEBUG_OBJECT_INFO.
    pfnDeallocateDebugObjectInfo
        Function to delete an instance of APE_DEBUG_ASSOCIATION.
    pfnAllocateLogEntry
        Reserved for future use. Must be NULL.
    pfnDeallocateLogEntry
        Reserved for future use. Must be NULL.
    NumAssocIDs
        Number of debug association IDs that have descriptions. May be zero.
    pszAssocIDDescriptions
        Array of descriptions, indexed by association ID. The size of this array must be NumAssocIDs. May be NULL if NumAssocIDs is zero.

Comments
    The user initializes this structure and passes it in a call to ApeInitializeRootObject( ). The handlers are associated with the root object and all objects that are children of this root. The various handlers are self-explanatory and are documented in their associated prototypes.
    NumAssocIDs specifies the size the array pointed to by pszAssocIDDescriptions. APE looks up the textual description of the association by using the AssociationID (passed in the call to ApeDebugAddAssociation( )) to index into this array. This array must remain valid for as long as the root object is alive. Typically, the data are static.

5 APE_DEBUG_USER_STATE_DESCRIPTION

Provides information used by debugger to display a value of the UserState field in APE_OBJECT.

```
typedef struct
{
    UINT        Mask;
    UINT        Value;
    const char  *szDescription;
} APE_DEBUG_USER_STATE_DESCRIPTION;
```

Members
    See comments.

Comments
    The user provides an array of these structures for each type of APE object. This array is specified in the pUserStateDescription field of APE_STATIC_OBJECT_INFO. The debugger uses this array to display the value of the UserState field of the APE object. The debugger runs through the elements of this array, displaying the szDescription field if Value=(State & Mask). The last entry in the array must have a mask value of zero.

Example:

```
APE_DEBUG_USER_STATE_DESCRIPTION
g_RemoteNodeStateInfo[ ] =
{
    {0x03, 0x00, "VC = Idle"},
    {0x03, 0x01, "VC = MakeCall"},
    {0x03, 0x02, "VC = Active"},
    {0x03, 0x03, "VC = CloseCall"},
    {0x40, 0x40, "DEST = AgedOut"},
    {0, 0, NULL}
};
```

Implementation Notes

This information is used purely for debugging support. APE provides debug extensions for viewing objects. When displaying object information, APE looks up state description associated with an object so that it can display the state in user-customized form. Pseudo-code displaying the user-specific state is given below:

```
Look up the object's DEBUG_USER_STATE_DESCRIPTION array in
    object->pStaticInfo->pUserStateDescription.
For each element d in the array
DEBUG_USER_STATE_DESCRIPTION
{
    if((state & d.Mask) == d.Value)
        display(d.szDescription)
}
```

If the value of the UserState field is 0x43, this produces the output:
VC=CloseCall DEST=AgedOut

6 APE_GROUP

Keeps information about a group and should be regarded as an opaque data structure.

```
typedef struct_APE_GROUP
{
    UINT                            GroupState;
    const char                      *szDescription;
    PAPE_OBJECT                     pOwningObject;
    APE_OS_LOCK                     OSLock;
    PAPE_COLLECTION_INFO            pCollectionInfo;
    PAPE_GROUP_OBJECT_INFO          pObjectInfo;
    APE_PFN_LOOKUP_IN_COLLECTION    pfnLookup;
    APE_PFN_GET_NEXT_IN_COLLECTION  pfnGetNext;
    UINT                            OffsetToLink;
    UINT                            OffsetToGroup;
    UINT                            OutstandingEnumerations;
    UINT_PTR                        CollectionState[8];
    LIST_ENTRY                      listPendingTasks;
} APE_GROUP;
```

Members

All members are private to APE.

Comments

ApeInitializeGroup( ) initializes an instance of APE_GROUP.

Implementation Notes

This is a container structure used to maintain a collection of APE_OBJECTs. The algorithms used to maintain the collection are provided by the user in the pCollectionInfo field, initialized by ApeInitializeGroup( ).

The following is a description of the internal use of the private fields.

GroupState tracks the state of the group, including which set of group functions (lookup, create, enumerate) are currently enabled.

szDescription is a textual description of the group and is used by a debugger extension to dump the contents of a group.

pOwningObject points to the object that owns the group.

OSLock is a lock used by APE to serialize access to the group.

pCollectionInfo lists user-supplied functions. APE calls these functions to manage the items in the group. See APE_COLLECTION_INFO for further implementation details.

pObjectInfo provides offsets into the object for space reserved to maintain the group. See APE_GROUP_OBJECT_INFO for further implementation details.

pfnLookup, pfnGetNext, OffsetToLink, and OffsetToGroup cache time-critical information to avoid extra indirection. They are copied from APE_GROUP_OBJECT_INFO and APE_COLLECTION_INFO.

OutstandingEnumerations keeps track of outstanding enumerations in the group at any point of time. APE keeps track of this because it does not deallocate the group when there are outstanding enumerations of objects in the group. It defers deallocation until the next time the enumeration count goes to zero.

CollectionState reserves space owned by user-specified collection algorithms.

listPendingTasks lists tasks pending for the group to be de-initialized via calls to ApeDeinitializeGroup( )).

7 APE_GROUP_ITERATOR

Keeps state information about an ongoing iteration over objects in a group. This structure should be treated as opaque except by the collection handling functions.

```
typedef struct_APE_GROUP_ITERATOR
{
    PAPE_GROUP    pGroup;
    UINT_PTR      CollectionState[8];
} APE_GROUP_ITERATOR;
```

Members
pGroup
Points to the group associated with the iterator.
CollectionState
Collection-specific state private to the collection handling functions.
Comments
This is managed by the collection handling functions responsible for managing the collection of objects in the group. It is initialized by ApeInitializeGroupIterator( ). After it is initialized, ApeGetNextObjectInGroup( ) is called repeatedly to iterate through all the objects in the group.
Implementation Notes
The CollectionState field contains state information specific to the user-supplied collection handling functions. Refer to the implementation notes for ApeInitializeGroup( ) and ApeGetNextObjectInGroup( ) for details on how this field is used.
8 APE_GROUP_OBJECT_INFO
Contains information about an object as it applies to a specific group.

```
typedef struct
{
    APE_PFN_COMPARE_KEY     pfnCompare;
    APE_PFN_HASH_KEY        pfnHash;
    PAPE_STATIC_OBJECT_INFO pStaticInfo;
    UINT                    Flags;
    UINT                    OffsetToLink;
    UINT                    LinkSize;
} APE_GROUP_OBJECT_INFO;
```

Members
pfnCompare
Checks if a given key matches the object's key.
pfnHash
Computes a ULONG-sized hash of a given key.
pStaticInfo
Static information about objects in this group.
Flags
Reserved for future use. Must be zero.
OffsetToLink
Offset in bytes from the start of the APE_OBJECT object to this link. It must be QUADWORD aligned.
LinkSize
The size reserved in each object for a QUADWORD-aligned collection-specific link. This must be equal to or larger than the link size of the collection used with the group.
Comments
This is filled out by the user and specified as one of the arguments to ApeInitializeGroup( ).
Implementation Notes
Refer to ApeInitializeGroup( ) for implementation-related notes.
9 APE_LOCK_STATE
Used for diagnostic lock tracking.

```
typedef struct_APE_LOCK_STATE
{
    ULONG              Order;
    ULONG              LocID;
```
-continued
```
    PAPE_STACK_RECORD  pSR;
} APE_LOCK_STATE;
```

Members
Order
User-specified order of the lock.
LocID
User-supplied Location ID, a magic number that identifies the source location where the lock was acquired.
pSR
Pointer to the current stack record.
Comments
ApeInitializeLockState( ) initializes an instance of this structure. Multiple locks should only be acquired in increasing order. More precisely, locks may also be acquired with the same order provided the pointers to the lock structures are in increasing numerical value. Additionally, in user mode, the same lock can be acquired multiple times by the same thread.
Implementation Notes
Refer to the notes for ApeInitializeLockState( ), ApeDeinitializeLockState( ), ApeTrackAcquireLock( ), and ApeTrackReleaseLock( ).
10 APE_OBJECT
The common header for all APE objects.

```
typedef struct_APE_OBJECT
{
    ULONG                    Sig;
    ULONG                    UserState;
    PAPE_OBJECT              pParentObject;
    PAPE_ROOT_OBJECT         pRootObject;
    PAPE_STATIC_OBJECT_INFO  pStaticInfo;
    ULONG                    ApeState;
    ULONG                    ApeRefs;
    APE_OS_LOCK              *pApeOSLock;
} APE_OBJECT;
```

Members
Sig
This is a user-defined signature. APE does not interpret this field. It is set to the value of the Sig field in the APE_STATIC_OBJECT_INFO structure associated with this object.
UserState
Keeps track of the user-specific state. APE does not interpret this field. This field is initialized to zero when the structure is initialized.
pParentObject
Points to the parent of this object.
pRootObject
Points to the root object of the object tee.
pStaticInfo
Points to the APE_STATIC_OBJECT_INFO structure associated with this object.
The remaining fields are private to APE.
Comments
ApeInitializeObject( ), ApeInitializeTask( ), and ApeCreateObjectInGroup( ) initialize an instance of APE_OBJECT. The first four fields of this structure are public but nevertheless should not be accessed directly. These fields should be accessed by means of the macros APE_SIG( ), APE_GET_USER_STATE( ), APE_SET_USER_STATE( ), APE_CHECK_USR_STATE( ), APE_PARENT( ), APE_ROOT( ), and APE_STATIC_INFO( ).

Implementation Notes

Most APE functions take one or more APE_OBJECTs as arguments. Information on the use of the private fields is presented below:

ApeState contains information on the internal state of the object. Some values of this state are Allocated, Deallocated, (for tasks) Idle, Starting, Active, Pending, and Ending.

ApeRefs maintains the object reference count, maintained using interlocked operations.

pApeOSLock points to a lock used exclusively by APE to serialize access to the APE_OBJECT. This lock is only held in the context of an APE function.

11 APE_ROOT_OBJECT

An extension of APE_OBJECT.

```
typedef struct_APE_ROOT_OBJECT
{
    APE_OBJECT                              Hdr;
    GUID                                    Guid;
    APE_OS_LOCK                             DefaultApeLock;
    APE_OS_LOCK                             DefaultGroupLock;
    APE_OS_LOCK                             LogLock;
    LIST_ENTRY                              listLog;
    UINT                                    NumLogEntries;
    APE_PFN_DEBUG_ASSERTFAIL                pfnAssertFailHandler;
    APE_PFN_DEBUG_ALLOCATE_ASSOCIATION      pfnAllocateAssociation;
    APE_PFN_DEBUG_DEALLOCATE_ASSOCIATION
                                            pfnDeallocateAssociation;
    APE_PFN_DEBUG_ALLOCATE_OBJECT_INFO      pfnAllocateDebugObjectInfo;
    APE_PFN_DEBUG_DEALLOCATE_OBJECT_INFO
                                            pfnDeallocateDebugObjectInfo;
    APE_PFN_DEBUG_ALLOCATE_LOG_ENTRY        pfnAllocateLogEntry;
    APE_PFN_DEBUG_DEALLOCATE_LOG_ENTRY      pfnDeallocateLogEntry;
    LIST_ENTRY                              listTasks;
    UINT                                    NumTasksInList;
    UINT                                    NumAssocIDs;
    char                                    **pszAssocIDDescriptions;
} APE_ROOT_OBJECT;
```

Members
  Hdr
    The common APE object header, APE_OBJECT.
    The remaining fields are private to APE.
  Comments
    This maintains information about a root object. The structure is initialized by ApeInitializeRootObject( ). The root object is the root of a tree of APE_OBJECTs. The object contains information, including several handlers, common to all objects in the tree.
  Implementation Notes
    These fields are filled in by ApeInitializeRootObject( ).
    Guid is for future use, to be able to track and enumerate all root objects across the entire system (not just the component).
    DefaultApeLock is a lock used to serialize access to all children of this root, unless the child specifies a different lock.
    DefaultGroupLock is a lock used to serialize access to all groups under this root, unless the group specifies its own lock.
    LogLock is a lock used to serialize access to object-specific logging.
    listLog lists log entries.
    NumLogEntries is the number of log entries.
    pfnAssertFailHandler is called if APE detects an assertion failure. Rather than raise an exception, APE simply calls this user-supplied handler.
    pfnAllocateAssociation is a user-supplied handler to allocate space for a debug association.
    pfnDeallocateAssociation is a user-supplied handler to deallocate an association.
    pfnAllocateDebugObjectInfo allocates an instance of object-specific diagnostic information. APE calls this when initializing a child provided that child specifies (via the pStaticInfo argument to ApeInitializeRootObject( )) that it requires extra diagnostic information.
    pfnDeallocateDebugObjectInfo deallocates an instance of object-specific diagnostic information.
    pfnAllocateLogEntry allocates an instance of an object-specific log entry.
    pfnDeallocateLogEntry deallocates an instance of an object-specific log entry.
    listTasks lists all tasks under this root which were initialized with the APE_FLG_TASK_DONT_ADD_TO_GLOBAL_LIST flag set (see ApeInitializeTask( )). This is used for diagnostic purposes only. APE provides debug support to display all tasks active under a root. APE also provides a facility to filter tasks based on some criterion, such as description or owning object type.
    NumTasksInList counts the tasks in the above list.
    NumAssocIDs counts the association IDs that have associated descriptions. See APE_DEBUG_ROOT_INFO for details.
    pszAssocIDDescriptions: see APE_DEBUG_ROOT_INFO for details.

12 APE_LOCK

An extension to the OS-specific lock that supports lock tracking.

```
typedef struct
{
    APE_OS_LOCK        OSLock;
    APE_LOCK_STATE     LockState;
} APE_SPIN_LOCK;
```

Members
  OSLock
    This is a KSPIN_LOCK in kernel mode and a CRITICAL_SECTION in user mode.

LockState
Tracks lock state.
Comments
Use ApeInitializeLock( ) and ApeDeinitializeLock( ), respectively, to initialize and de-initialize this structure. Use ApeAcquireLock( ), ApeReleaseLock( ), or their debug variants to acquire and release these locks.
Implementation Details
This is built on top of the APE_LOCK_STATE-related functions.

13 APE_STACK_RECORD

Keeps information relevant to the current call tree.

```
typedef struct _APE_STACK_RECORD
{
    UINT        LocID;
    union
    {
        struct
        {
            USHORT  TmpRefs;
            UCHAR   NumHeldLocks;
            UCHAR   Flags;
        };
        UINT    u;
    };
} APE_STACK_RECORD;
```

Members
LocID
A location ID specified when the stack record is declared.
TmpRefs
Count of temporary references taken with this stack record, modulo 65536.
NumHeldLocks
Count of currently held locks, modulo 256.
Flags
Reserved for use by APE.
u
Reserved for use by APE.
Comments
A stack record keeps track of currently held locks and temporary references. It is also used to keep track of which thread owns a particular lock. The macro DECLARE_STACK_RECORD( ) defines this structure on the stack. Macros APE_NO_LOCKS( ), APE_NO_TMPREFS( ), and APE_IS_LOCKED( ) use the information in the stack record. APE_STACK_ RECORD should be treated as opaque. The members are documented here purely for debugging purposes.
Implementation Notes
This is designed to be very light weight. The initialization of this structure is also designed to be very efficient.

Private fields of APE_STACK_RECORD:
Flags maintain internal state including whether this structure is the normal version or the extended version, APE_STACK_RECORD_DEBUG. Other flags may be added in the future, such as whether extra logging is enabled, or whether there has been an error while processing the current call tree.
u is present to allow efficient initialization of the stack record. Refer to APE_DECLARE_STACK_ RECORD( ) for details.
TmpRefs keeps track of temporary references. ApeTmpReferenceObject( ) increments this count and adds a reference to the specified object. ApeTmpDereferenceObject( ) decrements this count and removes a reference to the specified object. Macro APE_NO_TMPREFS( ) uses this to report whether there are outstanding temporary references.
NumHeldLocks is incremented each time ApeTrackAcquireLock( ) is called and is decremented each time ApeTrackReleaseLock( ) is called. Macro APE_NO_LOCKS( ) reads this value to report on whether there are locks held by the current call tree.

14 APE_STACK_RECORD_DEBUG

This is a larger version of the stack record and tacks on debugging-related fields after APE_STACK_RECORD. This information includes currently held locks for the stack record.

```
typedef struct _APE_ STACK_RECORD_DEBUG
{
    APE_STACK_RECORD                    SR;
    APE_PFN_METAFUNCTION                pfnMetaFunc;
    #define APE_NUM_LOCKS_TRACKED    4
    PAPE_LOCK_STATE             *HeldLocks[APE_NUM_LOCKS_TRACKED];
} APE_STACK_RECORD_DEBUG;
```

Members
SR
Non-debugging version of the stack record.
pfnMetaFunc
User-supplied function used to retrieve a user-supplied assertion failure handler.
HeldLocks
Keeps track of held locks.
Comments
Macro DECLARE_STACK_RECORD_DEBUG( ) defines this structure on the stack. This structure should be treated as opaque. The members are documented here purely for debugging purposes.
Implementation Notes
Refer to the implementation notes of APE_STACK_ RECORD for the SR field.
pfnMetaFunc is a user-supplied function specified at the time the stack record is created. If an error condition is detected, APE calls pfnMetaFunc( ) with the first parameter (pvContext) set to a pointer to the stack record and the second argument (FuncID) set to APE_ID_PFN_DEBUG_ASSERTFAIL. If pfnMetaFunc( ) returns a non-NULL value, this value is a pointer to an assertion failure handler of type APE_PFN_DEBUG_ASSERTFAIL. APE calls this handler to signal the error to the user. This metafunction mechanism is designed to allow other user-defined handlers to be returned in the future while preserving the size of APE_STACK_RECORD_DEBUG.

HeldLocks is an array of pointers to instances of APE_LOCK_STATE structures which are currently acquired in the context of the current call tree. Each time ApeTrackAcquireLock( ) is called, a pointer to the structure is saved in the next free location in HeldLocks. When ApeTrackReleaseLock( ) is called, this pointer is removed. This allows APE to check that locks are acquired in a consistent order and allows APE to provide debugger extensions to view the locks held by the current call tree. Refer to the implementation details of ApeTrackAcquireLock( ).

15 APE_STATIC_OBJECT_INFO

Provides information common to all instances of a particular type of APE_OBJECT. This information does not change.

```
typedef struct
{
   char                                *szDescription;
   UINT                                Sig;
   UINT                                Flags;
   APE_PFN_CREATE_OBJECT               pfnCreate;
   APE_PFN_DELETE_OBJECT               pfnDelete;
   APE_PFN_METAFUNCTION                pfnMetaFunction;
   PAPE_DEBUG_USER_STATE_DESCRIPTION   pUserStateDescription;
   UINT                                OffsetApeLock;
   UINT                                OffsetOwningGroup;
   UINT                                OffsetListChildren;
   UINT                                OffsetLinkSiblings;
   UINT                                OffsetDescription;
   UINT                                OffsetDebugInfo;
} APE_STATIC_OBJECT_INFO;
```

Members
  szDescription
    Description of this object type.
  Sig
    Signature shared by all objects of this type. This value is used to initialize the Sig field of APE_OBJECT.
  Flags
    If set to APE_STATIC_FLAGS_EXTRA_CHECKING, this enables extra diagnostics.
  pfnCreate
    Used only to create objects in a primary (owner) group.
  pfnDelete
    Object deletion function called when the object's reference count goes to zero.
  pfnMetaFunction
    Reserved. Should be NULL.
  pUserStateDescription
    OPTIONAL array of APE_DEBUG_USER_STATE_DESCRIPTION structures. The last element in this array has a mask field of zero. The debugger uses this array to display the object's UserState field.
  OffsetApeLock
    OPTIONAL offset in bytes from the start of the APE_OBJECT structure to a lock of type OS_LOCK. This lock is for the exclusive use of APE when working with this object. If this offset is zero, the parent's lock is used. It is unused and must be set to zero in root objects.
  OffsetOwningGroup
    Offset in bytes from the start of the APE_OBJECT structure to a pointer to the owning group, if there is one. It is unused and must be set to zero if the object is not part of an owning group.
  OffsetListChildren
    OPTIONAL offset in bytes from the start of the APE_OBJECT to a LIST_ENTRY for keeping track of children of this object. APE uses this purely for diagnostic purposes, although the user could potentially use this tree structure. Only children which have non-zero in OffsetLinkSiblings are added to this list. The list is Protected by this object's APE private lock.
  OffsetLinkSiblings
    OPTIONAL offset in bytes from the start of the APE_OBJECT to a LIST_ENTRY for being part of the parent's list of children. The list entry is protected by the parent object's APE private lock. It is unused and must be set to NULL in root objects.
  OffsetDescription
    OPTIONAL offset in bytes from the start of the APE_OBJECT to an object instance-specific description. This is an ANSI string and is used purely for diagnostic purposes.
  OffsetDebugInfo
    OPTIONAL offset in bytes from the start of the APE_OBJECT to a pointer to an APE_DEBUG_OBJECT_INFO structure.
Comments
  This is typically initialized as a constant global variable. It is one of the arguments to ApeInitializeObject( ), ApeInitializeRootObject( ), ApeInitializeTask( ), and ApeInitializeGroup( ). Several fields are offsets and, if non-zero, point to optional user-specific locations relative to the start of all APE_OBJECTs initialized with this structure. This scheme is flexible as it allows one or more optional fields to be specified without incurring any per-object overhead for fields that are not specified.
  If flag APE_STATIC_FLAGS_EXTRA_CHECKING is specified in the Flags field, APE enables extra diagnostics for all APE_OBJECTS initialized with this structure. Specifically, if this flag is specified and the OffsetDebugInfo field is filled out, APE allocates an instance of APE_DEBUG_OBJECT_INFO and saves a pointer to it at offset OffsetDebugInfo from the start of the APE_OBJECT. The allocated structure (one per object) is used to keep track of debug associations associated with the object. APE_STATIC_FLAGS_EXTRA_CHECKING enables several other checks for consistency. This mechanism allows extra diagnostics to be enabled at initialization time, not compile time.

See the implementation notes for APE_OBJECT, ApeInitializeObject( ), and ApeInitializeRootObject( ).

16 APE_TASK

Maintains information about an APE task.

```
typedef struct _APE_TASK
{
    APE_OBJECT              Hdr;
    APE_PFN_TASK_HANDLER    pfnHandler;
    LIST_ENTRY              linkFellowPendingTasks;
    LIST_ENTRY              listTasksPendingOnMe;
    UINT                    LocID;
    PVOID                   pThingIAmPendingOn;
    LIST_ENTRY              linkRootTaskList;
    PAPE_STACK_RECORD       pSR;
#if APE_KERNEL_MODE
    APE_PFN_TASK_HANDLER    pfnDpcHandler;
#endif
} APE_TASK;
```

Members
  Hdr
    The common APE object header.
  The remaining fields are private to APE.
Comments
  This is an extenuation of APE_OBJECT and is initialized by calling ApeInitializeTask( ). The task is then started by calling ApeStartTask( ).
  The user may add user-specific data to the end of an APE_TASK structure, because APE does not directly allocate or release the structure. See ApeInitializeTask( ) for details.
Implementation Notes
  Descriptions of private fields:
  pfnHandler is the user-supplied task handler.
  linkFellowPendingTasks is a link for inserting this task into the list of tasks pending on some other task.
  listTasksPendingOnMe lists tasks that are pending on this task.
  LocID is the location ID specified in ApeStartTask( ). It is used for diagnostic purposes only.
  pThingIAmPendingOn points to the "thing" that this task is currently pending on. It could be NULL (if the task is not currently pending or is pending because the user has explicitly called ApeSuspendTask( )), or could point to another task, or to some other APE_OBJECT (if the task is pending on the object's deletion), or to a group (if the task is pending on the group being deallocated). It is used for diagnostic purposes only.
  linkRootTaskList is a link for inserting this task into a flat list of all tasks under the root object. It is used for diagnostic purposes only, and a task is not inserted in this list if the APE_FLG_TASK_DONT_ADD_TO_GLOBAL_LIST flag is specified in ApeInitializeTask( ).
  pSR points to the stack record of the thread currently executing a task. It is used for diagnostic purposes only.

pfnDpcHandler (kernel mode only) is a user-supplied handler called if the task is resumed at DISPATCH level.

Section II: Functions

1 APE_PFN_DEBUG_ASSERTFAIL

This is the prototype of a user-supplied handler for assertion failures. Rather than raise an exception, APE calls this handler when it detects a fatal error.

```
typedef VOID (*APE_PFN_DEBUG_ASSERTFAIL)
(
    PAPE_OBJECT    pObj OPTIONAL,
    char           *szFormat,
    UINT_PTR       p1,
    UINT_PTR       p2
);
```

Parameters
  pObj
    The APE_OBJECT associated with the failure, if any.
  szFormat
    Textual description of failure, potentially with embedded "printf" tags.
  p1
    Additional value associated with the failure.
  p2
    Another additional value associated with the failure.
Comments
  The user specifies an assertion failure handler in two places: first, as the pfnAssertHandler field in APE_DEBUG_ROOT_INFO in the call to ApeInitializeRootObject( ) and, second, as the return value of a call to a user-supplied metafunction handler APE_PFN_METAFUNCTION( ) with FuncID set to APE_ID_PFN_DEBUG_ASSERTFAIL. For an example of a metafunction handler, see the structure APE_DECLARE_STACK_RECORD_DEBUG.
  The following is a sample assertion failure handler:

```
VOID MyAssertionHandler
(
    PAPE_OBJECT    pObj OPTIONAL,
    char           *szFormat,
    UINT_PTR       p1,
    UINT_PTR       p2
)
{
    DebugPrintf(szFormat, p1, p2);    // Print to debug console.
    DebugBreak( );                     // Break into debugger.
}
```

2 APE_PFN_METAFUNCTION

User-supplied handlers return function pointers associated with a specific function ID.

```
typedef PVOID(*APE_PFN_METAFUNCTION)
(
    PVOID             pvContext,
    APE_ID_FUNCTION   FuncID
);
```

Parameters
  pvContext
    Depends on FuncID and could be NULL.

FuncID
    This is an enumeration of "function ID". Each function ID is associated with a function pointer of a specific prototype. APE-defined function IDs have the MSB bit set. Users can define their own function IDs without the MSB bit set without risk of collision with APE function IDs.
    APE_ID_PFN_DEBUG_ASSERTFAIL is currently associated with APE_PFN-DEBUG_ASSERTFAIL.

Comments
    This is a simplistic analogue of the COM QueryInterface, except that it returns a single function rather than an interface. It is used in cases where potentially several handlers are required, but space needs to be conserved or future additions to the list of handlers are likely.
    Metafunction handlers are specified in two places: first, in the structure APE_STATIC_OBJECT_INFO and, second, in the structure APE_STACK_RECORD_DEBUG. The former location is currently a place holder to enable future options. The latter is currently used to obtain a user-supplied assertion failure handler associated with a stack record.
    The following code implements MyStackRecordDebugMetaFunction( ) which returns the user-supplied function MyAssertionHandler( ) if FuncID is APE_ID_PFN_DEBUG_ASSERTFAIL.

```
VOID MyAssertionHandler
(
    PAPE_OBJECT   pObj OPTIONAL,
    char          *szFormat,
    UINT_PTR      p1,
    UINT_PTR      p2
)
{
    DebugPrintf(szFormat, p1, p2);   // Print to debug console.
    DebugBreak( );                    // Break into debugger.
}
PVOID MyStackRecordDebugMetaFunction
(
    IN  PVOID             pvContext,
    IN  APE_ID_FUNCTION   FuncID
)
{
    #if DEBUG
        if(FuncID == APE_ID_PFN_DEBUG_ASSERTFAIL)
            return MyAssertionHandler;
    #endif
    return NULL;
}
```

Implementation Notes
    Metafunctions are used where there may be a need to define new kinds of handlers, but the existing data structures should be preserved. For example, if APE needed additional user-specific information about an APE_OBJECT, a new handler could be defined to provide this information. The new handler would be returned by the metafunction associated with APE_STATIC_OBJECT_INFO (the pfnMetaFunction field, currently unused). Space is critical for APE_STACK_RECORD_DEBUG, so a metafunction is used so that additional handlers associated with the stack record do not consume more stack space.

3 APE_DECLARE_STACK_RECORD_DEBUG
    Declare and initialize an instance of APE_STACK_RECORD_DEBUG on the stack. APE_DECLARE_STACK_RECORD_DEBUG (_SDr, _pSR, _LocID, _MetaFunc)

Parameters
    _SDr
        The name of the stack record variable.
    _pSR
        The name of a pointer to the stack record variable.
    _LocID
        A location ID, a user-supplied constant that bookmarks the place the stack record is created.
    _MetaFunc
        OPTIONAL user-supplied function used to retrieve diagnostic-related handlers (currently only a user-supplied assertion failure handler). The stack record is passed as the first argument (pvContext) to this function.

Comments
    This macro declares a stack record with extra debugging features. It tracks locks, ensuring that locks are acquired in the correct order and providing debug output to list the locks held by the current call tree.
    If an error condition is detected within any APE function that takes a stack record (debug version) as an argument, APE calls the stack record's pfnMetaFunc( ) with the first parameter (pvContext) set to point to the stack record and the second argument (FuncID) set to APE_ID_PFN_DEBUG_ASSERTFAIL. If pfnMetaFunc( ) returns a non-NULL value, the value points to an assertion failure handler of type APE_PFN_DEBUG_ASSERTFAIL. APE calls this handler to signal the error to the user.
    The following code declares a debug stack record. See APE_PFN_METAFUNCTION for the definition of the sample metafunction handler MyMetaFunction( ).

```
VOID Foo( VOID)
{
    APE_DECLARE_STACK_RECORD_DEBUG(SR, pSR,
        0x1609320, MyMetaFunction)
    UINT      u, v;
    ...
}
```

Locals may be declared after the call to the macro.
APE_DECLARE_STACK_RECORD_DEBUG declares the pointer pSR to be of type PAPE_STACK_RECORD, not PAPE_STACK_RECORD_DEBUG. This is so subsequent code need not distinguish between the debug and non-debug versions of the stack record.

Implementation Notes
    The macro is presented here in its entirety:

```
#define APE_DECLARE_STACK_RECORD_DEBUG(_SDr, _pSR,    \
    _LocID, _MetaFunc)                                 \
APE_STACK_RECORD_DEBUG   _SDr;                         \
PAPE_STACK_RECORD        _pSR = ((_SDr.LocID =         \
                                  _LocID),
    (_SRD.u = 0), (_SRD.Flags = APE_FLG_DEBUG_SR),     \
    (_SRD.pfnMetaFunc = MetaFunc), &_SDr.sr);
```

The above assignment statements allow additional local variables to be declared after the macro call in C code.

4 APE_DECLARE_STACK_RECORD
    Declare and initialize an instance of APE_STACK_RECORD on the stack.

APE_DECLARE_STACK_RECORD(_SDr, _pSR, _LocID)
Parameters
  _SDr
    The name of the stack record variable.
  _pSR
    The name of a pointer to the stack record variable.
  _LocID
    A location ID, a user-supplied constant that bookmarks the place the stack record is created.
Comments
  This macro declares a stack record.
  The following sample code declares a stack record.

```
VOID Foo(VOID)
{
    APE_DECLARE_STACK_RECORD (SR, pSR, 0x1609320)
    UINT    u, v;
    ...
}
```

Local variables may be declared after the call to the macro.
Implementation Notes
  The macro is presented here in its entirety:

```
#define APE_DECLARE_STACK_RECORD(_SR, _pSR, _LocID)    \
APE_STACK_RECORD            _SR;                       \
PAPE_STACK_RECORD           _pSR = ((_SR.LocID = _LocID), \
    (_SR.u = 0), &_SR);
```

5 APE_PFN_CREATE_OBJECT
  A user-supplied handler to allocate an initialize of APE_OBJECT. This handler is specified as the pfnCreate field in APE_STATIC_OBJECT_INFO and is used to create objects in primary (owner) groups.

```
typedefPAPE_OBJECT (*APE_PFN_CREATE_OBJECT)
(
    IN      PAPE_OBJECT         pParentObject,
    IN      PVOID               pvCreateParams,
    IN      PAPE_STACK_RECORD   pSR
);
```

Parameters
  pParentObject
    Parent of the object to be created.
  pvCreateParams
    A user-supplied value passed in the call to ApeCreateObjectInGroup( ).
  pSR
    The stack record.
Return Value
  If successful, the return value is an initialized APE_OBJECT.
Comments
  This handler is responsible for allocating memory for an object, for calling ApeInitializeObject( ) to initialize the APE-specific portions of the object, and for using pvCreateParams to initialize user-specific portions of the object.
  This handler is only called in the context of a call to ApeCreateObjectInGroup( ).

6 APE_PFN_DELETE_OBJECT
  A user-supplied handler to deallocate memory associated with an object.

```
typedefVOID (*APE_PFN_DELETE_OBJECT)
(
    IN      PAPE_OBJECT         pObject,
    IN      PAPE_STACK_RECORD   pSR
);
```

Parameters
  pObject
    The object to be deleted.
  pSR
    The stack record.
Comments
  APE calls this deletion function, specified in APE_STATIC_OBJECT_INFO, when the reference counter on the object goes to zero.

7 APE_PFN_DEBUG_ALLOCATE_ASSOCIATION
  A user-supplied handler to allocate space for a debug association.

```
typedefPAPE_DEBUG_ASSOCIATION
    (*APE_PFN_DEBUG_ALLOCATE_ASSOCIATION)
(
    PAPE_ROOT_OBJECT    pRootObject
);
```

Parameters
  pRootObject
    Root object associated with the allocation.
Return Value
  Allocated but unitialized structure of type APE_DEBUG_ASSOCIATION.
Comments
  APE calls this handler when it needs to add a debug association to an object. The association is deallocated when APE calls the user-supplied APE_PFN_DEBUG_DEALLOCATE_ASSOCIATION. The user may add user-specific data after the debug association.
  This handler is specified as the pfnAllocateAssociation field of APE_DEBUG_ROOT_INFO.
  Because associations are fixed-sized objects, the user may chose an efficient memory allocation scheme, such as look-aside lists, to manage memory.

8 APE_PFN_COMPLETION_HANDLER
  A user-supplied completion handler called when a root APE_OBJECT has been asynchronously de-initialized.

```
typedefVOID (*APE_PFN_COMPLETION_HANDLER)
(
    IN      PVOID       pvCompletionContext
);
```

Parameters
  pvCompletionContext
    The user-supplied completion context, supplied in the call to ApeDeinitializeRootObject( ).
Comments
  Refer to ApeDeinitializeRootObject( ) for details.

9 APE_PFN_DEBUG_ALLOCATE_OBJECT_INFO

A user-supplied handler to allocate space for an APE_DEBUG_OBJECT_INFO structure.

```
typedefPAPE_DEBUG_OBJECT_INFO
    (*APE_PFN_DEBUG_ALLOCATE_OBJECT_INFO)
(
    PAPE_ROOT_OBJECT    pRootObject
);
```

Parameters
  pRootObject
    The root object associated with the allocation.
  Return Value
    An allocated but unitialized APE_DEBUG_ASSOCIATION structure.
  Comments
    APE calls this handler to allocate extra diagnostic information associated with an APE_OBJECT. APE then initializes this structure (used internally to track debug associations and for per-object logging) and saves a pointer to it at a user-supplied offset from the start of the APE_OBJECT. The user-supplied offset is specified as the OffsetDebugInfo field of APE_STATIC_OBJECT_INFO.
    To deallocate the debug structure, APE calls the user-supplied handler APE_PFN_DEBUG_DEALLOCATE_OBJECT_INFO. Both the allocation and deallocation handlers are specified in APE_DEBUG_ROOT_INFO.
    The user may add user-specific data after the structure.
    Because these structures are fixed-sized objects, the user may chose an efficient memory allocation scheme, such as look-aside lists, to manage memory.

10 APE_PFN_DEBUG_DEALLOCATE_ASSOCIATION

A user-supplied handler to deallocate a previously allocated debug association.

```
typedefVOID
    (*APE_PFN_DEBUG_DEALLOCATE_ASSOCIATION)
(
    PAPE_DEBUG_ASSOCIATION    pAssoc,
    PAPE_ROOT_OBJECT          pRootObject
);
```

Parameters
  pAssoc
    The previously allocated debug association.
  pRootObject
    The root object associated with this association.
  Comments
    This handler is specified in APE_DEBUG_ROOT_INFO. For details, refer to APE_PFN_DEBUG_ALLOCATE_ASSOCIATION.

11 APE_PFN_DEBUG_DEALLOCATE_OBJECT_INFO

A user-supplied handler to deallocate a previously allocated object diagnostic structure.

```
typedefVOID
    (*APE_PFN_DEBUG_DEALLOCATE_OBJECT_INFO)
(
    PAPE_DEBUG_OBJECT_INFO    pDebugInfo,
    PAPE_ROOT_OBJECT          pRootObject
);
```

Parameters
  pDebugInfo
    The previously allocated object debug information.
  pRootObject
    The root object associated with this structure.
  Comments
    This handler is specified in APE_DEBUG_ROOT_INFO. For details, refer to APE_PFN_DEBUG_ALLOCATE_OBJECT_INFO.

12 APE_PFN_DEBUG_ALLOCATE_LOG_ENTRY

A user-supplied handler to allocate a per-object log entry.

```
typedefPAPE_DEBUG_LOG_ENTRY
    (*APE_PFN_DEBUG_ALLOCATE_LOG_ENTRY)
(
    PAPE_ROOT_OBJECT    pRootObject
);
```

Parameters
  pRootObject
    The root object associated with this entry.
  Return Value
    Uninitialized memory to store the log entry.
  Comments
    This handler is specified as part of APE_DEBUG_ROOT_INFO. The user may add data after this structure.

13 APE_PFN_DEBUG_DEALLOCATE_LOG_ENTRY

A user-supplied function to deallocate a previously allocated log entry.

```
typedefVOID (*APE_PFN_DEBUG_DEALLOCATE_LOG_ENTRY)
(
    PAPE_DEBUG_LOG_ENTRY    pLogEntry,
    PAPE_ROOT_OBJECT        pRootObject
);
```

Parameters
  pLogEntry
    The log entry to deallocate.
  pRootObject
    The root object associated with this entry.
  Comments
    See APE_PFN_DEBUG_ALLOCATE_LOG_ENTRY for details.

14 APE_PFN_TASK_HANDLER

A user-supplied task handler.

```
typedefVOID (*APE_PFN_TASK_HANDLER)
(
    IN PAPE_TASK              pTask,
    IN PAPE_STACK_RECORD      pSR
);
```

Parameters
  pTask
    The APE task being handled.
  pSR
    The stack record.
  Comments
    User-supplied task handlers implement asynchronous logic. The handler is specified in the call to ApeInitializeTask( ) and is called when the task is started (by a call to ApeStartTask( )) and again each time the task is resumed.

15 APE_PFN_GROUP_ENUMERATOR

A user-supplied handler to process one APE object in a group. This function is called repeatedly for each object in the group as long as the function returns a non-zero value. If the function returns zero, then enumeration is stopped.

```
typedef INT (*APE_PFN_GROUP_ENUMERATOR)
(
    PAPE_OBJECT        pHdr,
    PVOID              pvContext,
    PAPE_STACK_RECORD  pSR
);
```

Parameters
  pHdr
    The APE object.
  pvContext
    The user-supplied context. Both the handler and this context are passed in the call to ApeEnumerateObjectsInGroup( ).
  Return Value
    Non-zero value indicates enumeration can continue and zero indicates enumeration should stop.
Comments
  APE adds a temporary reference to the object before calling this handler and decrements the reference after the handler returns. No APE-internal locks are held when this handler is called.

16 APE_PFN_INITIALIZE_COLLECTION

A user-supplied function to initialize the user-supplied data structure to maintain the objects in a group.

```
typedef VOID (*APE_PFN_INITIALIZE_COLLECTION)
(
    PAPE_GROUP   pGroup
);
```

Parameters
  pGroup
    The group to organize.
Comments
  The CollectionState field of APE_GROUP is available for exclusive use by the user-supplied collection handling functions. This handler is responsible for initializing this state. It is called in the context of ApeInitializeGroup( ) and is specified in the APE_COLLECTION_INFO structure, which is an optional structure passed to ApeInitializeGroup( ).

17 APE_PFN_DEINITIALIZE_COLLECTION

A user-supplied handler to de-initialize the user-specific data structures associated with a group.

```
typedef VOID (*APE_PFN_DEINITIALIZE_COLLECTION)
(
    PAPE_GROUP   pGroup
);
```

Parameters
  pGroup
    The group containing the collection.
Comments
  The CollectionState field of APE_GROUP is available for exclusive use by the user-supplied collection handling functions. This handler is responsible for de-initializing this state after all objects have been removed from the group. It is called either in the context of ApeDeinitializeGroup( ) (if there are no objects in the group) or in the context of the deallocation handler of the last object to be removed from the group (for primary groups) or in the context of ApeRemoveObjectFromGroup( ) for the last object to be removed from a secondary group. This handler is specified in APE_COLLECTION_INFO, which is an optional structure passed to ApeInitializeGroup( ).

18 APE_PFN_CREATE_IN_COLLECTION

A user-supplied handler to create an object in the user-specified data structure that maintains the objects in the group.

```
typedef PAPE_OBJECT (*APE_PFN_CREATE_IN_COLLECTION)
(
         PAPE_GROUP   pGroup,
         ULONG        Flags,
    IN   PVOID        pvCreateParams,
    OUT  INT          *pfCreated
);
```

Parameters
  pGroup
    The group containing the collection.
  Flags
    Same as passed into ApeCreateObjectInGroup( ).
  pvCreateParams
    User-supplied creation-parameters, specified in ApeCreateObjectInGroup( ).
  pfCreated
    Set to TRUE if and only if the object was created.
  Return Value
    The allocated and initialized APE_OBJECT.
Comments
  This user-supplied handler is responsible for allocating and initializing an APE_OBJECT. It calls the pfnCreateHandler function specified in the STATIC_OBJECT_INFO structure associated with the group. It is responsible for inserting the object in the user-specific collection data structure.

19 APE_PFN_LOOKUP_IN_COLLECTION

A user-supplied handler to look up an object in a group using user-supplied algorithms.

```
typedef PAPE_OBJECT (*APE_PFN_LOOKUP_IN_COLLECTION)
(
    IN   PAPE_GROUP   pGroup,
    IN   PVOID        pvKey
);
```

Parameters
  pGroup
    The group to look up.
  pvKey
    A user-specified key.
  Return Value
    The object, if found, NULL otherwise.

20 APE_PFN_DELETE_IN_COLLECTION

A user-supplied handler to delete an object from a group.

```
typedef VOID (*APE_PFN_DELETE_IN_COLLECTION)
(
        IN      PAPE_OBJECT         pObject
);
```

Parameters
  pObject
    The object to delete.
Comments
  This function applies user-specified algorithms to remove the object from the group.

21 APE_PFN_INITIALIZE_COLLECTION_ITERATOR

A user-supplied function to initialize the user-specific state associated with a collection iterator.

```
typedef VOID (*APE_PFN_INITIALIZE_COLLECTION_ITERATOR)
(
        IN      PAPE_GROUP           pGroup,
        IN      PAPE_GROUP_ITERATOR  pIterator
);
```

Parameters
  pGroup
    The group over which to iterate.
  pIterator
    A partially initialized iterator structure. The user is responsible for filling out the CollectionState field.
Comments
  The user controls the algorithms that organize the objects in the group, hence the user is responsible for setting up the iterator. This function is called in the context of ApeInitializeGroupIterator( ).

22 APE_PFN_DEINITIALIZE_COLLECTION_ITERATOR

De-initialize a previously initialized collection iterator.

```
typedef VOID
(*APE_PFN_DEINITIALIZE_COLLECTION_ITERATOR)
(
        IN      PAPE_GROUP           pGroup,
        IN      PAPE_GROUP_ITERATOR  pIterator
);
```

Parameters
  pGroup
    The group associated with the iterator.
  pIterator
    The iterator to de-initialize.
Comments
  This function uses user-specific operations to clean up an iterator.

23 APE_PFN_GET_NEXT_IN_COLLECTION

A user-specified function to get the next object in a group.

```
typedef PAPE_OBJECT
(*APE_PFN_GET_NEXT_IN_COLLECTION)
(
        IN      PAPE_GROUP_ITERATOR  pIterator
);
```

Parameters
  pIterator
    The iterator for the group.

Return Value
  The next object in the group.
Comments
  This function applies user-specific algorithms to return the next object in the group. This function is called in the context of ApeGetNextObjectInGroup( ).

24 APE_PFN_ENUMERATE_COLLECTION

A user-supplied handler to enumerate the objects in a group.

```
typedef VOID (*APE_PFN_ENUMERATE_COLLECTION)
(
        IN  PAPE_GROUP                 pGroup,
        IN  APE_PFN_GROUP_ENUMERATOR   pfnFunction,
        IN  PVOID                      pvContext,
        IN  PAPE_STACK_RECORD          pSR
);
```

Parameters
  pGroup
    The group over which to enumerate.
  pfnFunction
    The user-supplied function.
  pvContext
    A user-supplied context.
  pSR
    The stack record.
Comments
  This function is called in the context of ApeEnumerateObjectsInGroup( ). The handler is responsible for using user-provided algorithms to enumerate over the objects in the group.

25 APE_PFN_COMPARE_KEY

A user-provided function to compare a user-supplied key with an object.

```
typedef BOOLEAN (*APE_PFN_COMPARE_KEY)
(
        IN      PVOID           pKey,
        IN      PAPE_OBJECT     pObject
);
```

Parameters
  pKey
    The user-supplied key.
  pObject
    The object with which to compare the key.
Return Value
  TRUE if the key does not match the object and FALSE otherwise.
Comments
  This function is specified when initializing a group as part of the APE_GROUP_OBJECT_INFO structure passed into ApeInitializeGroup( ). APE treats pKey as an opaque handle and relies on the compare key function to determine if a key matches an object. This allows the key to take an arbitrary form. It could be a value of size PVOID or it could point to a user-defined structure that contains the key data.
  APE calls the compare key function in the context of ApeCreateObjectInGroup( ) or ApeLookupObjectInGroup( ), passing in the value of pKey.

26 APE_PFN_HASH_KEY

A user-provided function to compute a ULONG-sized hash from the supplied key.

```
typedef ULONG (*APE_PFN_HASH_KEY)
(
            IN           PVOID          pKey
);
```

Parameters
  pKey
    The user-supplied key.
Return Value
  A ULONG-sized hash value.
Comments
  This function is specified when initializing a group as part of the APE_GROUP_OBJECT_INFO structure passed into ApeInitializeGroup( ). APE treats pKey as an opaque handle and relies on the hash key function to compute a hash value, which is used internally to organize the objects in a data structure designed for efficient lookup. This allows the key to take an arbitrary from. It could be a value of size PVOID or it could point to a user-defined structure that contains the key data.
  APE calls the hash key function in the context of ApeCreateObjectInGroup( ) or ApeLookupObjectInGroup( ), passing in the value of pKey.
Implementation Details
  APE requires the user to supply the hashing function so that arbitrary keys may be used. The actual algorithms used to organize the objects in the group may or may not use this hash value. Typically the algorithms (which depend on the specific collection mechanism used) use the hash value for a quick lookup. If the hash values match (a simple integer comparison), then an additional call is made to the compare key function APE_PFN_COMPARE_KEY( ) to do an exact comparison.

27 APE_PARENT_OBJECT

Returns the parent of the specified object.
APE_PARENT_OBJECT(_pObj)
Parameters
  _pObj
    The object whose parent should be returned.
Return Value
  The parent object or itself if pObj is a root object.
Comments
  Use this macro instead of directly accessing the pParent Object field of APE_OBJECT.
Implementation Notes
  APE_PARENT_OBJECT( ) is presented below:
    #define           APE_PARENT_OBJECT(_pObj)
      ((_pObj)→ pParentObject)

28 APE_SET_USER_STATE

Sets the UserState field of an APE object as follows:

```
#define APE_SET_USER_STATE(_pObj, _Mask, _Val)              \
    ((_pObj)->UserState) = ((_pObj)->UserState) & ~(_Mask)) | (_Val))
```

Parameters
  _pObj
    The object whose UserState is to be set.
  _Mask
    Selects the bits in UserState to be used in this operation.
  _Val
    The value to set.
Return Value
  The new value for the user state.
Comments
  The user is, not required to use this macro when setting the UserState field. The user is responsible for serializing access to UserState.

29 APE_CHECK_USER_STATE

Return the expression:

```
#define APE_CHECK_USER_STATE, (_Obj, _Mask, _Val)           \
    ((((_pObj)->UserState) & (_Mask)) == (_Val))
```

Parameters
  _pObj
    Check the UserState of this object.
  _Mask
    Selects the bits in UserState to be used in this operation.
  _Val
    Check the UserState against this value.
Comments
  The user is not required to use this macro when checking the UserState field. The user is responsible for serializing access to UserState.

30 APE_GET_USER_STATE

Return the expression (((_pObj)→State) & (_Mask))
define APE_GET_USER_STATE(_pObj, _Mask)
Parameters
  _pObj
    Get the UserState of this object.
  _Mask
    Selects the bits in UserState to be used in this operation.
Comments
  The user is not required to use this macro when getting the UserState field. The user is responsible for serializing access to UserState.

31 APE_NO_LOCKS

Returns non-zero if there no tracked locks currently held by the current call tree, as represented by the specified stack record.
APE_NO_LOCKS(_pSR)
Parameters
  _pSR
    The stack record.
Return Value
  Non-zero if no locks are held, zero if locks are held. More precisely, the return value is non-zero if the number of locks held is zero, modulo 256.
Comments
  This macro looks at the lock tracking information maintained in _pSR. This information is maintained by calls to ApeTrackAcquireLock( ) and ApeTrackReleaseLock( ).
Implementation Notes
  #define    APE_NO_LOCKS(_pSR)    (_pSR)→HeldLocks==0)
  The HeldLocks field of the stack record keeps track of the total number of outstanding locks, modulo 256, because HeldLocks is eight bits.

32 APE_NO_TMPREFS

Returns non-zero if there are no temporary references outstanding in the current call tree, as represented by the stack record.

APE_NO_TMPREFS(_pSR)

Parameters

_pSR

The stack record of the current call tree.

Return Value

Non-zero value if the value of outstanding temporary references, modulo 65536, is zero, zero otherwise.

Comments

The stack record keeps track of the number of outstanding temporary references. Various APE functions impact this temporary reference count, most notably ApeTmpReferenceObject( ) and ApeTmpDereferenceObject( ). ApeCreateObjectInGroup( ) and ApeLookupObjectInGroup( ) also add a temporary reference to the object before returning it. The group enumerators and iterators add a temporary reference to the object before they call the user-supplied enumeration function or return the next object in the iteration.

Implementation Notes define APE_NO_TMPREFS(_pSR) ((_pSR)→TmpRefs==0)

The TmpRef field of the stack record keeps track of outstanding temporary references, modulo 65536.

33 APE_IS_LOCKED

Returns TRUE if the current lock, represented by _pLockState, is locked by the current call tree, as represented by stack record _pSR.

APE_IS_LOCKED(_pLockState, _pSR)

Parameters

_pLockState

A pointer to an APE_LOCK_STATE, which is used to track the use of a particular lock.

_pSR

The stack record of the current call tree.

Return Value

TRUE if the lock is acquired by the current call tree.

Comments

This macro can be used to verify whether or not a particular lock is locked by the current thread. This assumes that the current thread used either ApeTrackAcquireLock( ) or ApeAcquireLock( ) with the lock.

34 ApeInitializeLockState

Initializes a structure used for tracking a particular lock.

```
VOID ApeInitializeLockState
(
    IN      PAPE_LOCK_STATE    pLockInfo,
    IN      UINT               Level
);
```

Parameters pLockInfo

An uninitialized structure.

Level

A user-supplied level to be associated with this lock. APE ensures that locks are acquired in order of increasing lock level to reduce the chance of deadlock.

Comments

Lock tracking uses a combination of APE_LOCK_STATE structures (one per lock tracked) and APE_STACK_RECORD structures (one per call tree). This function initializes APE-private fields within APE_LOCK_STATE.

35 ApeDeinitializeLockState

De-initializes an APE_LOCK_STATE structure.

```
VOID ApeDeinitializeLockState
(
    IN      PAPE_LOCK_STATE    pLockInfo
);
```

Parameters pLockInfo

The structure to be de-initialized.

Comments

This function should only be called after the last call to any other lock tracking function, such as ApeTrackAcquireLock( ). It cleans up the internal state of APE_LOCK_STATE.

36 ApeTrackAcquireLock

Tracks the acquiring of a lock.

```
VOID ApeTrackAcquireLock
(
    IN      PAPE_LOCK_STATE     pLockInfo
    IN      PAPE_STACK_RECORD   pSR
);
```

Parameters pLockInfo

The structure keeping track of a particular lock.

pSR

The stack record of the current call tree.

Comments

Calling ApeTrackAcquireLock( ) records the fact that the lock was acquired by the current call tree, as represented by pSR. APE checks that the lock was not already locked and verifies that locks are acquired in increasing order of the level field. The latter verification is only done if pSR points to the debug-enhanced version of the stack record, APE_STACK_RECORD_DEBUG.

Call ApeTrackReleaseLock( ) to record the fact that the lock has been released. Macros APE_NO_LOCKS and APE_IS_LOCKED may be used to make certain assertions about the state of a lock with respect to the current call tree.

Implementation Notes

ApeTrackReleaseLock( ) increments the APE_STACK_RECORD field NumHeldLocks. It also sets the pSR field of APE_LOCK_STATE to the passed in value of pSR after first asserting that the pSR field is NULL. If pSR is of type APE_STACK_RECORD_DEBUG, ApeTrackAcquireLock( ) adds a pointer to pLockInfo to the HeldLocks array inside APE_STACK_RECORD_DEBUG if the number of outstanding locks is less than APE_NUM_LOCKS_HELD.

37 ApeTrackReleaseLock

Tracks the release of a particular lock.

```
VOID ApeTrackReleaseLock
(
        IN      PAPE_LOCK_STATE         pLockInfo,
        IN      PAPE_STACK_RECORD       pSR
);
```

Parameters
   pLockInfo
      The lock state used to track a particular lock.
   pSR
      The stack record of the current call tree.
Comments
   This function is called to track the release of a lock by the current thread. It is the inverse operation to ApeTrackAcquireLock( ).

38 ApeInitializeLock

Initializes the structure APE_LOCK.

```
VOID ApeInitializeLock
(
        IN      PAPE_LOCK               pLock,
        IN      PAPE_STACK_RECORD       pSR
);
```

Parameters
   pLock
      A pointer to an unitialized APE_LOCK structure.
   pSR
      The stack record of the current call tree.
Comments
   This function initializes an appropriate OS-specific lock as well as the associated APE_LOCK_STATE structure.
Implementation Notes
   An APE_LOCK structure contains an APE_LOCK_STATE structure plus an OS-specific lock. ApeInitializeLock( ) initializes both these elements.

39 ApeDeinitializeLock

De-initializes an APE_LOCK structure.

```
VOID ApeDeinitializeLock
(
        IN      PAPE_LOCK               pLock,
        IN      PAPE_STACK_RECORD       pSR
);
```

Parameters
   pLock
      The lock to be de-initialized.
   pSR
      The stack record of the current call tree.
Comments
   This function must be called after any other calls involving this lock.

40 ApeAcquireLock

Acquires the specified lock.

```
VOID ApeAcquireLock
(
        IN      PAPE_LOCK               pLock,
        IN      PAPE_STACK_RECORD       pSR
);
```

Parameters
   pLock
      The lock to acquire.
   pSR
      The stack record of current call tree.
Comments
   This function combines two operations: acquiring the OS-specific lock in pLock as well as tracking the fact that the lock was acquired (analogous to ApeTrackAcquireLock( )).
   Call ApeReleaseLock( ) to release the lock when done.

41 ApeReleaseLock

Releases a lock previously acquired using ApeAcquireLock( ).

```
VOID ApeReleaseLock
(
        IN      PAPE_LOCK               pLock,
        IN      PAPE_STACK_RECORD       pSR
);
```

Parameters
   pLock
      The lock to release.
   pSR
      The stack record of the current call tree.
Comments
   This function releases the OS-specific lock within pLock and tracks the fact that the lock has been released (analogous to ApeTrackReleaseLock( )).

42 ApeAcquireLockDebug

Similar to ApeAcquireLock( ) except that it performs some additional checks.

```
VOID ApeAcquireLockDebug
(
        IN      PAPE_LOCK               pLock,
        IN      UINT                    LocID,
        IN      PAPE_STACK_RECORD       pSR
);
```

Parameters
   pLock
      The lock to acquire.
   pLocID
      A location ID, marking the place in the code where this call was called.
   pSR
      The stack record of the current call tree.
Comments
   Users should use this version in debug builds.

43 ApeReleaseLockDebug

A version of ApeReleaseLock( ) with enhanced debugging.

```
VOID ApeAcquireLockDebug
(
        IN      PAPE_LOCK               pLock,
        IN      UINT                    LocID,
        IN      PAPE_STACK_RECORD       pSR
);
```

Parameters
  pLock
    The lock to release.
  pLocID
    A location ID, marking the place in the code where the lock was released.
  pSR
    The stack record of the current call tree.
Comments
  This version should be used in debug versions of the code.
44 ApeInitializeRootObject
  Initializes an APE root object.

```
VOID ApeInitializeRootObject
(
        OUT     PAPE_ROOT_OBJECT        pRootObject,
        IN      PAPE_STATIC_OBJECT_INFO pStaticInfo,
        IN      PAPE_DEBUG_ROOT_INFO    pDebugRootInfo,
        IN      PAPE_STACK_RECORD       pSR
);
```

Parameters
  pRootObject
    Points to uninitialized user-provided memory.
  pStaticInfo
    Specifies static (unchanging) information about the root object.
  pDebugRootInfo
    Specifies diagnostic-related information about the root object.
  pSR
    The stack record of the current call tree.
Comments
  This function fills out internal fields of APE_ROOT_OBJECT based on the passed in parameters. The root object must be initialized before any other APE_OBJECTs can be created. pStaticInfo and pDebugRootInfo must remain valid and unchanging for as long as the root object is allocated. ApeInitializeRootObject( ) does not add a temporary reference to pRootObject. ApeDeinitializeRootObject( ) must be called to de-initialize a previously initialized root object.
45 ApeDeinitializeRootObject
  De-initializes a previously initialized root object.

```
VOID ApeDeinitializeRootObject
(
  IN PAPE_ROOT_OBJECT           pRootObject,
  IN APE_PFN_COMPLETION_HAN-    pfnCompletionHandler,
     DLER
  IN PVOID                      pvCompletionContext,
  IN PAPE_STACK_RECORD          pSR
);
```

Parameters
  pRootObject
    The root object to be de-initialized.
  pfnCompletionHandler
    A user-supplied completion handler, called after the root object has been de-initialized (which may happen asynchronously).
  pvCompletionContext
    A user-supplied context specified when calling the completion handler.
  pSR
    The stack record of the current call tree.
Comments
  This function completes asynchronously, only after all children of the root object have been deleted and the reference count of the root object goes to zero. No specific action is taken to delete the child objects. The user is responsible for deleting any objects, groups, and other APE-related structures associated with the root, but the user does not need to do this before calling ApeDeinitializeRootObject( ).
  The typical sequence for unloading an APE-enabled application is to initiate the unloading of all children asynchronously, call ApeDeinitializeRootObject( ), and then wait for the completion handler to be called. At this time, the user can be certain that there is no more activity or allocated resources.
Implementation Notes
  APE calls the specified completion handler when the root object's reference count goes to one. APE added a reference count to the root object at the time the object was initialized (in ApeInitializeRootObject( )).
46 ApeInitializeObject
  Initializes a non-root APE_OBJECT.

```
VOID ApeInitializeObject
(
        OUT     PAPE_OBJECT             pObject,
        IN      PAPE_OBJECT             pParentObject,
        IN      PAPE_STATIC_OBJECT_INFO pStaticInfo,
        IN      PAPE_STACK_RECORD       pSR
);
```

Parameters
  pObject
    Uninitialized memory to store the object.
  pParentObject
    The object's parent object.
  pStaticInfo
    Static information common to all instances of this object.
  pSR
    The stack record of the current call tree.
Comments
  This function sets up the internal fields of an APE object, with reference to the parent and pStaticInfo. APE guarantees that the parent will not be deallocated as long as pObject is alive. APE uses the parent's values for certain items like a lock for internal use, if these items are not available specific to this object. See the description of APE_STATIC_OBJECT_INFO for details.
  The function adds a temporary reference to the object before returning. The user is responsible for removing this temporary reference (by calling ApeTmpDereferenceObject( )), after first ensuring that the object is going to remain alive for some other reason, say by adding the object to a group, or by cross referencing the object, or by creating child objects, or by externally referencing the object.

APE calls the object's user-supplied deallocation function when the reference counter goes to zero. The deallocation function is specified in the pfnDelete field of pStaticInfo.

47 ApeCrossReferenceObjects

Adds a reference to two objects.

```
VOID ApeCrossReferenceObjects
(
        IN      PAPE_OBJECT     pObj1,
        IN      PAPE_OBJECT     pObj2
);
```

Parameters
  pObj1
    The first object to be referenced.
  pObj2
    The second object to be referenced.
  Comments
    Use this function if one object contains a pointer to the other. This ensures that both objects remain alive as long as the cross reference exists. The user is responsible for actually setting up the linkage. Use ApeUnCrossReferenceObjects( ) when removing the link between the objects.
    ApeCrossReferenceObjects( ) simply increments the reference counter of the two objects. ApeCrossReferenceDebug( ), the debug version of this function, tracks the cross reference.

48 ApeUnCrossReferenceObjects

Removes references to two objects previously added by ApeCrossReferenceObjects( ).

```
VOID ApeUnCrossReferenceObjects
(
        IN      PAPE_OBJECT     pObj1,
        IN      PAPE_OBJECT     pObj2
);
```

Parameters
  pObj1
    The first object.
  pObj2
    The second object.
  Comments
    This is the inverse operation to ApeCrossReferenceObjects( ). The debug version, ApeCrossReferenceObjectsDebug( ), verifies that the objects were previously cross referenced. The user is responsible for actually removing any pointer linkages between the two objects.

49 ApeCrossReferenceObjectsDebug

The debug version of ApeCrossReferenceObjects( ) performs additional checks.

```
VOID ApeCrossReferenceObjectsDebug
(
        IN      PAPE_OBJECT     pObj1,
        IN      PAPE_OBJECT     pObj2,
```

-continued

```
        IN      ULONG           LocID,
        IN      ULONG           AssocID
);
```

Parameters
  pObj1
    The first object to cross reference.
  pObj2
    The second object to cross reference.
  LocID
    A location ID, marking the place in the source code where the cross reference was made.
  AssocID
    An identifier labeling the cross reference.
  Comments
    In addition to the work done by ApeCrossReferenceObject( ), this function adds a debug association (see APE_DEBUG_ASSOCIATION) to both pObj1 and pObj2 to keep track of the fact that this cross reference exists. APE asserts that there are no outstanding cross references when an object is deleted. APE also provides debug utilities to dump the list of outstanding cross references in the debugger.
    Two objects cannot be cross referenced twice specifying the same AssocID. APE asserts this fact.
    Use ApeUnCrossReferenceObjectsDebug( ) to remove the cross reference.

50 ApeUnCrossReferenceObjectsDebug

The inverse of ApeCrossReferenceObjectsDebug( ).

```
VOID ApeUnCrossReferenceObjectsDebug
(
        IN      PAPE_OBJECT     pObj1,
        IN      PAPE_OBJECT     pObj2,
        IN      ULONG           LocID,
        IN      ULONG           AssocID
);
```

Parameters
  pObj1
    The first object.
  pObj2
    The second object.
  LocID
    A location ID, marking the spot in the source code that made this call.
  AssocID
    An association ID identifying the cross reference being removed. APE asserts that this cross reference exists.
  Comments
    This is the debug-enhanced version of ApeUnCrossReferenceObject( ). See ApeCrossReferenceObjectsDebug for details( ).

51 ApeExternallyReferenceObject

Adds a reference to an object to reflect the fact that some non-APE entity has a pointer to the object.

```
VOID ApeExternallyReferenceObject
(
        IN      PAPE_OBJECT     pObj
);
```

Parameters
pObj
The object to be referenced externally.
Comments
APE simply adds a reference count to pObj, ensuring that the object remains alive as long as the external entity has a reference to it. The user is responsible for making the actual link to the external entity (which is typically some non-APE data structure or some external component that is being passed this object as an opaque handle).
52 ApeExternallyDereferenceObject
Removes the reference added by ApeExternallyReferenceObject( ).

```
VOID ApeExternallyDereferenceObject
(
    IN      PAPE_OBJECT     pObj
);
```

Parameters
pObj
The object to be de-referenced.
Comments
This is the inverse of ApeExternallyReferenceObject( ). The user is responsible for ensuring that the external entity no longer has a reference to this pointer.
53 ApeExternallyReferenceObjectDebug
A version of ApeExternallyReferenceObject( ) with extra debug checks.

```
VOID ApeExternallyReferenceObjectDebug
(
    IN      PAPE_OBJECT     pObj,
    IN      UINT_PTR        ExternalEntity,
    IN      ULONG           LocID,
    IN      ULONG           AssocID
);
```

Parameters
ExternalEntity
The external entity which will have a reference to pObj. It is opaque to APE.
AssocID
A identifier of this reference.
Comments
This version performs checks similar to ApeCrossReferenceObjectsDebug( ), keeping track of the external reference.
Use ApeExternallyReferenceObjectDebug( ) to remove the reference.
54 ApeExternallyReferenceObjectDebug
The inverse of ApeExternallyReferenceObjectDebug( ).

```
VOID ApeExternallyDereferenceObjectDebug
(
    IN      PAPE_OBJECT     pObj,
    IN      UINT_PTR        ExternalEntity,
    IN      ULONG           LocID,
    IN      ULONG           AssocID
);
```

Comments
See ApeExternallyReferenceObjectDebug( ).

55 ApeTmpReferenceObject
Adds a temporary reference to an APE object.

```
VOID ApeTmpReferenceObject
(
    IN      PAPE_OBJECT         pObj,
    IN      PAPE_STACK_RECORD   pSR
);
```

Parameters
pObj
The object to be temporarily referenced.
pSR
The stack record of the current call tree.
Comments
APE increments the object's reference counter and increments the count of TmpRefs maintained in pSR. The macro APE_NO_TMPREFS( ) may be used to assert that there are no outstanding temporary references in the current call tree.
Use ApeTmpDeferenceObject( ) to remove the temporary reference when the user is done using the object in the current call tree.
56 ApeTmpDereferenceObject
The inverse of ApeTmpReferenceObject( ).

```
VOID ApeTmpReferenceObject
(
    IN      PAPE_OBJECT         pObj,
    IN      PAPE_STACK_RECORD   pSR
);
```

Comments
This removes the reference added by ApeTmpReferenceObject( ) in both pObj and pSR. Refer to ApeTmpReferenceObject( ) for details.
This function can be used to remove temporary references added by certain other functions, like ApeLookupObjectInGroup( ) and ApeInitializeObject( ).
57 ApeRawReference
Increments the reference counter.
ApeRawReference(_pObj)
Parameters
_pObj
The APE object whose reference counter is to be incremented.
Comments
This is an interlocked increment operation on the APE_OBJECT's reference counter. This version is used in time critical portions of the user's code.
Use ApeRawDereference( ) to remove this reference.
58 ApeRawDereference
The inverse of ApeRawReference( ).
ApeRawDereference(_pObj)
Parameters
The object to be de-referenced.
Comments
See ApeRawReference( ) for details.
59 ApeDebugAddAssociation
Adds a debug association to an object.

```
VOID ApeDebugAddAssociation
(
    IN      PAPE_OBJECT     pObject,
```

```
    IN      ULONG       LocID,
    IN      ULONG       AssociationID,
    IN      ULONG_PTR   Entity,
    IN      ULONG       Flags
);
```

Parameters
  pObject
    The object that will contain the debug association.
  LocID
    A location ID, marking the place in the source code where this association is made.
  AssociationID
    A name or label identifying this association.
  Entity
    An optional entity to be associated with this association.
  Flags
    APE_ASSOCFLAGS_SINGLE_INSTANCE specifies that only association of this type is allowed.
Comments
  A debug association is only added if the object has diagnostics enabled (the object has a APE_DEBUG_OBJECT_INFO object). The LocID, AssociationID, Entity, and Flags values are saved as part of the association. In addition, if APE_ASSOCFLAGS_SINGLE_INSTANCE is specified, APE asserts that more than one association with the same value for AssociationID cannot be added to the same object.
  APE does not increment the object's reference counter when adding the association.
  ApeDebugDeleteAssociation( ) removes the association. APE asserts that there are no debug associations at the time the object is deallocated and the user is responsible for removing all associations before the object is deallocated.
Implementation Notes
  This function allocates a structure of type APE_DEBUG_ASSOCIATION and inserts this structure into a hash table of associations maintained in the APE_DEBUG_OBJECT_INFO structure associated with pObject.
  Certain other APE functions automatically add APE-specific associations. For example, ApeCrossReferenceObjectsDebug( ) adds a debug association to both of the objects.
  APE provides debug utilities to dump the list of outstanding associations attached to a particular object.

60 ApeDebugDeleteAssociation
Removes a debug association previously added by ApeDebugAddAssociation( ).

```
VOID ApeDebugDeleteAssociation
(
    IN      PAPE_OBJECT     pObject,
    IN      ULONG           LocID,
    IN      ULONG           AssociationID,
    IN      ULONG_PTR       Entity
);
```

Parameters
  pObject
    The object containing the association to remove.
  LocID
    A location ID, marking the place in the source code where this association is removed.
  AssociationID
    A name or label identifying this association.
  Entity
    An optional entity that has been associated with this association.
Comments
  Refer to ApeDebugAddAssociation( ) for details.

61 ApeDebugAssertAssociation
Asserts that the specified debug association exists.

```
VOID ApeDebugAssertAssociation
(
    IN      PAPE_OBJECT     pObject,
    IN      ULONG           LocID,
    IN      ULONG           AssociationID,
    IN      ULONG_PTR       Entity,
);
```

Parameters
  pObject
    The object to assert as having the association.
  LocID
    A location ID, marking the place in the source code where this association is asserted.
  AssociationID
    A name or label identifying this association.
  Entity
    An optional entity that has been associated with this association.
Comments
  APE asserts that the specified association exists on the object. APE fails the assertion (and calls the user's assertion failure handler) if the assertion does not exist. This function is useful for temporary diagnosis of problems as well as for asserting that objects have reached a certain state at a certain time.

62 ApeInitializeTask
Initializes an APE task.

```
VOID ApeInitializeTask
(
    OUT     PAPE_TASK               pTask,
    IN      PAPE_OBJECT             pParentObject,
    IN      APE_PFN_TASK_HANDLER    pfnHandler,
#if APE_KERNEL_MODE
    IN      APE_PFN_TASK_HANDLER    pfnDpcHandler,
#endif
    IN      PAPE_STATIC_OBJECT_INFO pStaticInfo,
    IN      UINT                    Flags,
    IN      PAPE_STACK_RECORD       pSR
);
```

Parameters
  pTask
    Unitialized memory for the task.
  pParentObject
    The parent of the task.
  pfnHandler
    A user-supplied task handler.
  pfnDpcHandler
    (Kernel mode only) A user-supplied task handler to be called at DISPATCH level.

pStaticInfo
Provides information common to all instances of this task.
Flags
APE_FLG_TASK_DONT_ADD_TO_GLOBAL_ LIST specifies that this task should not be added to the global list of tasks under the root.
APE_FLG_TASK_SYNC_RESUME specifies that the task handler be called in the context of the call that causes the task to resume.
pSR
The stack record of the current call tree.
Comments
This function initializes an APE task using the specified arguments. The task is then started by calling ApeStartTask( ). ApeInitializeTask( ) adds a temporary reference on the initialized task. The user is responsible for removing this temporary reference before exiting the current call tree.
Implementation Notes
ApeInitializeTask( ) internally first calls ApeInitializeObject( ), initializes internal task-specific fields (refer to implementation notes for APE_TASK), and then initializes the internal ApeState field to indicate that the task is in the INITED state. The tasks' task handler as well as other parameters specified above are saved as private fields of APE_TASK.

63 ApeStartTask
Starts the task by calling the task's user-supplied task handler.

```
VOID ApeStartTask
(
    IN      PAPE_TASK           pTask,
    IN      UINT                LocID,
    IN      PAPE_STACK_RECORD   pSR
);
```

Parameters
pTask
The task to be started.
LocID
A location ID, identifying the location in the source code where the task is started.
pSR
The current stack record.
Comments
APE calls the task's user-supplied task handler. The user is responsible for initializing any user-specific data located after the APE_TASK portion of the task before calling ApeStartTask( ). The task ends (and the task is deallocated) when the task handler returns unless the task handler calls one of several APE functions to suspend the task.
Implementation Notes
ApeStartTask( ) is implemented according to the following pseudo-code:

```
Set the state of the task to ACTIVE.
Set the pSR field of APE_TASK to the current pSR.
Call the task handler.
if(the state of the task is PENDING)
    return
else if(the state is ACTIVE and the pSR field is set to the current pSR)
```

```
{
    Set the state to ENDING.
    Go through any tasks pending on this task (the list of these tasks is
        maintained in the listTasksPendingOnMe field of APE_TASK),
        take them out of the list in turn, and resume each of them
        (refer to
        ApeResumeTask( ) for pseudo-code on resuming a task).
}
```

The state could be ACTIVE but the pSR field set to some other stack record. This would be because the task is being resumed in the context of some other thread. In this case do nothing in this thread.
Care must be taken to avoid race conditions when examining and setting the task state and other fields like pSR.

64 ApeSuspendTask
Suspends a currently active task.

```
VOID ApeSuspendTask
(
    IN      PAPE_TASK           pTask,
    IN      PAPE_STACK_RECORD   pSR
);
```

Parameters
pTask
The task to suspend.
pSR
The current stack record.
Comments
This function is always called in the context of the task's task handler. ApeUnsuspendTask( ) or ApeResumeTask( ) may be used to resume the task.
Implementation Notes
APE always sets its state to ACTIVE and sets the pSR field in APE_TASK to the current stack record before calling the task's task handler. The state is set to PENDING when ApeSuspendTask( ) (or any function that causes the task to be suspended) is called and to ENDING if the task ends (see implementation notes of ApeStartTask( )). Therefore, it can easily check whether it is actively executing in the context of the task handler. The pSR field of APE_TASK should be set to the current value of pSR, and the task state should be set to ACTIVE.
ApeSuspendTask( ) pseudo-code is shown below:
Verify that APE is currently in the context of the task's task handler.
Set the task state to PENDING.
Set the pSR field of the task to NULL.
Set the pThingIAmPendingOn field of the task to NULL signifying that this task is pending because of a call to ApeSuspendTask( ) rather than for some other reason.
Care must be taken to avoid race conditions when examining and setting the task state and other fields like pSR.

65 ApeUnsuspendTask
Brings a suspended task out of the suspended (pending) state while still in the context of the task's task handler.

```
VOID ApeUnsuspendTask
(
    IN      PAPE_TASK              pTask,
    IN      PAPE_STACK_RECORD      pSR
);
```

Parameters
  pTask
    The task to be unsuspended.
  pSR
    The current stack record.

Comments
  This function is used in the specific situation where a task has just been suspended in the context of the task handler but there is a need to back out of the suspended state and continue executing in the task handler. This happens when the task is suspended prior to starting a potentially asynchronous event, but then the event completes synchronously.
  ApeUnsuspendTask( ) must be called in the context of the task handler when the task is in the pending state subsequent to a call to ApeSuspendTask( ) and there is NO CHANCE of any other thread resuming this task. If there is any chance that some other thread will resume this task, then ApeUnsuspendTask( ) should not be used. (ApeUnsuspendTask( ) will assert that it is being called with the task in the suspended state.) ApeUnsuspendTask( ) should not be used if the task was suspended using some other function such as ApePendTaskOnOtherTask( ). APE asserts this fact.

Implementation Notes
  ApeUnsuspendTask( ) should verify that the task's state is SUSPENDED and that the pThingIAmPendingOn field is set to NULL to verify that the task was suspended because of a call to ApeSuspendTask( ). It cannot verify that it is being called in the context of the task handler as the pSR field of pTask is cleared at the point the task is suspended. ApeUnsuspendTask( ) should then set the task's state to ACTIVE and set the task's pSR to the current pSR.
  Care must be taken to avoid race conditions when examining and setting the task state and other fields like pSR.

66 ApeResumeTask
Resumes a task suspended by ApeSuspendTask( ).

```
VOID ApeResumeTask
(
    IN      PAPE_TASK              pTask,
    IN      PAPE_STACK_RECORD      pSR
);
```

Parameters
  pTask
    The task to resume.
  pSR
    The current stack record.

Comments
  This should only be used to suspend a task that has been suspended using ApeSuspendTask( ). So, for example, ApeResumeTask( ) should not be called if the task is suspended after a call to ApePendTaskOnOtherTask( ). APE asserts this criterion. Refer to ApeSuspendTask( ) for further details.

Implementation Notes
  ApeResumeTask( ) first verifies that the task's state is SUSPENDED and that the pThingIAmPendingOn field is set to NULL to verify that the task was suspended because of a call to ApeSuspendTask( ). ApeResumeTask( ) then executes the same code as shown in the implementation notes for ApeStartTask( ).
  Care must be taken to avoid race conditions when examining and setting the task state and other fields like pSR.

67 ApePendTaskOnOtherTask
Suspends a task. The task is resumed when pOtherTask is complete.

```
APE_OS_STATUS ApePendTaskOnOtherTask
(
    IN      PAPE_TASK              pTask,
    IN      PAPE_TASK              pOtherTask,
    IN      PAPE_STACK_RECORD      pSR
);
```

Parameters
  pTask
    The task to suspend.
  pOtherTask
    The task to pend on.
  pSR
    The current stack record.

Return Value
  OS_STATUS_PENDING means that pOtherTask has not yet completed.
  OS_STATUS_SUCCESS means that pOtherTask has completed. In this case pTask is NOT pended.
  OS_STATUS_FAILURE means that a parameter is bad. APE asserts the failure.

Comments
  This function MUST be called in the context of the task's task handler while the task is in the active state. The task's handler is never reentered in the context of ApePendTaskOnOtherTask( ). ApePendTaskOnOtherTask( ) may safety be called with user-specific locks held.
  A return value of OS_STATUS_SUCCESS indicates that the task is NOT pended. A return value of OS_STATUS_PENDING does not imply that the task is currently in the pending state. The task handler could be re-entered in the context of another thread before the call to ApePendTaskOnOtherTask( ) returns.

Implementation Notes
  ApePendTaskOnOtherTask( ) is implemented according to the following pseudo-code:

```
Verify that it is called while the task is in an active state and in the context
    of the task's task handler.
if(pOtherTask is in the ENDING state)
    return OS_STATUS_SUCCESS
else
{
    Set the task state to PENDING.
    Set the pSR field of the task to NULL.
    Set the pThingIAmPendingOn field of the task to pOtherTask,
        signifying that this task is pending because of a call to
        ApePendTaskOnOtherTask( ) rather than for some other reason.
```

-continued

```
Add a cross reference between pTask and pOtherTask (using
    ApeCrossReferenceObjectsDebug( ) if both object have
    diagnostics
    enabled, else using ApeCrossReferenceObjects( )).
Insert pTask into pOtherTask's listTasksPendingOnMe.
return OS_STATUS_PENDING
}
```

Care must be taken to avoid race conditions when examining and setting the task state and other fields like pSR.

68 ApePendTaskOnObjectDeletion

Suspends a task and resumes it when the specified object is deleted.

```
APE_OS_STATUS ApePendTaskOnObjectDeletion
(
    IN       PAPE_TASK              pTask,
    IN       PAPE_OBJECT            pObject,
    IN       PAPE_STACK_RECORD      pSR
);
```

Parameters
  pTask
    The task to suspend.
  pObject
    The object on which to pend the task.
  pSR
    The current stack record.
  Return Value
    OS_STATUS_PENDING means that pTask has been suspended and will be resumed after the object's deletion handler has been called.
    OS_STATUS_FAILURE means that a parameter is bad. APE asserts the failure.
Comments
  This must be called in the context of pTask's task handler. It may be called with locks held. It never resumes task in the context of the call itself.
  pObject must be a "pendable" object, that is, APE_OBJFLAGS_PENDABLE was specified when the object was created.
Implementation Notes
  ApePendTaskOnObjectDeletion( ) needs extensions to existing structures as currently defined.
  APE_STATIC_OBJECT_INFO needs a new field, OffsetListPendingTasks. This specifies the offset from the start of the APE_OBJECT to a doubly-linked list of tasks pending on this object's deletion. If this OffsetListPendingTasks field is zero, ApePendTaskOnObjectDeletion( ) fails.
  ApePendTaskOnObjectDeletion( ) pseudo-code is shown below:
    Verify that the task is active and executing in the context of the task's task handler, as outlined in the notes for ApeSuspendTask( ).
    Add an external reference to the task.
    Add the task to the list of tasks pending on the object's deletion.
    Set the task's status to PENDING.
    Clear the pSR field of the task.
    return APE_OS_STATUS_PENDING
  When the object's reference counter goes to zero, it should save away the list of pending tasks, delete the object and then resume each of the pending tasks, decrementing the external reference added to each.
  Care must be taken to avoid race conditions when examining and setting the task state and other fields like pSR.

69 ApeOKToBlockInTask

Checks if it is OK to perform a potentially blocking operation in the context of the current task handler.

```
APE_OS_STATUS ApeOKToBlockInTask
(
    IN       PAPE_TASK              pTask,
    IN       PAPE_STACK_RECORD      pSR
);
```

Parameters
  pTask
    The task to check.
  pSR
    The current stack record.
  Return Value
    APE_OS_SUCCESS means the task may block.
    APE_OS_FAILURE means otherwise.
Comments
  This function is advisory. It returns success if there are no tasks currently pending on pTask. Of course there is nothing to prevent tasks from pending on pTask after the blocking operation commences.

70 ApeInitializeGroup

Initializes an APE group.

```
VOID ApeInitializeGroup
(
    IN       PAPE_OBJECT              pOwningObject,
    IN       UINT                     Flags,
    IN       PAPE_COLLECTION_INFO     pCollectionInfo
                                      OPTIONAL,
    IN       PAPE_GROUP_OBJECT_INFO   pObjectInfo,
    OUT      PAPE_GROUP               pGroup,
    IN       const char               *szDescription,
    IN       PAPE_STACK_RECORD        pSR
);
```

Parameters
  pOwningObject
    The parent of all objects in this group.
  Flags
    APE_FLG_GROUP_PRIMARY specifies that this is a primary group
  pCollectionInfo
    If non-NULL, pCollectionInfo specifies a set of functions that APE uses to organize the objects in the group. If NULL, APE uses a doubly-linked list to organize the items.
  pObjectInfo
    Static information common to all items in the group.
  pGroup
    Uninitialized space to hold the group.
  szDescription
    The name of this group, used for debugging purposes.
  pSR
    The current stack record.
Comments
  This function initializes an APE group. Primary groups are initialized by specifying the APE_FLG_

GROUP_PRIMARY flag. Secondary groups are initialized by setting the flag to zero. The user may take over the organization of the items in the group by specifying a non-NULL value for pCollectionInfo, in which case APE uses the supplied functions instead of its built-in list-based functions. This allows the user to provide sophisticated data structures, such as hash tables, that are optimized for the application.

71 ApeDeinitializeGroup

Suspends pTask and resumes it once the group is empty and de-initialized.

```
APE_OS_STATUS ApeDeinitializeGroup
(
    IN      PAPE_GROUP          pGroup,
    IN      PAPE_TASK           pTask,
    IN      PAPE_STACK_RECORD   pSR
);
```

Comments

This function initiates the asynchronous de-initialization of the group. It is not responsible for actually removing objects from the group. The user typically first disables the group from growing by calling ApeDisableGroupFunctions( ), then initiates the removal of existing objects in the group (perhaps by enumerating each of them and removing them, perhaps asynchronously), and then calls ApeDeinitializeGroup( ) which returns immediately but resumes pTask once all the work is complete.

72 ApeCreateObjectInGroup

Looks up and optionally creates an object in a primary group.

```
APE_OS_STATUS ApeCreateObjectInGroup
(
    IN      PAPE_GROUP          pGroup,
    IN      ULONG               Flags,
    IN      PVOID               pvKey,
    IN      PVOID               pvCreateParams,
    OUT     PAPE_OBJECT         *ppObject,
    OUT     INT                 *pfCreated,
    IN      PAPE_STACK_RECORD   pSR
);
```

Parameters pGroup
  The primary group.
Flags
  APE_GROUPFLAGS_NEW specifies that a new object should be created.
pvKey
  A user-specified key that uniquely identifies the object.
pvCreateParams
  User-specified parameters used to instantiate a newly created object in the group.
ppObject
  On a successful return, this contains an object in the group.
pfCreated
  Set to TRUE if the object was created in this call, FALSE if the object previously existed.
pSR
  The current stack record.

Comments

This function creates or looks up an object in a group. APE attempts to create the object if it does not already exist in the group. The function returns failure if Flags is set to APE_GROUPFLAGS_NEW and the object already exists in the group. Objects are indexed by the key specified in pvKey. APE does not interpret pvKey directly, instead it relies on the user-supplied functions specified in ApeInitializeGroup( ).

73 ApeAddObjectToGroup

Adds an existing object to a secondary group.

```
APE_OS_STATUS ApeAddObjectToGroup
(
    IN      PAPE_GROUP          pGroup,
    IN      PVOID               pvKey,
    IN      APE_OBJECT          pObject,
    IN      PAPE_STACK_RECORD   pSR
);
```

Comments

This function returns failure if the object has already been added to the group. Objects are indexed by the key specified in pvKey. APE does not interpret pvKey directly, instead it relies on the user-supplied functions specified in ApeInitializeGroup( ).

74 ApeRemoveObjectFromGroup

Removes an object from a secondary group.

```
APE_OS_STATUS ApeRemoveObjectFromGroup
(
    IN      PAPE_GROUP          pGroup,
    IN      PAPE_OBJECT         pObject,
    IN      PAPE_STACK_RECORD   pSR
);
```

75 ApeLookupObjectInGroup

Looks up an object in a primary or a secondary group.

```
APE_OS_STATUS ApeLookupObjectInGroup
(
    IN      PAPE_GROUP          pGroup,
    IN      PVOID               pvKey,
    OUT     PAPE_OBJECT         *ppObject,
    IN      PAPE_STACK_RECORD   pSR
);
```

76 ApeDeleteGroupObjectWhenUnreferenced

Marks the object (which belongs to a primary group) for deletion, which will be carried out when there are no references to it beyond the fact that it is part of the group.

```
VOID ApeDeleteGroupObjectWhenUnreferenced
(
    IN      PAPE_OBJECT         pObject,
    IN      PAPE_STACK_RECORD   pSR
);
```

77 ApeInitializeGroupIterator

Initializes an interator over a group.

```
APE_OS_STATUS ApeInitializeGroupIterator
(
        IN      PAPE_GROUP              pGroup,
        OUT     PAPE_GROUP_ITERATOR     pIterator,
        IN      PAPE_STACK_RECORD       pSR
);
```

Comments
  To iterate over the objects in a group, first call this function to initialize the iterator, then call ApeGetNextObjectInGroup( ) repeatedly to gain access to each object in the group. APE ensures that the group will not be deleted as long as there are iterations active on the group.
78 ApeGetNextObjectInGroup
  Gets the next object in the iteration over a group.

```
APE_OS_STATUS ApeGetNextObjectInGroup
(
        IN      PAPE_GROUP_ITERATOR     pIterator,
        OUT     PAPE_OBJECT             *ppNextObject,
        IN      PAPE_STACK_RECORD       pSR
);
```

Comments
  This function returns the next object in piterator, which is initialized by ApeInitializeGroupIterator( ). Successive calls to ApeGetNextObjectInGroup( ) return successive items in the group in an arbitrary order. The function adds a temporary reference to the object and returns a pointer to it in ppNextObject. The user is responsible for removing this temporary reference by calling ApeTmpDereferenceObject( ).
79 ApeEnableGroupFunctions
  Enables specific group functions.

```
VOID ApeEnableGroupFunctions
(
        IN      PAPE_GROUP              pGroup,
        IN      UINT                    Functions,
        IN      PAPE_STACK_RECORD       pSR
);
```

Parameters
  Functions
    The functions to be enabled.
    APE_FLG_GROUPFUNC_LOOKUP
    APE_FLG_GROUPFUNC_CREATE
    APE_FLG_GROUPFUNC_ENUMERATE
    APE_FLG_GROUPFUNC_ALL
Comments
  This function enables the specified set of operations on the group. APE_FLG_GROUPFUNC_CREATE must only be specified for primary groups. ApeDisableGroupFunctions( ) disables the same set of operations.
80 ApeDisableGroupFunctions
  Disables specific group functions.

```
VOID ApeDisableGroupFunctions
(
        IN      PAPE_GROUP              pGroup,
        IN      UINT                    Functions,
        IN      PAPE_STACK_RECORD       pSR
);
```

Parameters
  Functions
    The functions to be disabled.
    APE_FLG_GROUPFUNC_LOOKUP
    APE_FLG_GROUPFUNC_CREATE
    APE_FLG_GROUPFUNC_ENUMERATE
    APE_FLG_GROUPFUNC_ALL
81 ApeEnumerateObjectsInGroup
  Calls the specified enumeration function for all objects in the group.

```
VOID ApeEnumerateObjectsInGroup
(
        IN      PAPE_GROUP                      pGroup,
        IN      APE_PFN_GROUP_ENUMERATOR        pfnFunction,
        IN      PVOID                           pvContext
);
```

82 ApeUtilAcquireLockPair
  Locks a pair of locks taking into account their level.

```
VOID ApeUtilAcquireLockPair
(
        IN      PAPE_LOCK               pLock1,
        IN      PAPE_LOCK               pLock2,
        IN      PAPE_STACK_RECORD       pSR
);
```

Parameters
  pLock1
    The first lock.
  pLock2
    The second lock.
  pSR
    The current stack record.
Comments
  This utility function avoids deadlocks and can deal with the case that pLock1 equals pLock2.
Implementation Notes
  This function locks pLock1 and pLock2 according to the following algorithm:

```
if(pLock1->Order == pLock2->Order)
{
    // Lock in order of increasing pointer values. If they're the same
    // lock, just lock one.
    if(pLock1 == pLock2)
        ApeLock(pLock1, pSR);
    else if((UINT_PTR) pLock1 < (UINT_PTR) pLock2)
    {
        ApeLock(pLock1, pSR);
        ApeLock(pLock2, pSR);
    }
    else
    {
        ApeLock(pLock2, pSR);
        ApeLock(pLock1, pSR);
    }
}
else if(pLock1->Order > pLock2->Order)
{
    ApeLock(pLock1, pSR);
    ApeLock(pLock2, pSR);
}
else
{
    ApeLock(pLock2, pSR);
```

-continued

```
    ApeLock(pLock1, pSR);
}
```

83 ApeUtilReleaseLockPair
  Releases a pair of locks.

```
VOID ApeUtilReleaseLockPair
(
    IN      PAPE_LOCK            pLock1,
    IN      PAPE_LOCK            pLock2,
    IN      PAPE_STACK_RECORD    pSR
);
```

Comments
  This is the inverse of ApeUtilReleaseLockPair( ).
Implementation Notes
  Implementation code:

```
    ApeReleaseLock(pLock1, pSR);
    if(pLock1 != pLock2)
        ApeReleaseLock(pLock2, pSR);
```

84 ApeUtilSetExclusiveTask
  Sets *ppTask to pTask after performing some checks (using debug associations) to make sure this happens only once.

```
APE_OS_STATUS ApeUtilSetExclusiveTask
(
    IN      PAPE_TASK            pTask,
    IN      PAPE_OBJECT          pObj,
    IN      OUT PAPE_TASK        *ppTask,
    IN      PAPE_STACK_RECORD    pSR
);
```

Comments
  The caller is expected to serialize (via locks) access to *ppTask. *ppTask, if non-NULL, must always point to a task which is not in the ending state.
  Sample use:

```
pfnHandler(pTask, . . .)
{
    ...
    LOCK(pObj);
    // Make pTask pend until it becomes the primary task for pObj.
    if(pTask != pObj->pPrimaryTask)
    {
        Status = ApeUtilSetExclusiveTask(pTask, pObj,
            &pObj->pPrimaryTask);
        if(PEND(Status))
        {
            UNLOCK(pObj);
            return;
        }
        if(FAIL(Status))
        {
            // This is a fatal error.
            ASSERT(FALSE);
            UNLOCK(pObj);
            return;
        }
    }
```

-continued

```
    ASSERT(pTask == pObj->pPrimaryTask);
    ...
    if(Ending)
        ApeUtilClearExclusiveTask(pObj, pTask,
            &pObj->pPrimaryTask);
}
```

Diagnostic support
  If pTask has diagnostics enabled (non-NULL pDebugInfo), then the following debug association is added. The association ensures that pTask can be "set exclusive" only once at any point of time and that that once this task is set, it must be cleared before pTask is deallocated.
    ApeDebugAddAssociation(pTask, pSR→LocID,
      APE_INTERNAL_ASSOC_EXCLU-
        SIVE_TASK, pObj,
      APE_ASSOCFLAGS_SINGLE_INSTANCE|
      APE_ASSOCFLAGS_ENTITY_IS_OBJECT,
        pSR);
  If pObj has diagnostics enabled (non-NULL pDebugInfo), then the following debug association is added. The association ensures that pObj can have at most one task associated with the specific pointer (ppTask) and that once this task is set, it must be cleared before pObj is deallocated.
    ApeDebugAddAssociation(pObj, pSR→LocID,
      APE_ASSOCFLAGS_SINGLE_INSTANCE|
      APE_ASSOCFLAGS_ENTITY_IS_OBJECT,
        ppTask,
      APE_ASSOCFLAGS_INVERSE_ASSOC, pSR);
85 ApeUtilClearExclusiveTask
  Clears *ppTask and performs various checks (using debug associations) to ensure that this *ppTask was initially set to pTask by a call to ApeUtilSetExclusiveTask( ).

```
VOID ApeUtilClearExclusiveTask
(
    IN      PAPE_TASK            pTask,
    IN      PAPE_OBJECT          pObj,
    IN OUT  PAPE_TASK            *ppTask,
    IN      PAPE_STACK_RECORD    pSR
);
```

We claim:
  1. A computer-readable storage device having stored thereon computer-executable instructions that, when executed by at least one processor, perform a method of tracking asynchronous execution of a program, the method comprising:
    receiving a user input comprising a definition of a hierarchical structure of objects that represents the asynchronous execution of the program;
    initializing a first task object in the hierarchical structure of objects, the first task object representing a task from the program;
    when the first task object is initialized,
      associating the first task object with a second task object via a reference to the second task object, wherein the second task object is a parent of the first task object in the hierarchical structure of objects, and
      initializing a task handler for performing at least one asynchronous operation associated with the task; and
    during execution of the task, suspending the execution of the task when the task handler calls at least one function to perform the at least one asynchronous operation, wherein the at least one asynchronous operation is represented as a child object of the first task object in the hierarchical structure of objects, wherein suspending the execution of the task comprises setting the state of the task to "pending on object deletion" and wherein the first task object further comprises a data field containing data representing an association of the first task object with an object on whose deletion the task is pending, when the at least one asynchronous operation is completed, resuming the execution of the suspended task by calling the task handler, based on the at least one function;

wherein the second task object that is the parent of the first task object is associated with a reference counter, the reference counter is incremented when the first task object is initialized and associated with the second task object via the reference to the second task object;

the method further comprising deleting the first task object when the reference counter is set to zero.

2. The computer-readable storage device of claim 1, wherein the first task object represents code for executing the task by pointing to the code.

3. The computer-readable storage device of claim 1, wherein the first task object further comprises a data field containing data representing a state of the task.

4. The computer-readable storage device of claim 3, wherein suspending the execution of the task comprises setting the state of the task to "pending on task completion" and wherein the first task object further, comprises a data field containing data representing a second task on whose completion the task is pending.

5. The computer-readable storage device of claim 3, wherein suspending the execution of the task comprises setting the state of the task to "pending on group de-initialization" and wherein the first task object further comprises a data field containing data representing a group on whose de-initialization the task is pending.

6. The computer-readable storage device of claim 1, wherein the first task object further comprises a data field containing data representing a completion handler.

7. The computer-readable storage device of claim 1, wherein the first task object further comprises an association of the task object with a third object.

8. The computer-readable storage device of claim 7 wherein the third object is a child object of the first task object.

9. The computer-readable storage device of claim 1, wherein the first task object further comprises data representing a resource associated with the first task object.

10. The computer-readable storage device of claim 9, wherein the method further comprises:
tracking a resource associated with the first task object using a debug association;
wherein the first task object further comprises the debug association, and the debug association comprises:
a user-supplied label for the debug association, and
an integer or pointer representing an instance of the resource.

11. The computer-readable storage device of claim 1, wherein the method further comprises utilizing a reference counter to keep track of a number of child objects associated with the first task object, wherein the first task object is deleted from the hierarchical structure of objects when the reference counter is set to zero indicating that the first task object has no child objects associated with the first task object.

12. A computer-readable storage device having stored thereon computer-executable instructions that, when executed by at least one processor, perform a method of tracking asynchronous execution of a program, the method comprising:
receiving a user input comprising a definition of a hierarchical structure of objects that represents the asynchronous execution of the program;
initializing a task object in the hierarchical structure of objects, the task object representing a task from the program;
when the task object is initialized, associating, via a reference, the task object with a parent task object in the hierarchical structure of objects; and
during execution of the task,
suspending the execution of the task when a task handler function associated with the task object calls at least one function to perform at least one asynchronous operation comprising deletion of an object in the hierarchical structure of objects, wherein the task object further comprises a data field containing data representing an association of the task object with an object on whose deletion the task is pending, and
when the object is deleted, resuming the execution of the suspended task by calling the task handler function;
wherein the method further comprises de-cross-referencing the task object and at least one other task object by dereferencing the at least one other task object referenced by the task object, dereferencing the task object referenced by the at least one other task object, decrementing the reference counter of the task object, and decrementing the reference counter of the at least one other task object;
deleting the at least one task object when the reference counter of the task object is set to zero; and deleting the at least one other task object when the reference counter of the at least one other task object is set to zero.

13. The computer-readable storage device of claim 12, wherein the at least one asynchronous operation is represented as a child object of the task object in the hierarchical structure of objects.

14. The computer-readable storage device of claim 12, wherein the task object is associated with a reference counter that keeps tracks of a number of objects associated with the task object, wherein the objects reference the task object.

15. The computer-readable storage device of claim 14, wherein the method further comprises cross-referencing the task object and at least one other task object in the hierarchical structure of objects by referencing the at least one other task object by the task object, referencing the task object by the at least one other task object, incrementing the reference counter of the task object, and incrementing a reference counter of the at least one other task object.

16. The computer-readable storage device of claim 12, wherein the method further comprises storing a state of the task with the task object.

17. The computer-readable storage device of claim 16, wherein the state of the task is set to active when the execution of the task starts, is set to pending when the execution of the task is suspended, and is set to active when the execution of the suspended task is resumed.

* * * * *